United States Patent
Gardner et al.

(10) Patent No.: US 11,501,240 B2
(45) Date of Patent: Nov. 15, 2022

(54) SYSTEMS AND METHODS FOR PROCESS DESIGN INCLUDING INHERITANCE

(71) Applicant: Siemens Industry Software Inc., Plano, TX (US)

(72) Inventors: Timothy S. Gardner, Oakland, CA (US); Lili Nader, Oakland, CA (US); Ram Ranganathan, Oakland, CA (US); Alan Hanley, Oakland, CA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/004,747

(22) Filed: Aug. 27, 2020

(65) Prior Publication Data

US 2021/0081876 A1   Mar. 18, 2021

Related U.S. Application Data

(60) Provisional application No. 62/892,134, filed on Aug. 27, 2019.

(51) Int. Cl.
*G06Q 10/10* (2012.01)
*G06Q 10/06* (2012.01)
(Continued)

(52) U.S. Cl.
CPC ............. *G06Q 10/06395* (2013.01); *G06F 16/9024* (2019.01); *G06Q 10/06312* (2013.01);
(Continued)

(58) Field of Classification Search
None
See application file for complete search history.

(56) References Cited

U.S. PATENT DOCUMENTS 5,343,388 A   8/1994 Wedelin
5,691,895 A   11/1997 Kurtzberg et al.
(Continued)

FOREIGN PATENT DOCUMENTS

EP   1784695 B1   7/2007
JP   2004-186445 A   7/2004

OTHER PUBLICATIONS

Yeon-Hak et al "Improving new product development (NPD) process by analyzing failure cases", Dec. 2016, Department of Management of Technology, Konkuk University, Seoul, South Kore. pp. 134-150. (Year: 2016).*
(Continued)

*Primary Examiner* — Romain Jeanty

(57) ABSTRACT

Systems and methods for analyzing information are provided in which a plurality of attribute records are stored. Each respective record in at least a subset of the plurality of records comprises a corresponding unique identifier, a superior/inferior attribute reference, and a heritage indicator. A superior/inferior attribute reference of a first record in the plurality of records references a unique identifier of a second record that is different than the first record, thereby indicating that the first record is a nested attribute record of the second record. Moreover, a heritage indicator of the first record references: the corresponding unique identifier of a third record, thereby indicating that the third record is an ancestor record of the first record, or a unique identifier of a first attribute class record, thereby identifying an attribute class record, in a plurality of attribute class records, to which the first record belongs.

22 Claims, 51 Drawing Sheets

(51) Int. Cl.
  G06Q 50/04    (2012.01)
  G06F 16/901   (2019.01)
  G06N 3/08     (2006.01)
  G06Q 30/02    (2012.01)
  G06F 9/455    (2018.01)
  G06N 3/04     (2006.01)

(52) U.S. Cl.
  CPC ............ *G06Q 10/10* (2013.01); *G06Q 50/04* (2013.01); *G06F 9/45558* (2013.01); *G06F 2009/45595* (2013.01); *G06N 3/04* (2013.01); *G06N 3/08* (2013.01); *G06Q 10/0635* (2013.01); *G06Q 30/0201* (2013.01)

(56) References Cited

U.S. PATENT DOCUMENTS

| | | | |
|---|---|---|---|
| 5,784,286 | A | 7/1998 | Hirose et al. |
| 5,970,490 | A | 10/1999 | Morgenstern |
| 6,243,614 | B1 | 6/2001 | Anderson |
| 6,542,871 | B1* | 4/2003 | Harshaw ............ G06Q 10/063 705/317 |
| 7,711,596 | B2* | 5/2010 | Cristol ............ G06Q 10/06313 705/7.36 |
| 9,910,936 | B2 | 3/2018 | Gardner |
| 9,977,862 | B2 | 5/2018 | Sadowski et al. |
| 10,586,015 | B2 | 3/2020 | Gardner et al. |
| 10,817,494 | B2 | 10/2020 | Gardner et al. |
| 10,740,505 | B2 | 11/2020 | Gardner |
| 2001/0032029 | A1 | 10/2001 | Kauffman |
| 2003/0055659 | A1* | 3/2003 | Alling ............ G06F 30/00 707/999.107 |
| 2004/0064465 | A1 | 4/2004 | Yadav et al. |
| 2004/0078172 | A1* | 4/2004 | Moore ............ G06Q 10/06 703/1 |
| 2004/0119752 | A1 | 6/2004 | Beringer et al. |
| 2005/0171746 | A1 | 8/2005 | Thalhammer-Reyero |
| 2005/0197875 | A1 | 9/2005 | Kauffman |
| 2005/0203786 | A1* | 9/2005 | Jessup ............ G06Q 10/00 705/7.38 |
| 2005/0240943 | A1 | 10/2005 | Smith et al. |
| 2008/0033700 | A1* | 2/2008 | Kano ............ G06Q 10/06 703/1 |
| 2008/0253283 | A1 | 10/2008 | Douglis et al. |
| 2008/0275585 | A1 | 11/2008 | Lin et al. |
| 2009/0089031 | A1 | 4/2009 | Sturrock et al. |
| 2010/0015579 | A1 | 1/2010 | Schlabach |
| 2010/0023355 | A1* | 1/2010 | Sagalow ............ G06Q 40/08 705/4 |
| 2010/0318963 | A1 | 12/2010 | Kajiya |
| 2011/0022192 | A1 | 1/2011 | Plache et al. |
| 2011/0066585 | A1 | 3/2011 | Subrahmanyam et al. |
| 2011/0153517 | A1* | 6/2011 | Thomas ............ H04L 67/306 705/347 |
| 2012/0030647 | A1 | 2/2012 | Wang et al. |
| 2012/0036249 | A1 | 2/2012 | Chandrasekaran |
| 2014/0172503 | A1 | 6/2014 | Hammerstrom et al. |
| 2014/0214798 | A1 | 7/2014 | Nica et al. |
| 2015/0039651 | A1 | 2/2015 | Kinsley et al. |
| 2015/0197875 | A1 | 7/2015 | Kim et al. |
| 2016/0034606 | A1 | 2/2016 | Gardner |
| 2017/0046329 | A1 | 2/2017 | Mirhaji |
| 2018/0181889 | A1 | 6/2018 | Gardner et al. |

OTHER PUBLICATIONS

International Search Report for International Patent Application No. PCT/US2020/048174, dated Nov. 30, 2020, 14 pages.
Barlow and Irony, 1992, "Foundations of statistical quality control" in Ghosh, M. & Pathak, P.K. (eds.) *Current Issues in Statistical Inference: Essays in Honor of D. Basu*, Hayward, California, Institute of Mathematical Statistics, pp. 99-112.
Gardner, 2014, "A swan in the making," Science, Retrieved from the Internet: http://www.sciencemag.org, accessed Aug. 21, 2014.
Saeys et al., 2007, "A review of feature selection techniques in bioinformatics," Bioinformatics 23, 2507-2517.
Schiettecat, Filip; Simatic IT R&D Suite; Driving Innovation Efficiency (PowerPoint); Apr. 2009.
Tibshirani, 1996, "Regression and Shrinkage and Selection via the Lasso," J. R. Statist. Soc B, pp. 267-288.
Manufacturing Information Portal (MIP) Product Data Sheet; http://www2.emersonprocess.com/siteadmincenter/PM%20Syncade%20Documents/PDS_Syncade_Portal.pdf; Dec. 2008.
Process Miner [PM] Syncade Product Data Sheet; http://www2.emersonprocess.com/siteadmincenter/PM%20Syncade%20Documents/PDS_Syncade_PM.pdf; Sep. 2013.
Recipe Authoring (RA) Product Data Sheet; http://www2.emersonprocess.com/siteadmincenter/PM%20Syncade%20Documents/PDS_Syncade_RA.pdf; Feb. 2014.
Robust and flexible processes with paperless manufacturing; http://www.industry.siemens.com/verticals/global/en/pharma-industries/Documents/neue-version/paperless/VRPH-B10002-00-7600_WS_Pharma_paperless_manufacturing_EN.pdf; 2015.
Simatic IT R&D Suite (Brochure); http://w3.siemens.com/mcms/mes/en/mes_suites/rdsuite/Documents/brochure_simaticit_rd_suite_en.pdf, last accessed Jan. 6, 2016.
Simatic IT R&D Suite (Flyer); http://w3.siemens.com/mcms/mes/en/mes_suites/rdsuite/Documents/Flyer_RnD.pdf.
Simitic IT Unilab: Your Next Generation LIMS; http://w3.siemens.com/mcms/mes/en/mescomponents/simaticitlims/Documents/brochure_simaticit_unilab_en.pdf; 2015.
Syncade™ Smart Operations Management Suite Product Data Sheet; http://www2.emersonprocess.com/siteadmincenter/PM%20Syncade%20Documents/PDS_Syncade_SmartOpsSte.pdf; Mar. 2010.
Paolo, F.B. et al., "Hypercharts: Extended Statecharts to Support Hypermedia Specification," IEEE Transactions on Software Engineering, vol. 25, No. 1, 1999, pp. 33-49.
Campagna, D., "Product and Production Process Modeling and Configuration," Universia Degli Studi Perugia, Dissertation, Feb. 2012.
Kumar, A. et al., "Design and management of flexible process variants using templates and rules," Computers in Industry, Jan. 20, 2012, vol. 63, pp. 112-130.
Michelena, N.F. et al., "A hypergraph Framework for Optimal Model-Based Decomposition of Design Problems", Computational Optimization and Applications 8 (1997): 173-196. Retrieved from the Internet: <https://core.ac.uk/download/pdf/22876372.pdf>.
Im et al., "A Hypergraph-based Storage Policy for RDF Version Management System", ICUIMC'12, Feb. 20-22, 2012, Kuala Lumpour, Malaysia, 5 pages.

* cited by examiner

Attribute Table (blank cells are null values) 204

| id | name | topAttribute | superiorAtrId | attrClassId | version | parent | side | from | to | value |
|----|------|--------------|---------------|-------------|---------|--------|------|------|-----|-------|
| *records omitted* | | | | | | | | | | |
| 5 | Second Step | 0 | 1 | 2 | 1 | | | | | |
| *records omitted* | | | | | | | | | | |
| 11 | First Process | 1 | | 1 | 1 | | | | | |
| 12 | First Step | 0 | 11 | 2 | 1 | | | | | |
| 13 | First Resource | 0 | 12 | 3 | | | output | | | |
| 14 | First Property | 0 | 13 | 4 | | | | | | |
| 15 | Limit<br>Specification | 0 | 14 | 5 | | | | | | |
| 16 | Unit | 0 | 14 | 6 | | | | | | L |
| 17 | Upper Limit | 0 | 15 | 7 | | | | | | 75 |
| 18 | Lower Limit | 0 | 15 | 8 | | | | | | 100 |
| 19 | Second Step | 0 | 11 | 2 | 2 | 5 | | | | |
| 20 | First Resource | 0 | 18 | 3 | | | input | | | |
| 21 | First Property | 0 | 19 | 4 | | | | | | |
| 22 | Option List | 0 | 20 | 9 | | | | | | one, two, three |
| 23 | First Connection | 0 | 11 | 10 | | | | 3 | 10 | |

Fig. 8

Attribute Class Table (blank cells are null values)

| id | type | description |
|----|------|-------------|
| 1 | Process | a top level object composed of steps and connection and other attributes |
| 2 | Step | an node in a process that transforms inputs to outputs |
| 3 | Resource | a physical thing or information that is processed by a step |
| 4 | Property | an particular attribute of a resource |
| 5 | Limit Specification | a constraint on a continuously valued propert composed of upper and lower limits |
| 6 | Unit | a standard metric for a continuously valued property |
| 7 | Upper Limit | the value of the upper limit of a limit specification |
| 8 | Lower Limit | the value of the lower limit of a limit specification |
| 9 | Option List | allowed values for a nominally valued or ordinally valued property |
| 10 | Connection | an edge connecting two nodes in a process |

A method for analyzing product development information is provided at a computer system 200 comprising at least one processor 274 and a memory 192/290 storing at least one program for execution by the at least one processor. The at least one program comprises instructions for storing a plurality of attribute records. Each respective attribute record 206 in at least a subset of the plurality of attribute records comprises (i) a corresponding unique identifier 208, (ii) a superior attribute reference 210, and (iii) a heritage indicator 212.

A superior attribute reference 210 of a second attribute record in the plurality of attribute records references a corresponding unique identifier of a first attribute record that is different than the second attribute record, thereby indicating that the second attribute record is a nested attribute record of the first attribute record.

A heritage indicator 212 of the second attribute record in the plurality of attribute records references (i) the corresponding unique identifier of a third attribute record, that is different than the second attribute record, thereby indicating that the third attribute record is an ancestor attribute record of the second attribute record (in other words, that the second attribute record was copied from or otherwise derived from the third attribute record) and/or a unique identifier 228 of a first attribute class record 226 to which the second attribute record belongs as well as a version identifier that identifies the version of the second attribute record.

1204

Each respective attribute record 206 of one or more respective attribute records in the plurality of attribute records further comprises a corresponding attribute value 218 that defines a state of the respective attribute record.

1206

The corresponding unique identifier 208 and corresponding attribute value 218 of a respective attribute record 206 of one or more respective attribute records in the plurality of attribute records forms an attribute-value pair.

1208

The heritage indicator 212 of the second attribute record 206 is a parent reference 214 that references the corresponding unique identifier 208 of the third attribute record, thereby indicating that the third attribute record is an ancestor to the second attribute record.

1210

The heritage indicator 212 of the second attribute record 206 is an attribute field 216 containing a unique identifier of a first attribute class record 226, in a plurality of attribute class records (e.g., attribute class store 224), thereby identifying the class to which the second attribute record belongs.

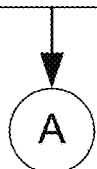

Fig. 12A

Process object ------------------------------------------------------------------
```
{
  "_id": "HKBKDDTJMQt8E6cZ4",          2002
  "name": "Riffyn: Fermentation",
  "topLevel": true,
  "description": "This process is a simplification of a fermentation process kindly shared by the Jack Pronk lab of TU
Delft. Data on the Demo Experiment E10 was also kindly provided by the Pronk lab, and räepresents a subset of the data
published in: Harmen M. van Rossum, et. al, \"Alternative reactions at the interface of glycolysis and citric acid cycle in
Saccharomyces cerevisiae\", FEMS Yeast Research, 16 (3), 2016. DOI: http://dx.doi.org/10.1093/femsyr/fow017",
  "connections": [
    {
      "from": {
        "_id": "2ncpQMW9thhZsffyB",
        "type": "activity",
        "resourceId": "eJ57xAHxYSnCdkfox",
        "resourceTypeId": "OBI_0001876"
      },
      "to": {
        "_id": "TwBkCmo686SdmJBbb",                2006
        "type": "activity",
        "resourceId": "qCZrhqWBHX2Xp6aMK",
        "resourceTypeId": "OBI_0001876"
      },
      "created": "2016-10-07T14:11:35.933Z",
      "exported": false
    },
... [addiitional connections ommitted]
    {
      "from": {
        "_id": "rp5pmzvkHDRnuyNDm",
        "type": "activity",
        "resourceId": null
      },
      "to": {
        "_id": "self",
        "type": "group",
        "resourceId": null
      },
      "created": "2019-02-07T04:58:56.400Z", "exported": false
    }
  ],
  "entities": [
    {
      "_id": "TwBkCmo686SdmJBbb",           2004
      "type": "activity"
    },
... [addiitional activitiy entities ommitted]
    {
      "_id": "rp5pmzvkHDRnuyNDm",
      "type": "activity",
      "version": null
    }
  ],
  "topGroupId": "HKBKDDTJMQt8E6cZ4",
  "shareable": false,
  "accessibleTo": {
    {
      "_id": "7dAYzrzLqezWMtodE", "type": "team", "name": "Riffyn Admin Team", "role": "admin",
      "permissions": 268435583
    },
```

Fig. 20A

```
    ...
    {
      "_id": "3S74GsRQbJMd6qBkP",
      "type": "user",
      "name": "tsg-enterprises1",
      "email": "tgardner4@gmail.com",
      "role": "operator",
      "permissions": 65
    }
  ],
  "public": true,
  "activityOrder": [
    "rSggim9EfTgsmkKiX",
    "xbiXce3znDaBXRffL",
    "2ncpQMW9thhZsffyB",
    "TwBkCmo686SdmJBbb",
    "tFpneZCsjir7W7ehJ",
    "56426cqrY5ECqv3K2",
    "GKBsG7vsYtxPcer4z",
    "rp5pmzvkHDRnuyNDm"
  ],
  "instructionExceptions": null,
  "status": "UNSIGNED",
  "compliant": null,
  "signers": null,
  "reqSignatures": null,
  "creator": "riffyn.support",
  "created": "2018-05-14T14:56:34.475Z",
  "modified": "2019-03-14T06:28:09.774Z",
  "version": {
    "label": "32.00",
    "hash": "ef6e76136c6d0e68542f9a460db32e2d5612a2ab",
    "comments": "name,entities, activity:Batch fermentation outputs, activity:HPLC Analysis outputs, activity:Measure OD outputs, activity:Biomass Dry Weight Analysis inputs,outputs changes.",
    "current": true,
    "created": "2019-03-14T06:28:09.772Z",
    "description": "New version created for experiment:DoE"
  },
  "permissions": 9,
  "org": {
    "_id": "tKjwQoAApYxGgd7ej",
    "name": "Riffyn"
  },
  "modifiedBy": {
    "_id": "7msKK89NWm2bAhsTr",
    "username": "tgardner"
  },
  "objectId": null,
  "parent": {
    "_id": "sPT2T9i6itpNFdqBF",
    "version": {
      "label": "20.02",
      "hash": "7e3400e7fbb31773f38428d8288a7b9097f925f5",
      "comments": "activity:Batch fermentation modifiedBy._id,modifiedBy.username changes.",
      "current": false,
      "created": "2018-05-03T15:16:10.768Z",
      "description": "New version created for experiment:Tim Test 1"
    },
    "topGroupId": "sPT2T9i6itpNFdqBF",
    "topLevel": true,
    "parent": null
  },
  "locked": false
}
```

Fig. 20B

Activities list object ------------------------------------------------------------

```
{
  "links": {},
  "meta": {
    "total-count": 8,
    "total-pages": 1
  },
  "data": [
    {
      "_id": "rSggim9EfTgsmkKiX",                              ⎯ 2008
      "name": "Inoculate Media",
      "inputs": [
        {
          "_id": "qqXWPQhPFxHpzEwyD",
          "properties": [
                                                               ⎯ 2010-1
            {
              "_id": "lot_number", "name": "lot number",
              "specs": [
                {
                  "type": "valid-options", "value": [],
                  "enforcement": "none"
                }
              ],
              "rules": [], "immutable": true, "source": "SYSTEM"
            },
            {
              "_id": "volume", "name": "volume",
              "specs": [
                {
                  "type": "spec-limit",
                  "value": {
                    "lsl": 190, "usl": 210, "target": 200       ⎯ 2010-2
                  },
                  "enforcement": "none"
                }
              ],
              "rules": [], "immutable": false,
              "unit": {                                         ⎯ 2010-3
                "_id": "microliter",
                "name": "microliter",
                "symbol": "µL"                                  ⎯ 2010-4
              },
              "calculations": [], "source": "SYSTEM"            ⎯ 2010-5
            }
          ],
          "components": [
            {
              "_id": "nfAX6zjDSdpj8wLGd",                       ⎯ 2010-6
              "name": "Strain",
              "properties": [
                {
                  "_id": "name", "name": "name",
                  "specs": [
                    {
                      "type": "valid-options", "value": [], "enforcement": "none"
                    }
                  ],
                  "rules": [], "immutable": true, "calculations": [], "source": "SYSTEM"
                },
                ... {additional properties ommitted
```

Fig. 20C

```
                    ]
                  }
                },
                "sample": null,
                "direction": "input",
                "name": "cell bank",
                "typeId": "YRFty85jC7GdQMDLC",
                "typeName": "cell bank",
                "calculations": []
              },
              {
                "_id": "7K9EmYkYXS5K2mJoy",
                "properties": [
            ... {properities ommitted}
                ],
                "components": [
                  {
                    "_id": "Wq4cjbyhzAbLLdPog", "name": "nitrogen source",
                    "properties": [
                      {
                        "_id": "type",
                        "name": "type",
                        "specs": [
                          {
                            "type": "valid-options",
                            "value": [
                              "urea"
                            ],
                            "enforcement": "none"
                          }
                        ],
                        "rules": [], "immutable": true, "unit": null, "calculations": [],
                        "source": "SYSTEM"
                      },
                      {
                        "_id": "v54QMQPnmYdfcM2WZ",
                        "name": "Concentration*",
                        "specs": [
                          {
                            "type": "spec-limit",
                            "value": {
                              "target": 38
                            },
                            "enforcement": "none"
                          }
                        ],
                        "rules": [], "immutable": true,
                        "unit": {
                          "_id": "millimolar","name": "millimolar", "symbol": "mM"
                        },
                        "source": "USER_DEFINED"
                      }
                    ]
                  },
            ... {additional components ommitted}
                ],
                "sample": null, "direction": "input",
                "name": "media", "typeId": "6F493xYcyvpYTx9gr",
                "typeName": "media",
                "calculations": []
              },
            ... {additional input resources ommitted}
```

Annotations: "direction": "input", "name": "cell bank" — 2010-7; "typeId": "YRFty85jC7GdQMDLC", "typeName": "cell bank" — 2010-8

Fig. 20D

```
],
"outputs": [
  {
    "_id": "WgNBijy5g2BPBm32D",
    "properties": [], "components": [],
    "sample": false, "direction": "output",
    "name": "Seed Culture", "typeId": "J6BR34pxxiW9nHQYT",
    "typeName": "Seed Culture",
    "calculations": [
      {
        "variableKey": "rSggim9EfTgsmkKiX |
WgNBijy5g2BPBm32D__name__resource",
        "formula": "sn&\" Seed Culture\"",
        "variables": [
          {
            "name": "sn",
            "property": "rSggim9EfTgsmkKiX | qqXWPQhPFxHpzEwyD |
nfAX6zjDSdpj8wLGd | name",
            "plan": true,
            "key": "es4F7DeChMPmikoez",
            "direction": "INPUT"
          },
          {
            "name": "pH", "property": "rSggim9EfTgsmkKiX__name__run",
            "plan": true, "key": "64KrsGAnZ86EZ3E5Z", "direction": "STEP"
          }
        ]
      }
    ]
  }
],
"instructions": [
  {
    "text": "Inoculate MEDIA with GLYCEROL STOCK in FLASK according to target specs to create SEED CULTURE.", "media": [], "_id": "ffWfJWueaJYQtsk39"
  },
  {
    "_id": "tQMQ3psWDquyKTzwZ",
    "text": "Place in INCUBATOR SHAKER and incubate until stationary phase is reached, creating SEED CULTURE.",
    "media": []
  }
],
"description": "", "runTime": 0,
"defaultNumberOfRuns": 1,
"topGroupId": "HKBKDDTJMQt8E6cZ4",
"num": 3,
"shareable": false,
"accessibleTo": [
  {
    "_id": "7dAYzrzLqezWMtodE", "type": "team",
    "name": "Riffyn Admin Team", "role": "admin", "permissions": 268435583
  },
  {
    "_id": "utAe8z9ztjj8xuQxD", "type": "team",
    "name": "Riffyn Governance Team (Viewer)", "role": "viewer", "permissions": 1
  },
  {
    "_id": "7msKK89NWm2bAhsTr", "type": "user", "name": "personX",
    "email": "personX@riffyn.com", "role": "operator", "permissions": 65
  }
],
```

Fig. 20E

```
"public": true,
    "calculations": [
      {
        "variableKey": "rSggim9EfTgsmkKiX__name__run",
        "formula": "strain",
        "variables": [
          {
            "name": "strain",
            "property": "rSggim9EfTgsmkKiX | qqXWPQhPFxHpzEwyD | nfAX6zjDSdpj8wLGd |
name",
            "plan": true,
            "key": "ZFMns8AgnijbrAAPj",
            "direction": "INPUT"
          }
        ]
      }
    ],
    "creator": "riffyn.support",
    "created": "2018-05-14T14:56:34.562Z",
    "label": "S003",
    "modified": "2019-06-21T00:23:12.563Z",
    "version": {
      "label": "18.00",
      "hash": "db91d3bb7be793803f85a8c03f0ab51c5e4d9f75",
      "comments": "inputs changes.",
      "current": true,
      "created": "2018-08-28T15:17:47.672Z",
      "description": null
    },
    "permissions": 9,
    "org": {
      "_id": "tKjwQoAApYxGgd7ej",
      "name": "Riffyn"
    },
    "modifiedBy": {
      "_id": "system",
      "username": "system"
    },
    "calculationStale": false,
    "objectId": null,
    "parent": {
      "_id": "YnMtf7wo9xiaqPA2r",
      "version": {
        "label": "11.00",
        "hash": "021df6dfe8605df367317d0dccdd97e5280c5bd9",
        "comments": "inputs changes.",
        "current": false,
        "created": "2018-03-28T18:53:49.881Z",
        "description": null
      },
      "topGroupId": "sPT2T9i6itpNFdqBF",
      "topLevel": null,
      "parent": null
    }
  },
  ... [additional activities ommitted]
 ]
}
```

2010-12 (version block of main entry)

2010-13 (parent block)

Fig. 20F

| Process object | Process | Activity | Side | Resource | Component | Property | Unit | Specification | Value |
|---|---|---|---|---|---|---|---|---|---|
| ID | HKBKDDTJM Qt8E6cZ4 | | | | | | | | |
| Name | | Inoculate Media | | | | | | | |
| ID | | SqjmgEfTgsmk kX | input | Media 7KgEmYKYXSsK zmJoy | nitrogen source Wq4jbyhzAbLL sPog | Concentration vs4OMOFnmYdfcM zWZ | g/L gram per liter | target target | 38 38 |

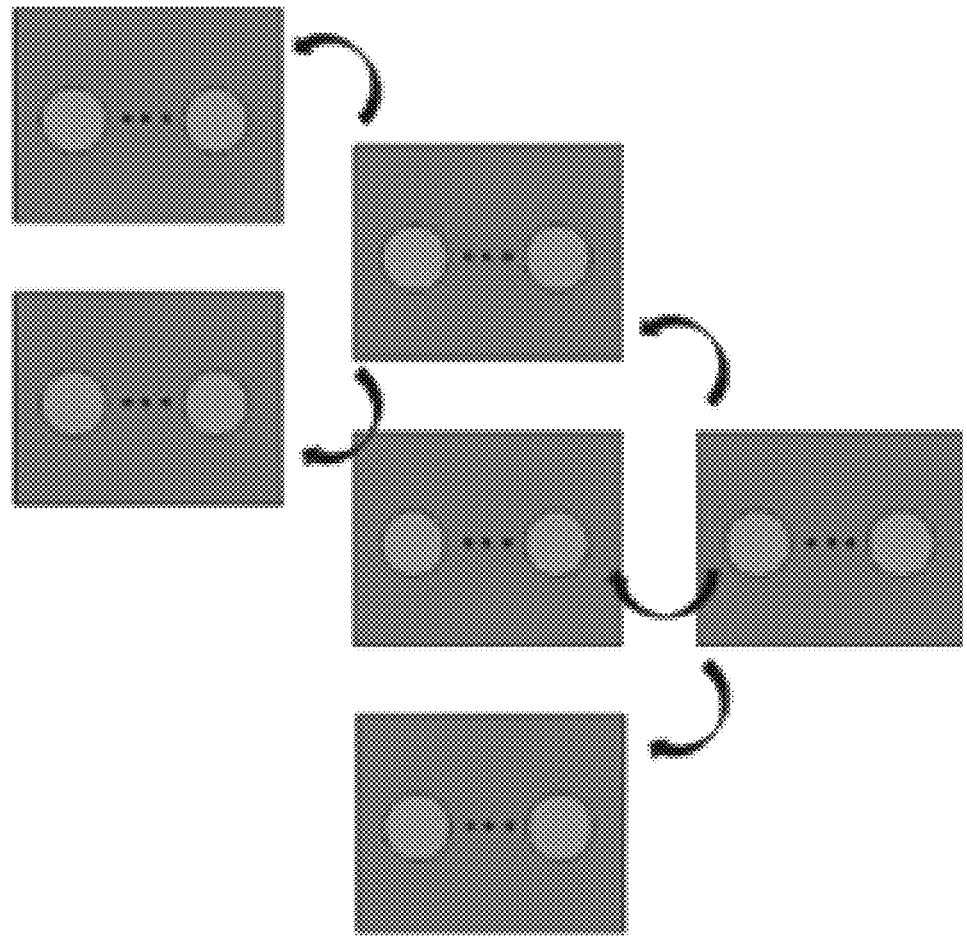
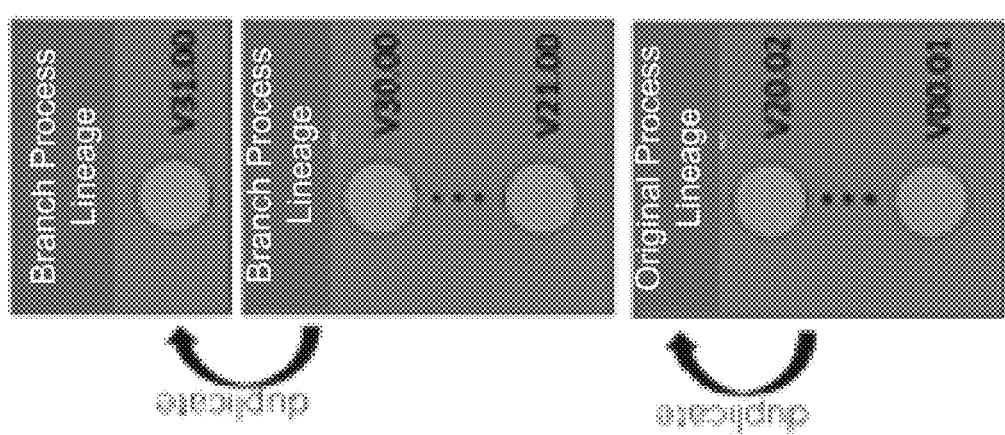
Fig. 25

| id | name | id.child | name.child | id.child.child | name.child.child | N |
|---|---|---|---|---|---|---|
| s... | Riffyn: Fermentation - Deprecated | HKBKDDTJMQt8EbCZ4 | Riffyn: Fermentation | 7Aeqb8CARiNssMXwF | Riffyn: Fermentation Example | 1 |
|  |  |  |  | BXkoGqo4Xn2gbZiuR | test 2 | 1 |
|  |  |  |  | JfCHcBwRquHR2f7yZ | Riffyn: Fermentation (tim test) | 1 |
|  |  |  |  | MWhaxhPa5KEbzFnDt | Riffyn: Fermentation (dup1) | 1 |
|  |  |  |  | h5m9nMbqnsFhurss | fermentation multiple row bug | 1 |
|  |  | bayusK8LA8ink8yi7 | Riffyn: Fermentation_Test | Missing | Missing | 1 |
|  |  | pLNd2aqqzFs7ESiWXS | jmorel changes Public Processs... | Missing | Missing | 1 |
|  |  | tnSqrobxqay4mfcBQ | Simple Fermentation | Missing | Missing | 1 |

Fig. 26

```
//Find the root for each Activity in the given list of Activities. Alternatively, if a particular Activity
//is itself a root Activity, then find the most recently created leaf Activity (among the Activities in the given list)
//for the root // For each activity object (which has the structure shown in Example 3.2.2) in the activityObj list,
// find its oldest ancestor and set it as the root for this activity. Also for each root activity,
// set the leaf as the most recently created activity at the end of a branch lineage emanating
// from the root.

For( j = 1, j <= N Items(activObj), j++,

//Set 'thisActvity' to the current activity ID thisActivity = activityIdList[j];

//Clear the temporary variables parent = Empty();
        root = Empty();
        foundRoot = 0;

//Check if this activity has a parent, and save the parent object
        //in a temporary variable. If no parent, then this activity itself
        //is the root activity. Thus set 'foundRoot' to 1

Try(parent = activObj[j]["parent"], foundRoot = 1);

//If any parent was found, iteratively walk backward through the parent object
        //(which itself may have parents) until the root is found. The root is the
        //activity with no parents.

While(foundRoot == 0 & Type(parent) == "Associative Array" & !IsEmpty(parent),

//Set it as the root (temporarily, unless this turns out to be
                //the actual root in which case it will remain the root)

root = parent;

//Check for ancestors. If none is found then this is the root.
                //Otherwise loop back through to set the parent of this activity
                //as the root, and check if the parent has ancestors.

Try(parent = parent["parent"], foundRoot = 1);

```
//Save the root into an object that lists all activities by their ID
//And has a 'root' attribute associated with each activity ID.
//Also save the current activity ID as the 'leaf' for this activity ID
//Here the leaf is the newest version of this activity in the genealogical
//tree stemming from this root.

If( !IsEmpty(root),

//Allocate the Associative Array to save the root of this activity

If( IsEmpty( Try(activLineage[thisActivity], Empty() ) ),
                activLineage[thisActivity] = [ => ];
        );

//Save the root ID as the root assocaited with this activity ID activLineage[thisActivity]["root"] = root["_id"];

//Save the most recent activity as the leaf of the root activity
        //if it is the newest activity examined (via the outer-most for loop)
        //for this root's genealogy If( Is Empty( Try( activLineage[ root["_id"] ], Empty() ) )
                | (
                In Format( Words( activObj[j]["created"] )[1], "yyyy-mm-ddThh:mm:ss" )
                > In Format( Words( activLineage[ root["_id"] ]["leafCreated"] )[1], "yyyy-mm-ddThh:mm:ss")
                ), activLineage[ root["_id"] ] = [ => ];
                activLineage[ root["_id"] ]["leaf"] = thisActivity;
                activLineage[ root["_id"] ]["leafCreated"] = activObj[j]["created"];

```
// Clear the variable that will hold the process lineage (ancestor and child) lists
// for each given process ID procLineage = Empty();

// Define recursive function used for inserting parents into the ancestor list
// and their version lable and creation date insertAncestors = Function( {thisProcessId, thisParentObj}, {Default Local}, // Add the given parent object ID into the ancestor list for the current process, along with its version
    // and creation date If(!IsEmpty( Try( thisParentObj["_id"] ) ),
      Insert Into( procLineage[thisProcessId]["ancestorId"], Try( thisParentObj["_id"], "") );
      Insert Into( procLineage[thisProcessId]["ancestorVer"], Try( thisParentObj["version"]["label"] ) ) );
      Insert Into( procLineage[thisProcessId]["ancestorCreated"], Try( thisParentObj["version"]["created"] ) );
    );

//recursively add additional ancestors if they exist
    Try( insertAncestors( thisProcessId, thisParentObj["parent"] ) );

Return;
);

// Build the parent and child lists on each process in the Full Process List
procLineage = [ => ];

For( i = 1, i <= N Items( procList["data"] ), i++,

//get the process ID for the current process index
    thisProcessId = procList["data"][i]["_id"];

//allocate the object (Associative Array) for this process
    If( IsEmpty( Try( procLineage[thisProcessId], Empty() ) ), allocateProcLineageItem(thisProcessId);

);
    //add the ancestors list
    Try( insertAncestors( thisProcessId, procList["data"][i]["parent"] ) );

//save the root (last item from the ancestors list)
    nAncestors = N Items( procLineage[thisProcessId]["ancestorId"] );
    Try( procLineage[thisProcessId]["root"] = procLineage[thisProcessId]["ancestorId"][nAncestors] );

//If there is no ancestor, it is the root. Set root to self.
    If( IsEmpty( procLineage[thisProcessId]["root"] ),
            procLineage[thisProcessId]["root"] = thisProcessId;
    );

//add this process ID to the child list of its parent

Try( Insert Into (procLineage[ procList["data"][i]["parent"]["_id"] ]["childId"], thisProcessId) );
```

Fig. 29

```
// Recursive function for finding all leaves of a process
// In this function the 'parentProcessId' is the process for which
// all the leaves are being searched. 'thisProcessId' is the process
// which is the current focus of the recursive search. At the start
// of the recursive search, the both IDs are set equal to the same ID
//
// procLineage is the key:value list of all process IDs (the keys) and
// the geneological information (ancestors, descendents and other
// information) related to that process.

findLeaves = Function({thisProcessId, parentProcessId}, {Default Local},

// First find all the children, if any, of the current process children = procLineage[thisProcessId]["childId"];
    nChildren = N Items(children);

If( nChildren == 0,

// If there are no children, then this is the last (terminal) process
        // in a branch lineage. Thus it is a leaf. Save 'thisProcessId' as
        // one of the leaves for the 'parentProcessId'

Insert Into( procLineage[parentProcessId]["leaves"], thisProcessId );
        Insert Into( procLineage[parentProcessId]["leavesCreated"],
                            procLineage[thisProcessId]["created"] );
        `
        // If there are some children, then recursively check them to see if
        // they are leaves (in which case add them to the procLineage list
        // for the present process), or if they are not leaves, then recursively
        // check their children for leaves.

For( i = 1, i <= nChildren, i++, findLeaves(children[i], parentProcessId);

);
    );

Return;
);
```

Fig. 30

```
// Build the descendant process family tree for each process

// First get a list of all the process IDs in the lineage object
// and loop through each one to build its descendant family tree.
// The descendant tree will be stored in the "processFamily" attribute.

allProcIDs = procLineage << Get Keys;
For( i = 1, i <= N Items( allProcIDs ), i++, //set the process ID for the current process index thisProcessId = allProcIDs[i];

//get all ancestor and descendent processes of this process
    //by combining the full ancestor lists from each leaf of this process
    processFamily = {};
    For( j = 1, j <= N Items( procLineage[thisProcessId]["leaves"] ), j++,
        Insert Into( processFamily, procLineage[
procLineage[thisProcessId]["leaves"][j] ]["ancestorId"] );
    );

//append all the retrieved ancestor processes to the list of leaves of the tree
    //and reduce to the list of process IDs to the unique items
    procLineage[thisProcessId]["processFamily"]
        = Unique List Items( procLineage[thisProcessId]["leaves"] ||
processFamily );

//remove the ancestors of this process from the family set so that it only
    //contains itself and its descendents
    For( j = 1, j <= N items(procLineage[thisProcessId]["ancestorId"]), j++,
        Try(
            Remove From( procLineage[thisProcessId]["processFamily"],
                Loc( procLineage[thisProcessId]["processFamily"],
                    procLineage[thisProcessId]["ancestorId"][j] )[1] );
        );
    );

```
//In this example, we find the matching and differing attributes of
//two processes that are described using a list of positionally-encoded
//attributes. Those lists are 'procPropHdrs[1]' for the first process
//and 'procPropHdrs[2]' for the second process.

//Look for matching properties.
//First initialize a 'matches' variable which contains a list of indexes for
//the matching strings in the process attribute lists matches = {{},{}};

//Loop through every attribute string in the first process 'procPropHdrs[1]'

For( matchIdx1 = 1, matchIdx1 <= N Items( procPropHdrs[1] ), matchIdx1++,
        //Search every string in 'procPropHdrs[2]' for a matching string
        //using the 'Contains' function matchIdx2 = Contains( procPropHdrs[2], procPropHdrs[1][matchIdx1] );
        //If a match is found, insert the list indexes of the matching strings
        //into the matches variable
        If( matchIdx2,
                Insert Into( matches[1], matchIdx1 );
                Insert Into( matches[2], matchIdx2 );
        );
);

//Now find the differences between the two processes - which is the list
//of all unmatched strings in the process attributes lists
//First enumerate two lists, each a number sequence with all the indexes
//of all strings in the process attribute list diffs = Eval List(
        {
                As List( Transpose( 1::N Items( procPropHdrs[1] ) ) );
                ,
                As List( Transpose( 1::N Items( procPropHdrs[2] ) ) );
        }
);
//Now remove the indexes in each list corresponding to strings that have
//matches between the two processes. Anything remaining is the index
//for a differing attribute
diffs[1] = Remove( diffs[1], matches[1] );
diffs[2] = Remove( diffs[2], matches[2] );

//Retrieve the lists of process attribute strings corresponding to the
//difference indexes. Then combine the string lists into one difference list
tmp1 = Try( procPropHdrs[1][ diffs[1] ], {} );
tmp2 = Try( procPropHdrs[2][ diffs[2] ], {} );

//This is the combined list
differenceList = Insert( tmp1, tmp2 );
```

Fig. 32

Newer process [ Modified: 2019-08-02 00:08:15 ]
Riffyn: Fermentation (dup1)

Older process [ Modified: 2019-03-14 06:28:09 ]
Riffyn: Fermentation

▲ Summary of changes reported below 5 properties were added or updated
2 properties were deleted or updated
86 properties were unchanged show

Changes in the newer process compared to the older process

| stepName | direction | resourceName | componentName | propertyName | type | unit | value | modification | Mod N |
|---|---|---|---|---|---|---|---|---|---|
| Batch fermentation | output | cell culture | | time (duration) | target | hr | . | old unit | |
| | | | | | | min | . | new unit | |
| Inoculate Media | output | antibiotic | | | | | | added | |
| | | media | | | | | | added | |
| Pellet and Wash Cells | input | centrifuge | | | | | | added | |
| | | | | temperature | tst | °C | 3 | old value | |
| | | | | time (duration) | target | min | 5 | old value | |
| | | | | | | | 6 | new value | |

Fig. 33

| stepName | direction | resourceName | componentName | propertyName | type | unit | value | modification |
|---|---|---|---|---|---|---|---|---|
| Batch fermentation | input | base solution | | Concentration* | target | M | 2 | |
| | | | | type | valid-options | | potassium hydroxide | |
| | | bioreactor | | agitation speed | lsl | RPM | 600 | |
| | | | | | target | RPM | 800 | |
| | | | | | usl | RPM | 1000 | |
| | | | | temperature | target | °C | | |
| | | | | Volume | target | L | 3 | |
| | | inlet air | carbon dioxide | concentration | target | %(v/v) | | |
| | | | diatomic oxygen | concentration | target | %(v/v) | | |
| | | media | | pH | target | pH | SM-urea | |
| | | | | type | valid-options | | | |
| | | | | volume | target | L | 1 | |
| | | | antifoam | Concentration* | target | g/L | 0.3 | |
| | | | | type | valid-options | | Pluronic PE 6100 | |
| | | | carbon source | Concentration* | target | g/L | 20 | |
| | | | | type | valid-options | | glucose | |
| | | | nitrogen source | Concentration* | target | mM | 38 | |
| | | | | type | valid-options | | urea | |
| | | Seed Culture | | volume | target | mL | 50 | |
| | output | cell culture | | pH | lsl | pH | 4.8 | |
| | | | | | usl | pH | 5.5 | |
| | | | | time (duration) | target | hr | | |
| | | | | | | min | | add unit<br>new unit |
| | | | Dissolved Oxygen | concentration | target | %(v/v) | | |
| | | exhaust gas | carbon dioxide | concentration | target | | | |

Fig. 34A

| stepName | direction | resourceName | componentName | propertyName | type | unit | value | modification |
|---|---|---|---|---|---|---|---|---|
| Biomass Dry Weight Analysis | input | analytical balance | diatomic oxygen | concentration | target | %(v/v) | | |
| | | cell culture | | volume | target | mL | 10 | |
| | | filter | | manufacturer | valid-options | | Gelman Sciences | |
| | | | | mass | lsl | g | 0.07 | |
| | | | | mass | usl | g | 0.075 | |
| | | | | pore size | target | μm | 0.45 | |
| | | | | type | valid-options | | nitrocellulose | |
| | | incubator | | temperature | target | °C | 80 | |
| | | | | time (duration) | lsl | hr | 12 | |
| | | | | time (duration) | usl | hr | 20 | |
| | | microwave oven | | power | target | W | 360 | |
| | | | | time (duration) | target | min | 20 | |
| | | water | | type | valid-options | | deionized | |
| | output | filter | | mass | target | g | | |
| | | | biomass | mass | lsl | g | 0.04 | |
| | | | | mass | usl | g | 0.07 | |
| Data Analysis | input | unassigned | | | | | | |
| | output | unassigned | | | | | | |
| HPLC Analysis | input | cell culture | glucose | initial concentration | target | mM | | |
| | | centrifuge | | speed | target | RCF (g) | 48000 | |
| | | | | temperature | target | °C | 4 | |

Fig. 34B

| stepName | direction | resourceName | componentName | propertyName | type | unit | value | modification |
|---|---|---|---|---|---|---|---|---|
| | | HPLC system | | time (duration) | target | min | 20 | |
| | | | | Flow Rate | target | mL/min | 0.6 | |
| | | | column | temperature | target | °C | 60 | |
| | | | | type | valid-options | | Aminex HPX-87H ion exchange | |
| | | | UV detector | wavelength | target | nm | 214 | |
| | output | mobile phase | sulfuric acid | concentration | target | mM | 5 | |
| | | eluate | acetate | concentration | target | mM | 4 | |
| | | | citrate | concentration | usl | mM | | |
| | | | ethanol | concentration | target | mM | 50 | |
| | | | glucose | concentration | usl | mM | | |
| | | | glycerol | concentration | target | mM | 5 | |
| | | | lactate | concentration | lsl | mM | 7 | |
| | | | pyruvate | concentration | usl | mM | 0.4 | |
| | | | succinate | concentration | target | mM | 25 | |
| | | | | yield | lsl | % | | |
| Inoculate Media | input | cell bank | | lot number | valid-options | | | |
| | | | | volume | lsl | µL | 190 | |
| | | | | | target | µL | 200 | |
| | | | | | usl | µL | 210 | |
| | | | Strain | description | valid-options | | | |
| | | | | name | valid-options | | | |
| | | | | organism | valid-options | | | |
| | | | | parent strain | valid-options | | | |
| | | incubator shaker | | speed | target | RPM | 200 | |
| | | | | temperature | lsl | °C | 29 | |
| | | | | | target | °C | 30 | |

Fig. 34C

| stepName | direction | resourceName | componentName | propertyName | type | unit | value | modification |
|---|---|---|---|---|---|---|---|---|
|  |  | media |  |  | tsl | °C | 31 |  |
|  |  |  |  | pH | target |  |  |  |
|  |  |  |  | type | valid-options |  | SM-urea |  |
|  |  |  |  | volume | target | mL | 100 |  |
|  |  |  | carbon source | Concentration* | target | g/L | 20 |  |
|  |  |  |  | type | valid-options |  | glucose | added |
|  |  |  | nitrogen source | Concentration* | target | mM | 38 | added |
|  |  |  |  | type | valid-options |  | urea |  |
| Measure OD | output | antibiotic media |  |  |  |  |  |  |
|  | input | Seed Culture |  |  |  |  |  |  |
|  |  | cell culture |  |  |  |  |  |  |
|  |  | spectrophotometer |  | wavelength | target | nm | 660 |  |
|  | output | cell culture |  | optical density (scattering) | tsl | AU | 10 |  |
|  |  |  |  |  | tsl | AU | 25 |  |
| Pellet and Wash Cells | input | centrifuge |  | speed | target | RCF (g) | 3000 |  |
|  |  |  |  | temperature | tsl | °C | 3 |  |
|  |  |  |  |  | target | °C | 4 | added |
|  |  |  |  | time (duration) | target | min | 5 | old value |
|  |  |  |  |  |  |  | 6 | new value |
|  |  | Seed Culture |  | type | valid-options |  | demineralized |  |
|  |  | water |  | volume/wash | target | mL | 100 |  |
|  | output | New Seed Culture |  | volume | target | mL | 100 |  |
| Take Samples | input | cell culture |  |  |  |  |  |  |
|  | output | cell culture |  | time (duration) | target | hr |  |  |

Fig. 34D

SYSTEMS AND METHODS FOR PROCESS DESIGN INCLUDING INHERITANCE

CROSS REFERENCE TO RELATED PATENT APPLICATION

This application claims priority to U.S. Provisional Patent Application No. 62/892,134, entitled "Systems and Methods for Process Design Including Inheritance," filed Aug. 27, 2019, which is hereby incorporated by reference.

TECHNICAL FIELD

The present disclosure relates generally to systems and methods for process design and analysis of processes that result in analytical information or products.

BACKGROUND

In process-based industries—including chemical, biotech, pharmaceutical, materials, food, agriculture, pulp and paper industries—new product development rests upon the invention and improvement of novel characterization (measurement), testing and manufacturing processes. Such processes support work that is conducted in all phases of the product lifecycle including research, discovery, development, manufacturing and testing of new products. The processes used or developed at each phase of the product lifecycle are often closely related to, or even predicated upon the processes created in another phase—that is, they are related to each other in a genealogical network whereby one child process is derived from one or more parent processes, each child incorporating elements and attributes of the parent processes while altering and improving upon other elements and attributes.

The decisions to improve upon one process are based on the data collected about the performance of that process and related processes, and knowledge embedded in the design of processes, such knowledge reflecting the aggregation of prior analyses, knowledge and decisions. Thus, processes are constantly evolving as more data is collected and more understanding is obtained about their performance and quality parameters. For instance, additional process steps are added or removed and existing process steps are modified. For instance, equipment changes are made, batch lots are changed, and process conditions are modified. Moreover, the present state of a process, and the history of changes made to predecessor processes represent a store of acquired knowledge about what, how and why a process evolved to its current state. Such knowledge is important for multiple uses including future decision-making, risk assessment, and submission of applications to regulatory agencies for approval of new products and their manufacturing, characterization and testing processes.

The phases of a product lifecycle are often conducted by teams of people working at one or more physical locations using similar or differing facilities, equipment and materials. As such, a particular process is often be transferred for use in multiple locations or environments, or by multiple groups of people with varying constraints in physical environment or capabilities. In this transfer activity, it may be necessary to modify a base process into related but differing forms— each form of the process intended to achieve the same final outcome using varying facilities, equipment, people or materials. In such situations, it is desirable to characterize and monitor the differences between the different variants of a base process, and their impact on process performance and product attributes. Such information may be used either to improve on the base process, or take corrective and preventative actions against variants of a process that are underperforming or a predicted to underperform.

In summary, the development lifecycle for new products in process-based industries demands several capabilities for identifying, tracking, tracing, comparing and assessing the impact of processes and their changes. Such capabilities are used by the designers and operators of characterization, testing and manufacturing processes to make decisions on how to improve processes, how to operate processes, how to apply process control strategies to manufacturing processes, to develop risk assessment reports and mitigation plans, and to develop reports for submission of information packages to regulatory agencies.

Thus, given the above background, what is needed in the art are improved systems and methods for process design and analysis of processes.

SUMMARY

The disclosed embodiments address the need in the art for improved systems and methods for process design and analysis. Such capabilities can be used by the designers and operators of research, characterization, testing and manufacturing processes to make decisions on how to improve processes, how to operate processes, how to apply process control strategies to research, development, and manufacturing processes, to develop risk assessment reports and mitigation plans, and to develop reports for submission of information packages to regulatory agencies.

The present disclosure provides support for the demands for identifying, tracking, tracing, comparing and assessing the impact of processes and their changes which made in the development lifecycle for new products in process-based industries. Collectively these capabilities are referred to herein as "process versioning." In some embodiments, this support includes a mechanism to define, store and modify the state of a process and its full set of specifications at a given stage of the development cycle, and/or at a particular point in time, a mechanism to store, retrieve and restore past states ("versions") of a process and its full set of specifications, a mechanism to store parent-child relationships between process versions ("lineage") and to construct genealogical and change histories from these lineages, a mechanism to compare versions of a process and identify differences between them, a mechanism to combine multiple versions of a process, and selected differences, into a derived child process, and a mechanism to combine observed product and process operational and measurement data from multiple process versions such that the effect of process changes can be assessed using that observational data. Such capabilities are used by the designers and operators of characterization, testing and manufacturing processes to make decisions on how to improve processes, how to operate processes, how to apply process control strategies to manufacturing processes, to develop risk assessment reports and mitigation plans, and to develop reports for submission of information packages to regulatory agencies.

To this end, one aspect of the present disclosure provides a method for analyzing product development information in which one or more collections of process objects are obtained. Each respective collection of process objects in the one or more collections of process objects is associated with a process in one or more processes for making one or more products and comprises a corresponding one or more process objects. Each respective process object in the corresponding one or more process objects comprises (i) a corresponding process object unique identifier, (ii) a corresponding superior/inferior attribute reference, and (iii) a corresponding heritage indicator.

The corresponding superior/inferior attribute references another process object in the one or more process objects or makes a null reference. In some embodiments, a process hypergraph is defined by such superior/inferior attribute references. The process objects themselves are the elements of the graph (e.g., nodes, edges, resources, properties, etc.), and the superior/inferior references describe which elements of the graph are connected to or parts of which other elements.

The corresponding heritage indicator comprises (a) a corresponding unique class identifier that associates the respective process object with a particular object class in a plurality of object classes combined with an object version identifier from a plurality of object versions of the respective process object, or (b) a corresponding unique class identifier that associates the respective process object with a particular object class in the plurality of object classes combined with a genealogical network identifier that identifies a respective instance of the particular object class in a genealogical network of related instances of the particular object class. Heritage indicators serve the purposes of defining the versions and (if any) a version tree. The version tree is a hypergraph, but it is a different graph than the process hypergraph.

In the disclosed method the product development information associated with each collection of process objects in the one or more collections of process objects is analyzed to determine a relationship between a variance in the one or more processes for making one or more products in the one or more collections of process objects and a variance in outcomes or characteristics of one or more products made by the one or more processes.

In some embodiments, the one or more collections of process objects is in digital form and has a size that exceeds one megabyte, ten megabytes, 100 megabytes, one gigabyte, or 100 gigabytes.

In some embodiments, the one or more collections of process objects is a single collection of process objects, two or more collections of process objections, 10 or more collections of process objects, or 1000 or more collections of process objects.

In some embodiments a collection of process objects in the one or more collections of process objects consists of a single process object. In some embodiments a collection of process objects in the one or more collections of process objects comprises two or more process objections, three or more process objects, five or more process objects, ten or more process objects, 1000 or more process objects, or one million or more process objects.

In some embodiments, each collection of process objects in the one or more collections of process objects comprises a process object version identifier.

In some embodiments, a first subset of process objects in the corresponding one or more process objects of a respective collection of process objects defines a hypergraph representing the corresponding process, and one or more process objects in the first subset of process objects represents either a node or an edge of the corresponding hypergraph. In some embodiments, the corresponding hypergraph comprises a corresponding one or more nodes connected by one or more edges.

In some embodiments, a process object in the respective collection of process objects further comprises one or more data attributes.

In some embodiments, the respective collection of process objects is a plurality of process objects and each process object in the respective collection of process objects further comprises one or more data attributes.

In some embodiments, a first data attribute in the one or more data attributes is a name, a description, a comment, a creation date, a modification date, a size indication, an owner, a creator, an access privilege, a purity of matter, a quantity of matter, a temperature of matter, a pressure of matter, a melting point of matter, or a property of matter. In some such embodiments, the first data attribute together with a value for the first data attribute form a key:value pair. In some such embodiments, the first data attribute further comprises a unique identifier for the key:value pair.

In some embodiments, the one or more collections of process objects is a plurality of collections of process objects and the variance in product development is exhibited by the one or more data attributes across each respective collection of process objects in the plurality of collections of process objects.

In some embodiments, the respective collection of process objects is encoded as a graph, one or more relational tables, one or more tables, one or more object structures, a JSON objects using the corresponding process object unique identifier, or a list of positional encodings.

In some embodiments, the one or more collections of process objects comprises a first collection of process objects and a second collection of process objects, and the analyzing product development information associated with each collection of process objects in the one or more collections of process objects comprises applying one or more mapping functions to the collection of process objects to form a first alternative encoding, applying one or more mapping functions to the second collection of process objects to form a second alternative encoding, and subjecting the first alternative encoding and the second alternative encoding to a comparison algorithm in order to compare a similarity or a difference between the first collection of process object and the second collection of process objects. In some such embodiments, the first alternative encoding is a first symbol sequence, a first list, a first coordinate system, a first number, a first graph, a first numeric representation, a first positional encoding, or a first symbolic representation, and the second alternative encoding is a second symbol sequence, a second list, a second coordinate system, a second number, a second graph, a second numeric representation, a second positional encoding, or a second symbolic representation.

In some embodiments, a mapping function in the one or more mapping functions comprises identity mapping, serialization, transformation, hashing, counting, an arithmetic operation, a transcendental function, a substring query based on position or pattern match, application of a context-free grammar, or a semantic encoding.

In some embodiments, the comparison algorithm is an operator. In some such embodiments, the operator is greater than, less than, equal to, not equal to, order of.

In some embodiments, the comparison algorithm is a formula, a metric, a series of calculations, a mutual information algorithm, a correlation, a rank correlation, a Hamming distance, a Euclidean distance, an angle of separation, a pairwise character alignment and match, a dynamic programming algorithm, a sequence alignment algorithm, a Needleman-Wunsch algorithm, a Smith-Waterman algorithm, a heuristic method, or a weighted distance algorithm.

In some embodiments, a first process associated with a first collection of process objects in the one or more collections of process objects is a first version of the first process, and the method further comprises changing the first collection of process objects to a second collection of process objects through a sequence of change events, where the second collection of process object is associated with a second version of the first process, and recording a change event history that reflects the sequence of change events, where each respective change event in the sequence of change events comprises the process objects in the first collection of process objects to which the respective change event was applied. In some embodiments, a change event in the sequence of change events includes addition or removal of an attribute.

In some embodiments, the first collection of process objects and the second collection of process objects are part of a genealogical network, and the method further comprises reviewing the sequence of change events to determine a change that has been made to change the first collection of process objects into the second collection of process objects.

In some embodiments, the method further comprises reversing or repeating one or more change events in the sequence of change events.

In some embodiments, the version identifier is a descriptor with an ordered or unordered set that is associated only with one version of the process object. In some embodiments, the descriptor is a label, symbol, string of symbols, number, shape, color, absolute or relative position in a sequence or coordinate system.

Another aspect of the present disclosure provides a computer system, comprising one or more processors, memory, and one or more programs stored in the memory for execution by the one or more processors. The one or more programs comprise instructions for obtaining one or more collections of process objects, where each respective collection of process objects in the one or more collections of process objects is associated with a process in one or more processes for making one or more products and comprises a corresponding one or more process objects. Each respective process object in the corresponding one or more process objects comprises (i) a corresponding process object unique identifier, (ii) a corresponding superior/inferior attribute reference, and (iii) a corresponding heritage indicator. The corresponding superior/inferior attribute references another process object in the one or more process objects or makes a null reference and the corresponding heritage indicator comprises (a) a corresponding unique class identifier that associates the respective process object with a particular object class in a plurality of object classes combined with an object version identifier from a plurality of object versions of the respective process object, or (b) a corresponding unique class identifier that associates the respective process object with a particular object class in the plurality of object classes combined with a genealogical network identifier that identifies a respective instance of the particular object class in a genealogical network of related instances of the particular object class. Product development information associated with each collection of process objects in the one or more collections of process objects is analyzed to determine a relationship between a variance in the one or more processes for making one or more products in the one or more collections of process objects and a variance in outcomes or characteristics of one or more products made by the one or more processes.

In some embodiments, the computer system is in the form of a single computer system, a plurality of networked computer systems, or a virtual machine.

Another aspect of the present disclosure provides a non-transitory computer readable storage medium for analyzing product development information. The non-transitory computer readable storage medium stores instructions, which when executed by a first device, perform a method that comprises obtaining one or more collections of process objects, where each respective collection of process objects in the one or more collections of process objects is associated with a process in one or more processes for making one or more products and comprises a corresponding one or more process objects. Each respective process object in the corresponding one or more process objects comprises (i) a corresponding process object unique identifier, (ii) a corresponding superior/inferior attribute reference, and (iii) a corresponding heritage indicator. The corresponding superior/inferior attribute references another process object in the one or more process objects or makes a null reference and the corresponding heritage indicator comprises (a) a corresponding unique class identifier that associates the respective process object with a particular object class in a plurality of object classes combined with an object version identifier from a plurality of object versions of the respective process object, or (b) a corresponding unique class identifier that associates the respective process object with a particular object class in the plurality of object classes combined with a genealogical network identifier that identifies a respective instance of the particular object class in a genealogical network of related instances of the particular object class. Product development information associated with each collection of process objects in the one or more collections of process objects is analyzed to determine a relationship between a variance in the one or more processes for making one or more products in the one or more collections of process objects and a variance in outcomes or characteristics of one or more products made by the one or more processes.

Another aspect of the present disclosure provides a method for analyzing product development information. The method comprises storing a plurality of attribute records defining a version of a corresponding process in one or more processes for making one or more products. Each respective attribute record in at least a subset of the plurality of attribute records comprises (i) a corresponding unique identifier, (ii) a superior/inferior attribute reference, and (iii) a heritage indicator.

A superior/inferior attribute reference of a second attribute record references a corresponding unique identifier of a first attribute record in the plurality of attribute records that is different than the second attribute record, thereby indicating that the second attribute record is a nested attribute record of the first attribute record. A heritage indicator of the second attribute record references (i) the corresponding unique identifier of a third attribute record in the plurality of attribute records, that is different than the second attribute record, thereby indicating that the third attribute record is an ancestor attribute record of the second attribute record, or (ii) a unique identifier of a first attribute class record that identifies an attribute class record, in a plurality of attribute class records, to which the second attribute record belongs as well as a version identifier that identifies the version of the second attribute record.

The plurality of attribute records is used to analyze product development information associated with each attribute record in the plurality of records to determine a relationship between variance in product development across the plurality of attribute records and variance in outcomes or characteristics of one or more products made by the one or more processes.

In some embodiments, each respective attribute record of one or more respective attribute records in the plurality of attribute records further comprises a corresponding attribute value that defines a state of the respective attribute record.

In some embodiments, each attribute class record in the plurality of attribute class records represents a different class.

In some embodiments, the heritage indicator of the second attribute record references the unique identifier of the first attribute class record that identifies an attribute class record in a plurality of attribute class records to which the second attribute record belongs and the method further comprises storing the plurality of attribute class records.

In some embodiments, the heritage indicator of the second attribute record is an attribute class record identifier containing a unique identifier of the first attribute class record, in the plurality of attribute class records, thereby identifying the attribute class record to which the second attribute record belongs. In some such embodiments, an attribute class record in the plurality of attribute class records, including the first attribute class record, comprises a unique identifier, a class name, an attribute class type, an attribute class description, or any combination thereof.

In some embodiments, a respective attribute class record in the plurality of attribute class records comprises an attribute class type that is one a name, a description, a comment, a creation date, a modification date, a size indication, an owner, a creator, an access privilege, a purity of matter, a quantity of matter, a temperature of matter, a pressure of matter, a melting point of matter, or a property of matter.

In some embodiments, the plurality of attribute records is in digital form and has a size that exceeds one megabyte, ten megabytes, 100 megabytes, one gigabyte, or 100 gigabytes.

In some embodiments, the plurality of attribute records is two attribute records, 10 or more attribute records, or 1000 or more attribute records.

In some embodiments a collection of process objects in the one or more collections of process objects consists of a single process object. In some embodiments a collection of process objects in the one or more collections of process objects comprises two or more process objections, three or more process objects, five or more process objects, ten or more process objects, 1000 or more process objects, or one million or more process objects.

In some embodiments, the method further comprises using the heritage indicator of the second attribute record to assign the second attribute record to a particular node in a hypergraph, a particular edge in a hypergraph, resource type, a comment, a creation date, a modification date, an owner, a creator, an input property, an output property, an input specification of an input property, or an output specification of an output property.

In some embodiments a hypergraph has a single node. In some embodiments a hypergraph comprises two nodes, three nodes, four nodes, more than 10 nodes, more than 1000 nodes or more than ten thousand nodes.

In some embodiments, an attribute record in the plurality of attribute records further comprises an attribute record version identifier.

In some embodiments, a respective attribute record in the plurality of attribute records further comprises a top attribute indication that specifies whether or not the respective attribute record is a root attribute record from which each respective attribute record in the plurality of attribute records is directly or is indirectly nested through its corresponding superior/inferior attribute reference.

In some embodiments, the heritage indicator of the second attribute record comprises a reference to the corresponding unique identifier of the third attribute record thereby indicating that the third attribute record is an ancestor attribute record of the second attribute record.

In some embodiments, the heritage indicator of the second attribute record comprises a reference to a unique identifier of the first attribute class record, thereby identifying a class, in a plurality of classes, to which the second attribute record belongs.

In some embodiments, the using the plurality of attribute records to analyze product development information comprises using two or more attribute records in the plurality of attribute records to define a hypergraph for a first process in the one or more processes, where the hypergraph comprises a one or more nodes connected by one or more edges, a first node in the one or more nodes is associated with at least one resource input or at least one resource output, and each respective edge in the one or more edges is associated with a corresponding resource output of a source node in the one or more nodes and also is associated with at least a corresponding resource input of at least one destination node in the one or more nodes. In such embodiments, the method further comprises assigning a first attribute record in the two or more attribute records is assigned to, a particular node in the one or more nodes, a particular edge in the one or more edges, a resource type associated with a resource output in the at least one resource output of the first node, an output property associated with a resource output in the at least one resource output of the first node, an input specification of an input property of a resource input in the at least one resource input of the first node, an output specification of an output property of a resource output in the at least one resource output of the first node, an obtained value of an input property of a resource input in the at least one resource input of the first node, or an obtained value of an output property of a resource output in the at least one resource output of the first node. In some such embodiments, the plurality of attribute records includes attribute records for a single process, two or more processes, five or more processes, or 100 or more processes. In some embodiments, the one or more nodes comprises two or more nodes, three or more nodes, five or more nodes, 10 or more nodes, or 100 or more nodes. In some such embodiments, each respective node in the plurality of nodes represents a respective stage in the first process.

In some embodiments, the at least one output of the first node is a resource output, or the resource input in the at least one resource input of the first node is a resource input.

In some embodiments, an edge in the one or more edges specifies that a first set of resource outputs of a node in the one or more nodes is included in a first set of resource inputs of at least one other node in the one or more nodes.

In some embodiments each process run in a plurality of process runs comprises (i) an identification of a version for the corresponding process, (ii) values for the first set of resource outputs and (iii) values for the first set of resource inputs.

In some embodiments, a resource input in the at least one resource input is associated with a single input property.

In some embodiments, the single input property is bounded by a specification limit.

In some embodiments, the single input property is an identifier, a viscosity value, a purity value, a composition value, a temperature value, a weight value, a mass value, a volume value, or a batch identifier of the single input.

In some embodiments, the resource input in the at least one resource input is associated with a plurality of input properties.

In some embodiments, a resource output in the at least one resource output is associated with a single output property.

In some embodiments, the single output property is bounded by a specification limit.

In some embodiments, the single output property is an identifier, a viscosity value, a purity value, a composition value, a temperature value, a weight value, a mass value, a volume value, or a batch identifier of the output.

In some embodiments, a resource output in the at least one resource output is associated with a plurality of output properties.

In some embodiments, a resource input in the at least one resource input or a resource output in the at least one resource output defines a process condition. In some such embodiments, the process condition comprises a temperature, an exposure time, a mixing time, a type of equipment, or a batch identifier.

In some embodiments, the heritage indicator of the first attribute record specifies an attribute class record in the plurality of attribute class records that is a process class, the heritage indicator of the second attribute record specifies an attribute class record in the plurality of attribute class records that is an edge class, the superior/inferior attribute reference of a fourth attribute record in the plurality of attribute records references the second attribute record thereby indicating that the fourth attribute record is a nested attribute record of the second attribute record, the heritage indicator of the fourth attribute record specifies an attribute class record in the plurality of attribute class records that is a source resource class, the superior/inferior attribute reference of a fifth attribute record in the plurality of attribute records references the second attribute record thereby indicating that the fifth attribute record is a nested attribute record of the second attribute record, and the heritage indicator of the fifth attribute record specifies an attribute class record in the plurality of attribute class records that is a destination resource class.

In some embodiments, the further comprises using the first process to perform a plurality of process runs, where each respective process run in the plurality of process runs (i) is constrained by a corresponding process run graph in a plurality of process run graphs that is all or a portion of an instance of the hypergraph and (ii) creates one or more value instances for at least one input or at least one output of at least one node in the corresponding process run graph. In some such embodiments, the using the first process to perform a plurality of process runs obtains values of at least one input property of a resource input in a respective set of resource inputs for a first node in each corresponding process run graph in the plurality of process run graphs or at least one output property of a resource output in a respective set of resource outputs of a second node in each corresponding process run graph in the plurality of process run graphs received by a first device from an instrument that measured the obtained values or a computer associated with the instrument.

In some embodiments, the using the plurality of attribute records to analyze product development information comprises root cause analysis, correlation analysis, or a feature selection technique.

In some embodiments, the using the plurality of attribute records to analyze product development information determines a source of error in a version of a process in the one or more processes. In some such embodiments, the source of error comprises measurement error.

In some embodiments, the using the plurality of attribute records to analyze information comprises a statistical process control analysis of a version of a process in the one or more processes.

In some embodiments, the heritage indicator of the second attribute record references the unique identifiers of two or more attribute records, that are different than the second attribute record, thereby indicating that the two or more attribute records are ancestor attribute records of the second attribute record.

In some embodiments, the heritage indicator of the second attribute record references the unique identifier of two or more attribute class records, thereby identifying two or more attribute class records, in the plurality of attribute class records, to which the second attribute record belongs.

Another aspect of the present disclosure provides a computer system, comprising one or more processors, memory, and one or more programs stored in the memory for execution by the one or more processors, the one or more programs comprising instructions for storing a plurality of attribute records defining a version of a corresponding process in one or more processes for making one or more products, where each respective attribute record in at least a subset of the plurality of attribute records comprises (i) a corresponding unique identifier, (ii) a superior/inferior attribute reference, and (iii) a heritage indicator, a superior/inferior attribute reference of a second attribute record references a corresponding unique identifier of a first attribute record in the plurality of attribute records that is different than the second attribute record, thereby indicating that the second attribute record is a nested attribute record of the first attribute record, and a heritage indicator of the second attribute record references: (i) the corresponding unique identifier of a third attribute record in the plurality of attribute records, that is different than the second attribute record, thereby indicating that the third attribute record is an ancestor attribute record of the second attribute record, or (ii) a unique identifier of a first attribute class record that identifies an attribute class record, in a plurality of attribute class records, to which the second attribute record belongs as well as a version identifier that identifies the version of the second attribute record. The plurality of attribute records are used to analyze product development information associated with each attribute record in the plurality of records to determine a relationship between variance in product development across the plurality of attribute records and variance in outcomes or characteristics of one or more products made by the one or more processes. In some embodiments, the computer system is in the form of a single computer system, a plurality of networked computer systems, or a virtual machine.

Another aspect of the present disclosure provides a non-transitory computer readable storage medium for analyzing product development information, where the non-transitory computer readable storage medium stores instructions, which when executed by a first device, perform a method comprising storing a plurality of attribute records defining a version of a corresponding process in one or more processes for making one or more products. Each respective attribute record in at least a subset of the plurality of attribute records comprises (i) a corresponding unique identifier, (ii) a superior/inferior attribute reference, and (iii) a heritage indicator. A superior/inferior attribute reference of a second attribute record references a corresponding unique identifier of a first attribute record in the plurality of attribute records that is different than the second attribute record, thereby indicating that the second attribute record is a nested attribute record of the first attribute record. A heritage indicator of the second attribute record references (i) the corresponding unique identifier of a third attribute record in the plurality of attribute records, that is different than the second attribute record, thereby indicating that the third attribute record is an ancestor attribute record of the second attribute record, or (ii) a unique identifier of a first attribute class record that identifies an attribute class record, in a plurality of attribute class records, to which the second attribute record belongs as well as a version identifier that identifies the version of the second attribute record. The plurality of attribute records are used to analyze product development information associated with each attribute record in the plurality of records to determine a relationship between variance in product development across the plurality of attribute records and variance in outcomes or characteristics of one or more products made by the one or more processes.

BRIEF DESCRIPTION OF THE DRAWINGS

FIG. 8 illustrates an attribute record data store in the form of a table in accordance with an embodiment of the present disclosure.

FIG. 9 illustrates an attribute class record data store in the form of a table in accordance with an embodiment of the present disclosure.

FIGS. 12A, 12B, 12C, 12D, 12E, 12F, 12G, and 12H collectively illustrate systems and methods for analyzing product information (e.g., using a plurality of attribute records) in accordance with an embodiment of the present disclosure.

FIGS. 20A, 20B, 20C, 20D, 20E, and 20F illustrate how a process, including all of its identifiers, nodes, edges, attributes and nested attributes, is encoded as JSON objects that are non-transitorily stored in accordance with embodiment of the present disclosure.

FIG. 21 illustrates how a process can be represented by collapsing the process hierarchy into a string representation in which each process object and the parent process object it describes are determined by its relative position within the string and, in particular, how an activity, resource on that activity, component on that resource, property on that component, specification on that property, and value on that specification can be represented as a string containing a sequence of names, identifiers, or any other attribute value separated by a delimiter in accordance with embodiment of the present disclosure.

FIG. 21 illustrates how each nested object class may be specified as a column in a table, and the process objects that describe that class are row labels in a table, with the values of those process objects in each class placed in the cells of the table, in accordance with an embodiment of the present disclosure.

FIGS. 24A and 24B illustrate how genealogy is recorded as a hierarchical parent list on each process, with each process lineage sharing a single process identifier, and each version of the process in the lineage having a unique version number within the scope of the lineage, in accordance with an embodiment of the present disclosure.

FIG. 25 illustrates how processes can be duplicated multiple times, creating a genealogical tree of related process (parents, children, siblings, cousins, etc.), in accordance with an embodiment of the present disclosure.

FIG. 26 is a representation of a genealogical tree, generated from related processes, in a table form with names and unique process identifiers, in accordance with an embodiment of the present disclosure.

FIGS. 28A and 28B collectively illustrate a method of identifying the roots and newest leaf of a list of activities, in accordance with an embodiment of the present disclosure.

FIG. 29 illustrates a method identifying a list of ancestors and immediate children of a process, in accordance with an embodiment of the present disclosure.

FIG. 30 illustrates a method of finding the leaves of a process genealogy, in accordance with an embodiment of the present disclosure.

FIG. 31 illustrates a method of identifying members of the descendant family tree of a process, in accordance with an embodiment of the present disclosure.

FIG. 32 illustrates a method of finding differences in processes using lists of positional encodings, in accordance with an embodiment of the present disclosure.

FIG. 33 illustrates a difference report that only includes attributes with differences, in accordance with an embodiment of the present disclosure.

FIGS. 34A, 34B, 34C, and 34D collectively provide a difference report that includes all changed or unchanged attributes on a process, in accordance with an embodiment of the present disclosure.

Like reference numerals refer to corresponding parts throughout the several views of the drawings.

DETAILED DESCRIPTION

Figure 1:
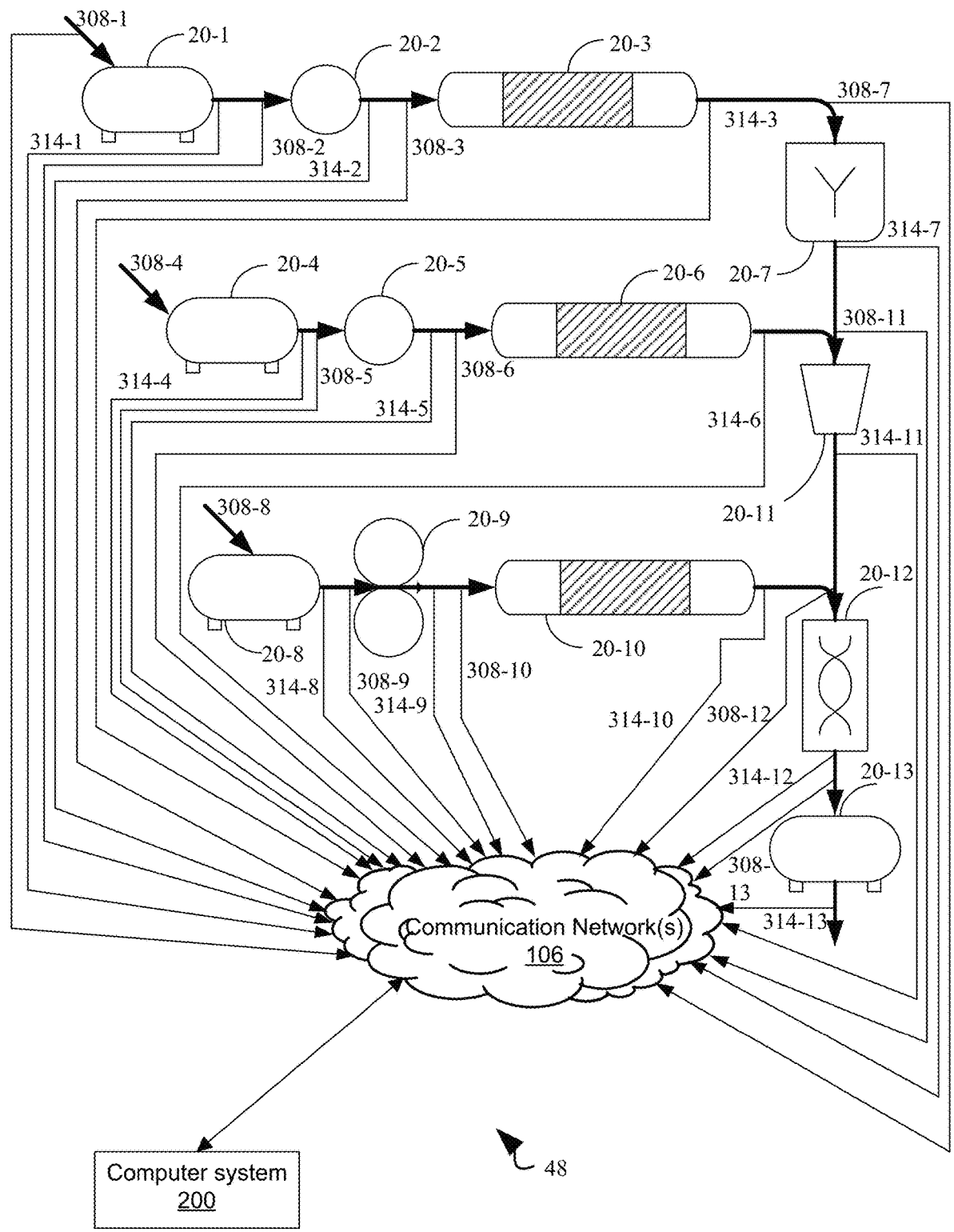
FIG. 1 illustrates a system topology in accordance with the present disclosure that includes a device, namely a computer system 200, and a plurality of stages 20 of a process.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

1. Definitions

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein the terms "node" and "vertex" are used interchangeably herein to refer to any kind of object that is connected in pairs by edges in a graph. In some embodiments, resource properties are associated with nodes. In some embodiments, resources are associated with nodes in the form of input resources, meaning that such resources are inputted into a given node. In some embodiments, resources are associated with nodes in the form of output resources, meaning that such resources are outputted from a given node. In some embodiments, resources are not associated with nodes, but rather, are associated with the edges that connect nodes. In some embodiments, a node represents a step, activity, reaction, transformation, unit operation, operation, or phase that occurs in a process. In some embodiments nodes represent resources that are connected by steps that are represented by edges.

As used herein the terms "edge" and "arc" used interchangeably herein to refer to a connection between two nodes, respectively terms a source node and a destination node. In some embodiments, resources are associated with the edges. In some embodiments, resources are not associated with the edges but rather are associated with the nodes that the edge connects. In some embodiments, an edge connects a resource outputted from one node (resource output) with a resource input of another node (resource input). In some such embodiments, the resource output and resource input coupled by the edge are therefore identical, including having identical properties and amounts. In some alternative embodiments, there is no requirement that the resource output and resource input coupled by the edge be identical. In other words, in some embodiments, resources connected by an edge could be different on the origin and end points of an edge. In some embodiments, an edge connected from a source node to a destination node means that all of the resource outputs of the source node are resource inputs to the destination node. In some embodiments, an edge connected from a source node to a destination node means that all or a subset of the resource outputs of the source node are resource inputs to the destination node. In some embodiments, more than one edge, from more than one source node are coupled to a single destination node.

As used herein the term "graph" refers to one or more nodes with edges connecting pairs of nodes, where the nodes can be any kind of object that is connected in pairs by edges. In some embodiments the graph is a directed graph. In some embodiments the directed graph is an acyclic graph (DAG) that has a direction as well as a lack of cycles. That is, it consists of finitely many nodes and edges, with each edge directed from one node to another, such that there is no way to start at any node v and follow a consistently-directed sequence of edges that eventually loops back to v again. Equivalently, a DAG is a directed graph that has a topological ordering, a sequence of the vertices such that every edge is directed from earlier to later in the sequence.

As used herein the term "process" refers to one or more nodes connected by one or more edges that detail the production of one or more products.

As used herein the term "product" means the production of a thing. In some embodiments this thing is a composition or article of manufacture. Nonlimiting examples or products include materials, compositions, ingredients, medicines, bulk materials, and the like.

As used herein, nonlimiting examples of the term "resource" include equipment (e.g., a class of equipment, a brand or model number of an article of manufacture), a person, a work shift, an item, and data.

As used herein, nonlimiting examples of the term "property" include states of matter (e.g., a purity of an ingredient, a purity of a composition), a lot number of a composition, a cost of an item, a frequency of use of an article of manufacture, an age of an article of manufacture, a number of times an article of manufacture has been used, a temperature of a composition, a color of a composition, a pH, a flow rate, a viscosity, a mass, a volume, a quantity of a composition, a measurement of a composition, a pressure, a pressure range, an environmental condition, a range of environmental conditions, a date, a time, a duration, and an optical property of a composition.

As used herein, the term "unique identifier" refers to a label, symbol, string of symbols, number, shape, color, absolute or relative position in a sequence or coordinate system, or other descriptor that is associated only with one object within the system.

As used herein, the terms "version identifier" and "version" interchangeably refer to a label, symbol, string of symbols, number, shape, color, absolute or relative position in a sequence or coordinate system, or other descriptor that is associated only with one version of an object within the system. The version identifier in combination with an object's (e.g., process object, attribute) unique identifier defines a particular state of an object at an instance in time. A version identifier may be an ordered or unordered sequence.

As using herein, the term "unique class identifier" refers to a label, symbol, string of symbols, number, shape, color, absolute or relative position in a sequence or coordinate system, or other descriptor that is associated only with a class (e.g., attribute class) or type of object. Multiple objects (e.g., process objects, attributes) in the system may be associated with a particular class meaning that some attribute or aspect of the object, whether explicitly defined or not, is shared in common with other instances of a class. Class identity can be used to select which object (e.g., attribute) should or could be compared to each other for similarities, differences or changes.

As used herein, the term "lineage identifier" refers to a label, symbol, string of symbols, number, shape, color, absolute or relative position in a sequence or coordinate system, or other descriptor that is associated only with an instance of an object (e.g., instance of a particular attribute class) within the system. The lineage identifier determines the relationship of an object to ancestor objects from which the present object was derived directly or indirectly, or descendant objects that were derived from the present object directly or indirectly.

As used herein, the term "mapping function" refers to a method or set of instructions, executable by a device, that takes input data or information that is represented in one symbolic, spatial or graph form or value and transforms it into another representational form or value. A mapping may reversible or not. A mapping may or may not change the input.

As used herein, the term "comparison function" refers to a method or set of instructions, executable by a device, that takes as inputs two objects (e.g., two process objects, two attributes, two nested attributes, etc.) or values and produces as an output a determination of sameness or difference, quantification of degrees of sameness or difference, or classification of the types of sameness or difference between the two objects.

2.1. Composition

In the present disclosure, one or more process objects are obtained, where each process object in the one or more process objects defines a version of a corresponding process in one or more processes. Ultimately, product development information associated with each process object in the one or more process objects is analyzed to determine a relationship (e.g., correlation) between variance in product development (e.g., variance in inputs and outputs to various stages of product synthesis) across the one or more process objects and variance in outcomes or characteristics (e.g., yield, purity, amount) of one or more products made by the one or more processes.

Each process object has a unique identifier. Each process object may also have a version identifier. The unique identifier, and optional version identifier facilitate identifying and tracking the existence and lifecycle of a process associated with a process object.

A process object comprises one or more attributes. In some embodiments an attribute in the one or more attributes is a node attribute that defines a corresponding node in a hypergraph. In some embodiments an attribute in the one or more attributes is an edge attribute that defines a corresponding edge in a hypergraph. In some embodiments, such nodes, edges, and the hypergraph they form have the characteristics of hypergraphs disclosed on U.S. Pat. No. 9,910,936, entitled "Systems and methods for process design and analysis," which is hereby incorporated by reference. Such hypergraphs may have one or more nodes, two or more nodes, five or more nodes, ten or more nodes, or 100 or more nodes. Thus, correspondingly, in some embodiments a process object comprises one or more node attributes, two or more node attributes, five or more node attributes, ten or more node attributes, or 100 or more node attributes. Such hypergraphs may have one or more edges, two or more edges, five or more edges, ten or more edges, or 100 or more edges. Thus, correspondingly, in some embodiments a process object comprises one or more edge attributes, two or more edge attributes, five or more edge attributes, ten or more edge attributes, or 100 or more edge attributes.

A process object may also have attributes other than nodes and edges. Examples of such attributes includes, but are not limited to, a name, a description, a comment, a creation date, a modification date, a size indication, an owner, a creator, an access privilege, a purity of matter, a quantity of matter, a temperature of matter, a pressure of matter, a melting point of matter, or a property of matter.

In some embodiments, any attribute of a process object may be specified with a value to form an attribute-value pair, which is also referred to herein as a key:value pair.

In some embodiments, each attribute of a process object may itself comprise attributes ("nested attributes"). In some embodiments, nested attributes are specified through an association map that links the nested attributes to the attributes they describe. In other embodiments, nested attributes are specified in the value portion of any attribute-value pair. In some embodiments, any attribute-value pair is optionally labeled with a unique identifier.

In some embodiments, each respective attribute in the one or more attributes of a process object for a process comprises a nested attribute that serves to determine the relatedness of the respective attribute to other attributes in other process objects (for other processes or other process versions). In some embodiments, this nested attribute comprises a corresponding unique object class identifier that associates the respective attribute with a particular attribute class in a plurality of attribute classes combined with a lineage identifier that determines a position of the respective instance of the particular attribute class in a genealogical network of related instances of the particular attribute class. In some embodiments, one or more lists of all possible or actually-instantiated unique class identifiers and unique object identifiers may also be stored, and additional attributes may be associated with each unique class or unique object in these lists.

A process object for a process, including all of its identifiers, nodes, edges, attributes and nested attributes is encoded as a data element that is stored in the system. Any one or more of several possible encodings, or combinations thereof, may be used including, graph, object structures, relational tables, flat tables, and positional meaning can be used to store the process as discussed in further detail in Section 3.2 below.

In some embodiments, any two processes (e.g., any two process objects) can be compared and the similarities and differences between the processes may be determined by applying zero or more mapping functions to the encoded process or to the encoding of the values of one or more of the attribute value pairs to transform it into an alternative representation as a symbol sequence, a list, a coordinate system, a number, a graph or other numeric or symbolic representation to which a comparison function may be applied. A comparison function can be applied to two processes objects, or to the values of any two attributes or nested attributes of a process object.

Examples of suitable mapping functions include, but are not limited to, (i) identity mapping—the transformation of an encoding to itself, (ii) the serialization of an encoded process object, or the value of an attribute of an object into a symbol sequence such as JSON or XML, (iii) transformation of each attribute:value pair of a process object into a simple list of unique keys and values, (iv) encoding in a hash, (v) transformation of a value into a numeric data type, (v) determination of the length of a string, (vi) counting of the number of instances of a pattern or value within a symbolic sequence using grammars, regular expressions, or hidden Markov models, (vii) application of arithmetic operations, (viii) application of a transcendental function, (ix) retrieval of a portion of a string specified by position or a pattern match, (x) application of context-free grammar to construct a parse-tree, and (xi) semantic encoding which groups subsequences of symbols into tokens that are assigned to classes.

Suitable comparison functions include, but are not limited to, a simple operator such as greater than, less than, equal to, not equal to, order of. Suitable comparison functions further include, but are not limited to, formulas, metrics, a series of calculations, or an algorithm such as mutual information, correlation, rank correlation, Hamming distance, Euclidean distance, angle of separation, a pairwise character alignment and match, dynamic programming algorithm, a sequence alignment algorithm, a Needleman-Wunsch algorithm (e.g., Needleman and Wunsch, 1970, "A general method applicable to the search for similarities in the amino acid sequence of two proteins," 1970, J Mol Biol. 48, 443-53, which is hereby incorporated by reference in its entirety), a Smith-Waterman algorithm (e.g., Smith Waterman, 1981, "Identification of common molecular subsequences," J Mol Bio. 147:195-7, which is hereby incorporated by reference in its entirety), a heuristic method, a weighted distance algorithm, BLAST, MAQ, ZOOM, RMAP, CloudBurst, Eland, mrFAST/mrsFAST, SHRiMP, MOM, MOSAIK, PASS, ProbeMatch, SOAP, SRmapper, and STAMPY.

In some embodiments, a process is changed from one version into another, or copied as a new replica process, and a change history is recorded and stored as a sequence of change events. Each change event is composed of the change action and the attributes and/or process objects to which the change action was applied. In some embodiments, the change history is read to determine what changes were made to transform one process into another process that is part of the same genealogical network. In some embodiments, change events are reversed or reapplied. In some embodiments, the change events are applied to one or more attributes or one or more process objects associated with a process such as a run graph. In some embodiments a run graph comprises a plurality of process runs. That is to say, when a node of a process is run, actual material lots or pieces of equipment, etc., are obtained and/or used as real world instances of a version of a process. As such, each process run comprises an identification of a node of an identified process version in the plurality of versions for a process. For the identified node of the process version, the process run further comprises values for the respective set of resource inputs of the node in the hypergraph of the respective process version and their associated input properties. For the identified process version, the process run also comprises the respective set of resource outputs of the node. Further, for the identified process version, the process run also comprises obtained values of at least one output property of a resource output in the respective set of resource outputs of the node in the hypergraph of the respective process version.

In some embodiments, a run graph has the form of a run data store disclosed in U.S. Pat. No. 9,910,936, entitled "Systems and methods for process design and analysis," which is hereby incorporated by reference. In some embodiments, a run data store includes a genealogical graph comprising one or more process sets. Each process set comprises the identities of related process versions. For instance, in some embodiments, a first process version in a process set and a second process version in the process set have the same hypergraph but an output property, output specification limit, input property, or input specification limit to one of the nodes in the hypergraph is different. In another example, a hypergraph of a first process version in a process set and a hypergraph of a second process version in the process set have all but one, all but two, all but three, or all but four nodes in common. Typically, the process versions in a process set are related to each other in the sense that a process gets refined over time, and various versions of the process are saved as process versions. Refinement of a process includes any combination of adding or removing nodes from a hypergraph, adding or removing edges from the hypergraph, adding or removing parameterized resource inputs to one or more nodes in the hypergraph, adding or removing parameterized resource outputs to one or more nodes in the hypergraph, adding, removing or changing an input property or input specification limit of a resource input of one or more nodes in the hypergraph, and/or adding, removing or changing an output property or output specification limit of a resource output of one or more nodes in the hypergraph.

A detailed description of a system 48 for analyzing information in accordance with the present disclosure is described in conjunction with FIGS. 1 through 5. In particular, FIG. 1 illustrates a process or pipeline having a plurality of stages 20. Each respective stage 20 in FIG. 1 is illustrated by an exemplary reaction chamber to indicate that a form of material transformation takes place. However, there is no requirement that this material transformation take place in a reaction chamber. In the embodiment illustrated in FIG. 1, each stage 20 includes resource inputs 308 and resource outputs 314. More generally, in some embodiments, each respective stage in the plurality of stages is associated with at least one resource input and at least one resource output.

In some embodiments, a resource input is associated with one or input properties. In some embodiments an input property is characterized by an input specification (e.g., on a parameterized or non-parameterized basis). For instance, in some embodiments, the input specification specifies an allowed weight range for the associated input property. This is an example of a parameterized basis. Thus, if the input property is flour, the input specification is an allowed weight range of flower. As another example, in some embodiments, the input specification specifies one or more formulas, one or more tags or one or more adjectives for the associated input property. This is an example of a non-parameterized basis. In some embodiments, an input specification provides attributes of a corresponding input property of a resource input in the form of units, control limits, formulas, data types, tags, or adjectives.

In some embodiments, a resource output is associated with one or output properties. In some embodiments, an output property is characterized by an output specification (e.g., on a parameterized or non-parameterized basis). For instance, in some embodiments, the output specification specifies an allowed weight range for the associated output property. This is an example of a parameterized basis. Thus, if the output property is flour, the output specification is an allowed weight range of flower. As another example, in some embodiments, the output specification specifies one or more formulas, one or more tags or one or more adjectives for the associated output property. This is an example of a non-parameterized basis. In some embodiments, an output specification provides attributes of a corresponding output property of a resource output in the form of units, control limits, formulas, data types, tags, or adjectives.

In some embodiments, as illustrated in FIG. 1, a description of the inputs 308 and outputs 314 is provided to computer system 200, possibly over communications network 106. For instance, at stage 20-2, when a process run completes this stage, a file (or other form of data structure) that includes the outputs of this stage is stored in a storage location or structure, such as a directory, associated with this stage. Then, a sweeping or monitoring process takes this stored data and sends it to computer system 200 where it is uploaded into a corresponding process run stored in the computer system 200. In more detail, in some embodiments, inputs 308 or outputs 314 are electronically measured by measuring devices. For instance, in some embodiments a software component such as a sync engine that runs as a background process (like Google Drive or Dropbox Sync) on any computer attached to an instrument or other component of a stage 20 monitors a synced folder. When new instrument data files are added to the folder, the software parses and sends the data associated with the stage across communications network 106 to computer system 200. In some embodiments, a hardware solution is used to communicate the set of inputs 308 and outputs 314 of the stages 20 of a process. In such an approach data acquisition and transfer is performed by direct interface with instruments or other components of stages 20. For instance, in some embodiments a BeagleBone black microcontroller (http://beagleboard.org/BLACK) is used to transmit such data to computer system 200 across network 106. In some embodiments, data (e.g., values for a set of resource inputs 310 and/or values for a set of resource outputs 314 associated with a stage 20 of a process) is communicated from the respective stages 20 to the computer system via HTTPS port 443 via HTTP POSTs or representational state transfer.

Of course, other topologies of system 48 are possible, for instance, computer system 200 can in fact constitute several computers that are linked together in a network or be a virtual machine in a cloud computing context. As such, the exemplary topology shown in FIG. 1 merely serves to describe the features of an embodiment of the present disclosure in a manner that will be readily understood to one of skill in the art.

Figure 2:
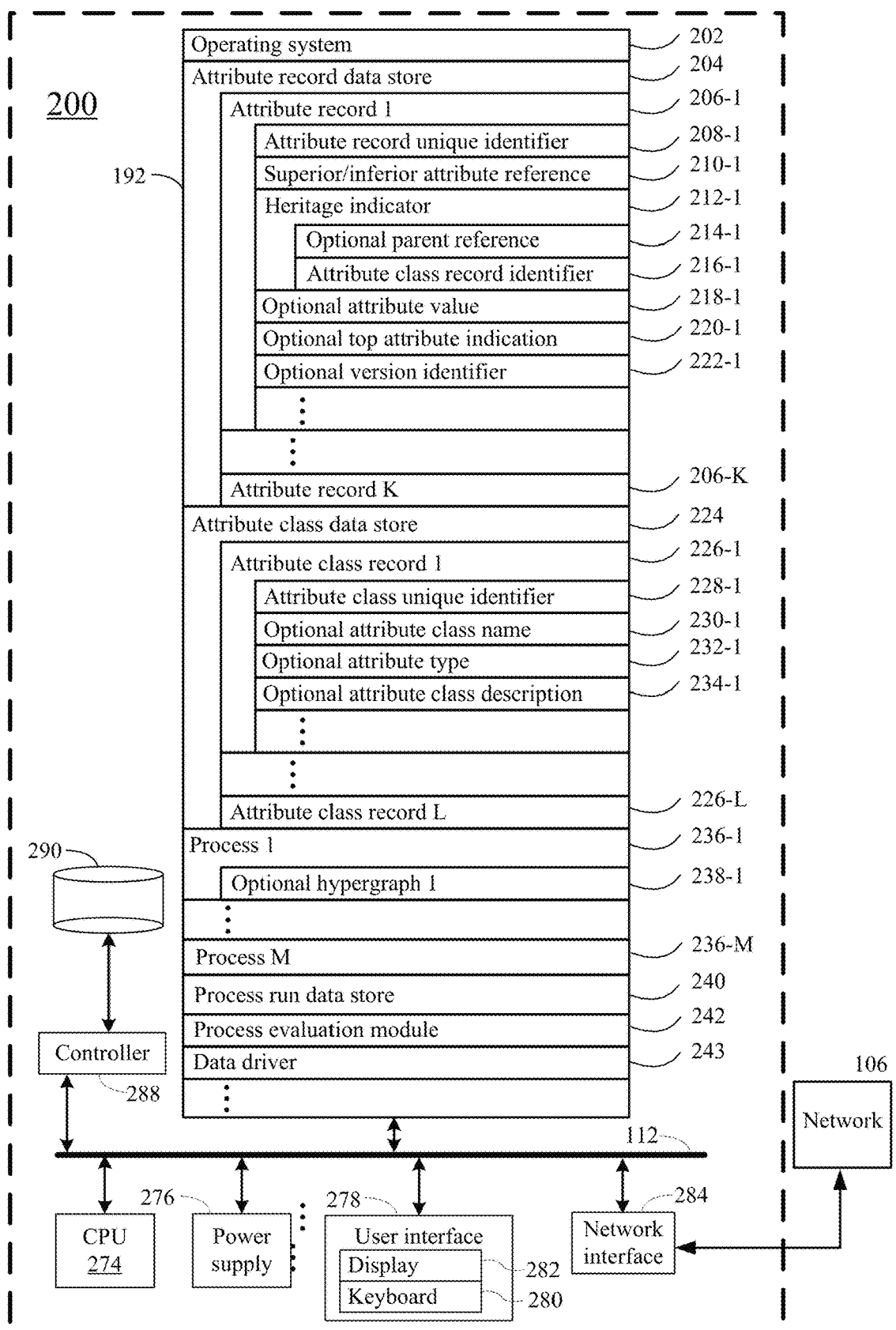
FIG. 2 illustrates a computer system in accordance with an embodiment of the present disclosure.

Referring to FIG. 2, in typical embodiments, a computer system 200 for analyzing information comprises one or more computers. For purposes of illustration in FIG. 2, the computer system 200 is represented as a single computer that includes all of the functionality of the computer system 200. However, the disclosure is not so limited. The functionality of the computer system 200 may be spread across any number of networked computers and/or reside on each of several networked computers and/or be hosted on one or more virtual machines at a remote location accessible across the communications network 106. One of skill in the art will appreciate that a wide array of different computer topologies is possible for the computer system 200 and all such topologies are within the scope of the present disclosure.

The computer system 200 is uniquely structured to record and store data in a computable way with minimal effort, quantitatively search all experimental designs, and data, or any subset thereof, apply real-time statistical analysis, achieve quality by design, update experimental processes and data collection systems, identify meaningful variables via automated critical-to-quality analysis, routinely obtain results that are true and unequivocal, access transparent data and results, make results open and accessible (and securely control access to anyone or any team), build quantitatively and directly on others' designs and results, and unambiguously communicate evidence supporting a conclusion to team members or partners.

Turning to FIG. 2 with the foregoing in mind, a computer system 200 comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 112 for interconnecting the aforementioned components, and a power supply 276 for powering the aforementioned components. Data in memory 192 can be seamlessly shared with non-volatile memory 290 using known computing techniques such as caching. Memory 192 and/or memory 290 can include mass storage that is remotely located with respect to the central processing unit(s) 274. In other words, some data stored in memory 192 and/or memory 290 may in fact be hosted on computers that are external to computer system 200 but that can be electronically accessed by the computer system over an Internet, intranet, or other form of network or electronic cable (illustrated as element 106 in FIG. 2) using network interface 284.

The memory 192 of computer system 200 stores:
an operating system 202 that includes procedures for handling various basic system services;

an attribute record data store 204 store comprising, for each respective attribute record 206 in a plurality of attribute records (e.g. 206-1, ..., 206-K, where K is a positive integer greater than 1), a corresponding unique identifier 208 (e.g., 208-1), a corresponding superior/inferior attribute reference 210 (e.g., 210-1), and a corresponding heritage indicator 212 (e.g., 212-1), where the corresponding heritage indicator 212 optionally comprises a parent reference 214 (e.g., 214-1) and/or an a unique identifier of a first attribute class record that identifies an attribute class record, in a plurality of attribute class records, to which the attribute record belongs 216 (e.g., 216-1), and where the respective attribute record further optionally comprises an attribute value 218 (e.g., 218-1), top attribute indication 220 (e.g., 220-1), and/or version identifier 222 (e.g., 222-1);

an attribute class data store 224 that stores a plurality of attribute class records 226 (e.g., 226-1, 226-L, where L is a positive integer), each respective attribute class record 226 comprising an attribute class unique identifier 228 (e.g., 228-1) and optionally comprising an attribute class name 230 (e.g., 230-1), attribute type 232 (e.g., 232-1), and/or attribute class description 234 (234-1);

information regarding one or more processes 236 (e.g., 236-1, ..., 236-M, where M is a positive integer), where each such process 236 is optionally associated with a hypergraph 238 (e.g., 238-1);

a process run data store 240;

an optional process evaluation module 242; and an optional data driver 243.

In some implementations, one or more of the above identified data elements or modules of the computer system 200 are stored in one or more of the previously mentioned memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 192 and/or 290 optionally stores a subset of the modules and data structures identified above. Furthermore, in some embodiments the memory 192 and/or 290 stores additional modules and data structures not described above.

Figure 3:
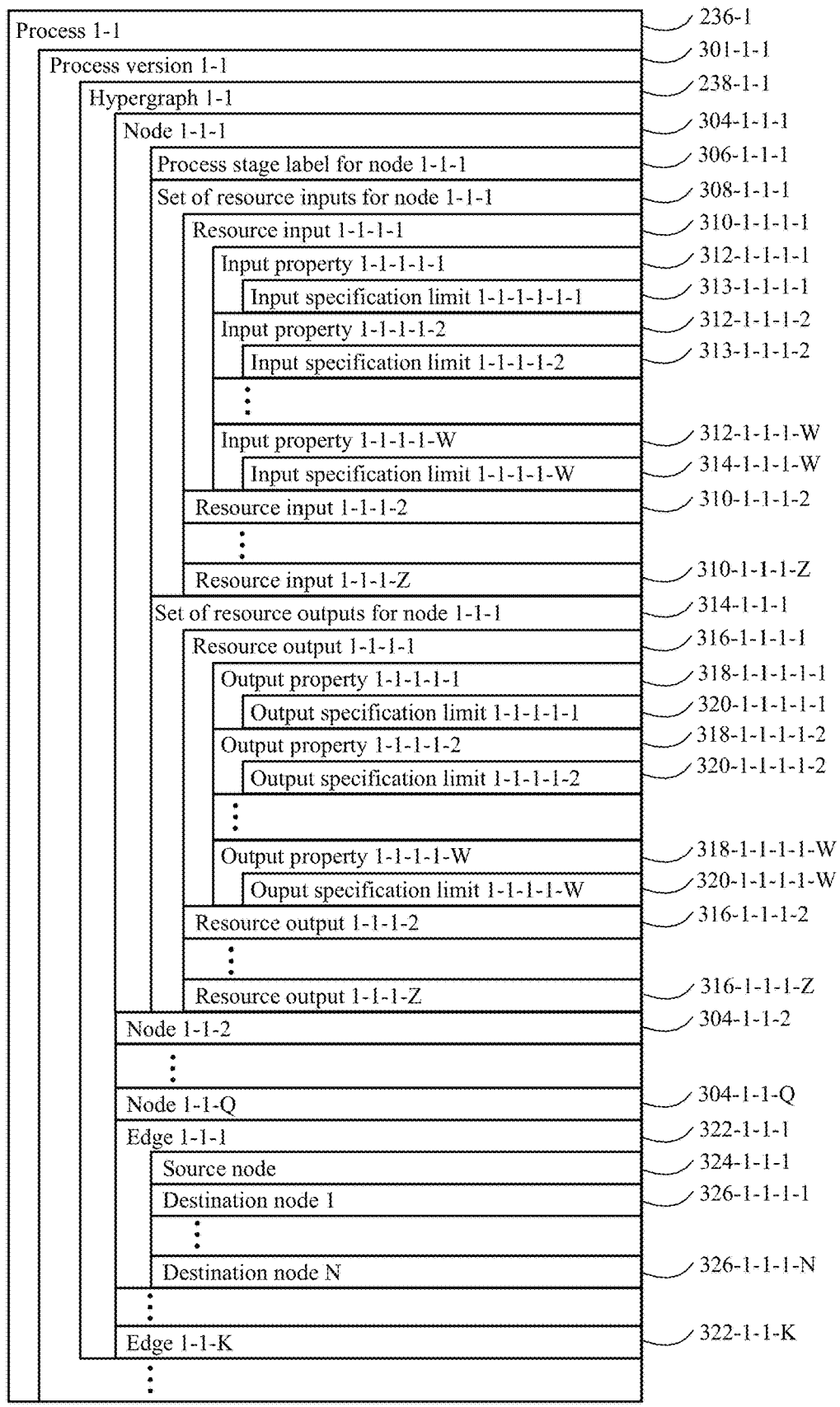
FIG. 3 illustrates a process version in accordance with an embodiment of the present disclosure.

Turning to FIG. 3, more details of embodiments of a process 236 (collection of process objects) are described. In some embodiments, there are one or more versions 301 (e.g., 301-1-1) of a process. Each such process version 301 comprises a corresponding hypergraph 238 (e.g., 238-1-1). In some embodiments, a hypergraph for a process is defined (e.g., the nodes, inputs to nodes, outputs of nodes, properties of node inputs, properties of node outputs, and edges of the hypergraph) through attribute records as stored in an attribute record data store in FIG. 2. More generally, in some embodiments, a hypergraph for a process is defined through one or more process objects of a respective collection of process objects.

In some embodiments, for a given process, each step (activity, reaction, transformation, unit operation, operation, phase, etc.) of the process is defined as a node in the one or more nodes of a hypergraph while each edge of the hypergraph connects resources on the node inputs/node outputs. In some embodiments, such resources are defined on the nodes as node inputs or node outputs. In alternative embodiments, such resources are defined on the edges themselves, and not the nodes. Thus, if the output of a particular node is a particular resource, it is possible to assign this resource as an output of the particular node. Alternatively, the very same resource outputted by the particular node can be defined on the edge that connects the particular node to a downstream node.

Further still, in embodiments in which edges are used to connect resources to nodes in a hypergraph, it is possible for one or more resources on the origin of the edge and on the endpoints of the edge to be different.

In some embodiments, for a given process, each step (activity, reaction, transformation, unit operation, operation, phase, etc.) of the process is defined as an edge (rather than as a node) in the one or more edges of a hypergraph while each node of the hypergraph connects resources on the edge inputs/edge outputs. In some embodiments, such resources are defined on the edges as edge inputs or edge outputs. In alternative embodiments, such resources are defined on the nodes themselves, and not the edges. Thus, if the output of a particular step is a particular resource, it is possible to assign this resource as an output of the particular edge. Alternatively, the very same resource outputted by the particular edge can be defined on the node that connects to the output of the particular edge.

The hypergraph 238 comprises one or more nodes 304, and is directional, causal, and sequential based. For instance, each respective node 304 in the one or more nodes is connected to another node in the one or more nodes by an edge.

In the case where the hypergraph consist of a single node, the single node is connected to itself by an edge.

In some embodiments, each respective node 304 in the one or more nodes optionally comprises a process stage label 306 representing a respective stage (e.g., step, activity, reaction, transformation, unit operation, operation, phase) in the corresponding process. In some embodiments, a node 304 is a complete and self-contained description of a transformative event that can be used to build larger processes. In some embodiments, a node 304 is sufficiently general to serve in a wide array of processes, such as chemical processes, life science processes, apparatus (e.g., appliances, vehicles, computer hardware, etc.) manufacturing processes and food preparation process. Advantageously, in such embodiments, nodes 304 do not lose their meaning or utility when copied into other process. As such, the definition of a particular node 304 does not depend on the definition of other another node in a hypergraph 238 in preferred embodiments.

As illustrated in FIG. 3, nodes 304 are structured to contain data in a unique way, in order to facilitate subsequent data mining and reasoning engines to analyze process runs based on process versions 301.

In some embodiments, one or more respective nodes 304 in the plurality of nodes is associated with a set of resource inputs 308. In some embodiments, at least a subset of the nodes in the plurality of nodes is not associated with a set of resource inputs. In some embodiments, a set of resource inputs comprises between one and one thousand different inputs. In some embodiments, one or more of the resource inputs in a set of resource inputs is parameterized. In other words, in some embodiments their unit type is defined. For example, if the resource input is a weight of an input material, the resource input could be parameterized in accordance with a weight metric such as pounds or kilograms. In some embodiments, one or more of the resource inputs are not parameterized.

In some embodiments, a resource input 310 in the set of resource inputs 308 is associated with one or more input properties 312. In some embodiments, an input property in the one or more input properties includes an input specification 314. Examples of input properties 312 are the attributes (e.g., measurements, quantities, etc.) of things such as people, equipment, materials, and data. There can be multiple input properties for a single resource input (e.g., temperature, flow rate, viscosity, pH, purity, etc.). In some embodiments, there is a single input property for a particular resource input. In some embodiments, a resource input has an input property but there is no input specification.

In some embodiments, each respective node 304 in the plurality of nodes is also associated with a set of resource outputs 314 in the corresponding process. In such embodiments, at least one resource output 316 in the set of resource outputs 314 is associated with one or more output properties 318, the one or more output properties including a corresponding output specification 320. Examples of resources output properties 318 include attributes (e.g., measurements, quantities, etc.) of things such as people, equipment, articles of manufacture, materials, and data. There can be multiple output properties for a single resource output. In some embodiments, there is a single output property for a particular resource output. In some embodiments, at least one resource output 316 in the set of resource outputs 314 is not associated with one or more output properties 318. In some embodiments, at least one resource output 316 in the set of resource outputs 314 is associated with one or more output properties 318 but these one or more output properties do not include a corresponding output specification 320.

Figure 10:
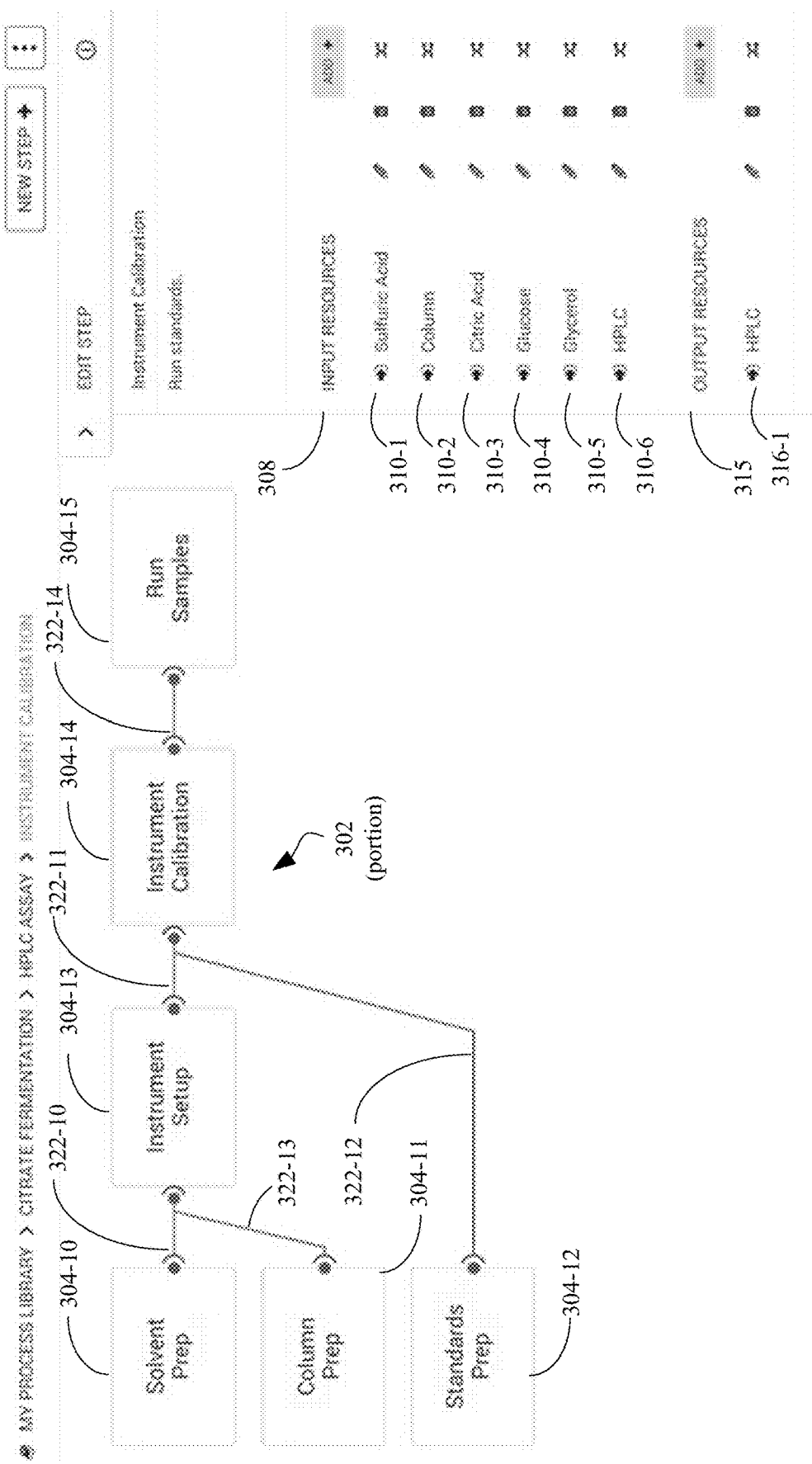
FIG. 10 illustrates how a new instrument calibration stage in a new group of stages for a process hypergraph is defined in accordance with an embodiment of the present disclosure.
Figure 11:
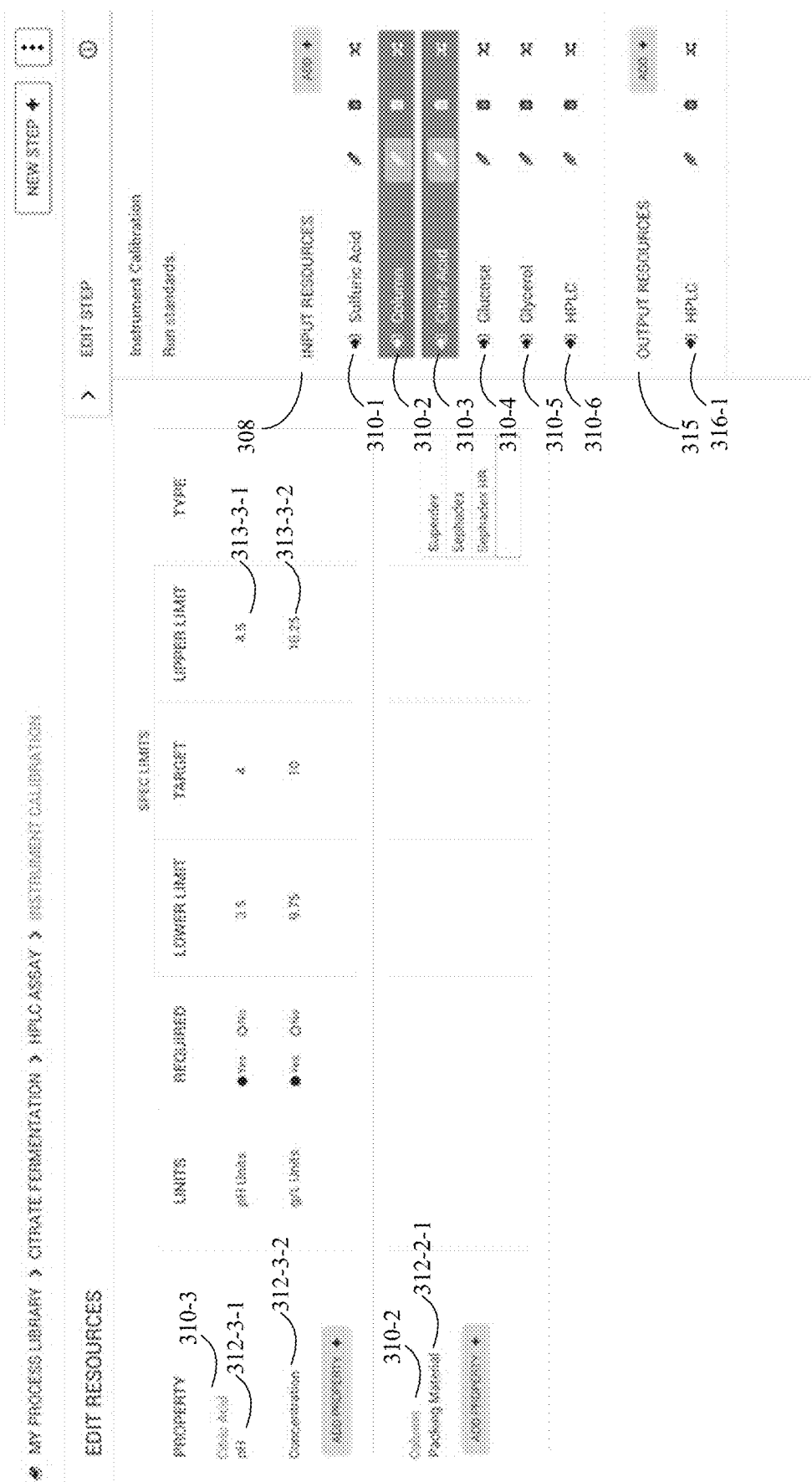
FIG. 11 further illustrates how the new instrument calibration stage in the new group of stages defined for the process hypergraph of FIG. 10 is defined in accordance with an embodiment of the present disclosure.

FIGS. 10 and 11 illustrate the above concepts. FIG. 10 illustrates a portion of a hypergraph 238 and illustrates the nodes 304 in the portion of the hypergraph. The node "Instrument Calibration" 304-14 is highlighted. Accordingly, the set of resource inputs 308 and the set of resource outputs 314 for this node are shown on the right side of FIG. 10. The set of resource inputs 308 for the node "Instrument Calibration" includes sulfuric acid 310-1, column 310-2, citric acid 310-3, glucose 310-4, glycerol 310-5, and HPLC 310-6. As such, the exemplary set of resource inputs 308 illustrates that two of the many possible types of inputs are (i) compositions (e.g., sulfuric acid, citric acid, glucose, glycerol, etc.) and (ii) type of equipment (e.g., column, HLLC, etc.). The set of resource outputs 314 for the node "Instrument Calibration" consists of HPLC 316 in this example.

Turning to FIG. 11, more details regarding the resource input 310-2 "column" and resource input 310-3 "citric acid" are provided. The resource input 310-3 "citric acid" is associated with one or more input properties 312 and an input specification 313. For instance, one input property for resource input 310-3 "citric acid" is "pH" 312-3-1 and this property includes an input specification 313-3-1. In fact, the input specification 313-3-1 is expressed as a lower limit (pH 3.5), a target limit (pH 4), and an upper limit (pH 4.5). Another input property for resource input 310-3 "citric acid" is "concentration" 312-3-2 and this property includes an input specification 313-3-2. The input specification 313-3-2 is expressed as a lower limit (9.75 g/L Units), a target limit (10 g/L Units), and an upper limit (10.25 g/L Units).

Returning to FIG. 3, in some embodiments each hypergraph 238 includes one or more edges. In some embodiments each hypergraph 238 includes a plurality of edges. In some embodiments, each respective edge 322 in the plurality of edges specifies that the set of resource outputs 314 of a source node 304 in the plurality of nodes is included in the set of resource inputs 308 of at least one other destination node 304 in the plurality of nodes. In other words, an edge specifies that the state of a material, equipment, people or other thing inputted into one node (destination node) in a given process 236 is identical to the state of material, equipment, people, or other thing that has been outputted from another node (source node) in the hypergraph for that process. In some embodiments, an edge specifies that the state of a material, equipment, people or other thing inputted into a plurality of nodes (destination node) is identical in a given process to the state of material, equipment, people, or other thing that has been outputted from another node (source node) in the hypergraph for that process. Moreover, a destination node may be connected to two or more source nodes meaning that the input of the destination node includes material, equipment, people or other thing that is in the same state as it was in the output of the two or more source nodes for a given process.

Process versioning 301 is an advantageous feature of the disclosed systems and methods. For example, when the input or output of a particular node is identified through analysis (e.g., statistical analysis such as correlation analysis) across various process runs of a process to be a cause of poor reproducibility of the overall process, additional nodes before and after the problematic node can be added in successive versions of the process and process runs of these new versions of the process can then be executed. Moreover, advantageously, data from older versions and newer versions of the process can be used together in such analysis, in some embodiments, across all the process runs of all of the process versions to determine the root cause of the variability or other unfavorable attribute associated with the problematic node and hereby develop a process version that adequately addresses the problem. In fact, advantageously, using the present disclosure, process runs from multiple processes that make similar but not identical products or produce similar but not identical analytical information can be analyzed to identify such problems.

As FIG. 3 illustrates, at least a subset of the nodes 304 have inputs (set of resource inputs 308). In some embodiments, each of these resource inputs 310 has one or more input properties 312 (e.g., is parameterized to these input properties), and, in some embodiments, each of these input properties has an input specification 313. In some embodiments, one or more of the inputs 308 does not have an input property and/or does not have an input specification. In some embodiments, one or more nodes do not have a resource input while one or more nodes each have one or more resource inputs.

Further, at least a subset of the nodes 304 have one or more resource outputs (set of resource outputs 314). In some embodiments, each of these resource outputs 316 has one or more output properties 318 (e.g., is parameterized to these input properties) and, in some embodiments each of these output properties has output specification 320. The set of resource outputs serve as the inputs to other nodes and such relationships are denoted by edges. Moreover, the set of resource outputs 314 of a particular node can serve as the inputs to more than one node, thus the edges and nodes constitute a hypergraph. By defining a process in this way, the present disclosure facilitates the creation of process versions 301, facilitates data acquisition from disparate sources and devices, and facilitates the querying of process runs to (i) identify correlations, (ii) reduce experimental variance, and/or (iii) improve process reproducibility. Process runs invoke a process version 301 and result in values (e.g. measurements) for the set of inputs and set of outputs of a node in the hypergraph in the process version. In some embodiments, one or more nodes do not have a resource output while one or more nodes each have one or more resource outputs.

Referring to FIG. 3, in some instances, a destination node 326 includes only a single edge 322 and this edge is from a particular source node 324. In such instances, the set of resource outputs 314 for the particular source node 324 constitutes the entire set of resource inputs 308 for the destination node 326. This is illustrated in FIG. 10 where there is a single edge 322-14 between node 304-14 and 304-15. Thus, the set of resource outputs 314 for node 304-14 constitute the entire set of resource inputs 308 for node 304-15 in this example. In other situations, the entire set of resource inputs 308 for a node 304 includes inputs from several different source nodes.

To illustrate the concept of a node in a process, consider a node that is designed to measure the temperature of fermenter broth. The set of inputs 308 to this node include a description of the fermenter broth and the thermocouple that makes the temperature measurement. The thermocouple will include input properties that include its state of cleanliness, calibration state and other properties of the thermocouple. The set of resource outputs 314 to this node 304 include the temperature of the fermenter broth, and, optionally, an output specification for this temperature (e.g., an acceptable range for the temperature). In some instances, no output specification is detailed. Another possible resource output 316 of the node 304 is the thermocouple itself along with output properties 318 of the thermocouple after the temperature has been taken, such as its state of cleanliness and its calibration state. In some embodiments, for at least some of these output properties 318 there is a corresponding one or more output specifications 320. In alternative embodiments, for each of these output properties 318, there is no corresponding one or more output specifications 320.

In some instances, a destination node 304 includes multiple edges 322, each such edge from a different source node 324. In such instances, the set of resource outputs 314 for each such source node 324 collectively constitute the set of resource inputs 308 for the destination node 326. This is illustrated in FIG. 10 where there is a first edge (edge 322-11) between source node 304-13 and destination node 304-14 and a second edge (edge 322-12) between source node 304-12 and destination node 304-14. Thus, the set of resource outputs 314 for node 304-13 plus the set of resource outputs 314 for node 304-12 constitute the set of resource inputs 308 for node 304-14.

Figure 4:
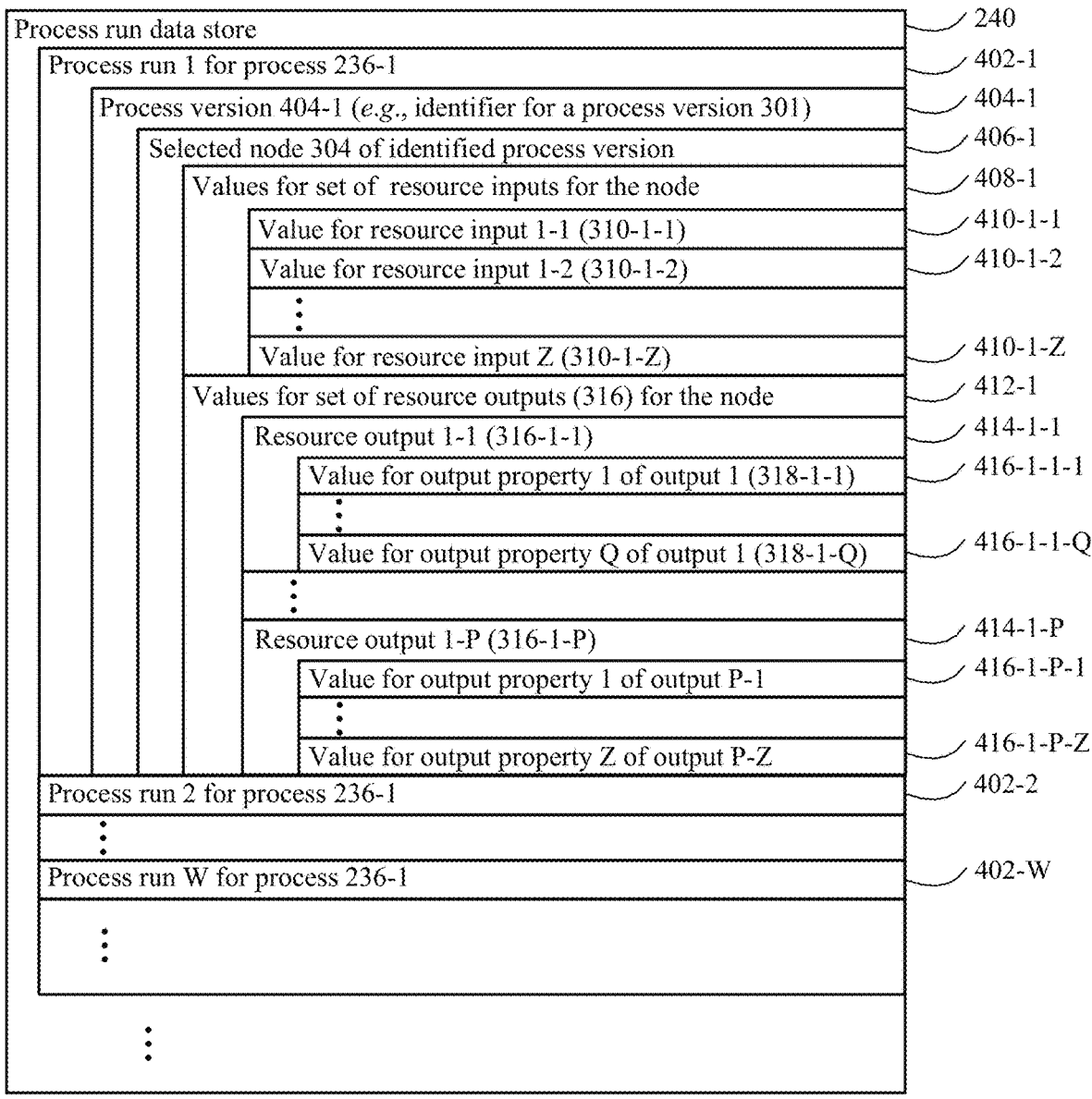
FIG. 4 illustrates a run data store in accordance with an embodiment of the present disclosure.

Turning to FIG. 4, more details of a run data store 240 are provided. The process run data store 240 comprises a plurality of process runs 402. That is to say, when a node of a process is executed, actual material lots or pieces of equipment, etc., are obtained and/or used as real world instances of a particular process version 301. As such, each process run 402 comprises an identification of a node 406 of an identified process version 404 (that identifies a particular process version 301) in the one or more of versions for a process 236 in the one or more processes. For the identified node 406 of the process version 301, the process run 402 further comprises values for the respective set of resource inputs 308 of a first node 304 in the hypergraph 238 of the respective process version 301 and their associated input properties 312 (if they have associated input properties 312). For the identified process version 301, the process run 402 also comprises the respective set of resource outputs 314 of the first node 304. Further, for the identified process version 301, the process run 402 also comprises obtained values of at least one output property 318 of a resource output 316 in the respective set of resource outputs 314 of the first node 304 in the hypergraph 238 of the respective process version. FIGS. 19 through 24 of U.S. Pat. No. 9,910,936 entitled, "Systems and Methods for Process Design and Analysis," which is hereby incorporated by reference, illustrates three process runs 402 for a particular process version, with each process run 402 characterized by different conditions (e.g., different amounts for one or more input properties of one or more inputs to one or more nodes in the hypergraph of the process version).

In some embodiments, the systems and methods of the present disclosure provide a genealogical graph that is stored as part of the set of versioned processes 301 and comprises one or more process sets. Each process set comprises the identities of related process versions 424. For instance, in some embodiments, a first process version 404 referenced by a process set and a second process version 404 referenced in the process set have the same hypergraph but an output property, output specification, input property, or input specification to one of the nodes in the hypergraph is different. In another example, a first process version 404 in a process set and a second process version 404 in the process set have hypergraphs that have all but one, all but two, all but three, or all but four nodes in common. Typically, the process versions in a process set are related to each other in the sense that a process gets refined over time, and various versions of the process are saved as process versions. Refinement of a process includes any combination of adding or removing nodes from a hypergraph, adding or removing edges from the hypergraph, adding or removing resource inputs to one or more nodes in the hypergraph, adding or removing resource outputs to one or more nodes in the hypergraph, adding, removing or changing an input property or input specification of a resource input of one or more nodes in the hypergraph, and/or adding, removing or changing an output property or output specification of a resource output of one or more nodes in the hypergraph.

Figure 5:
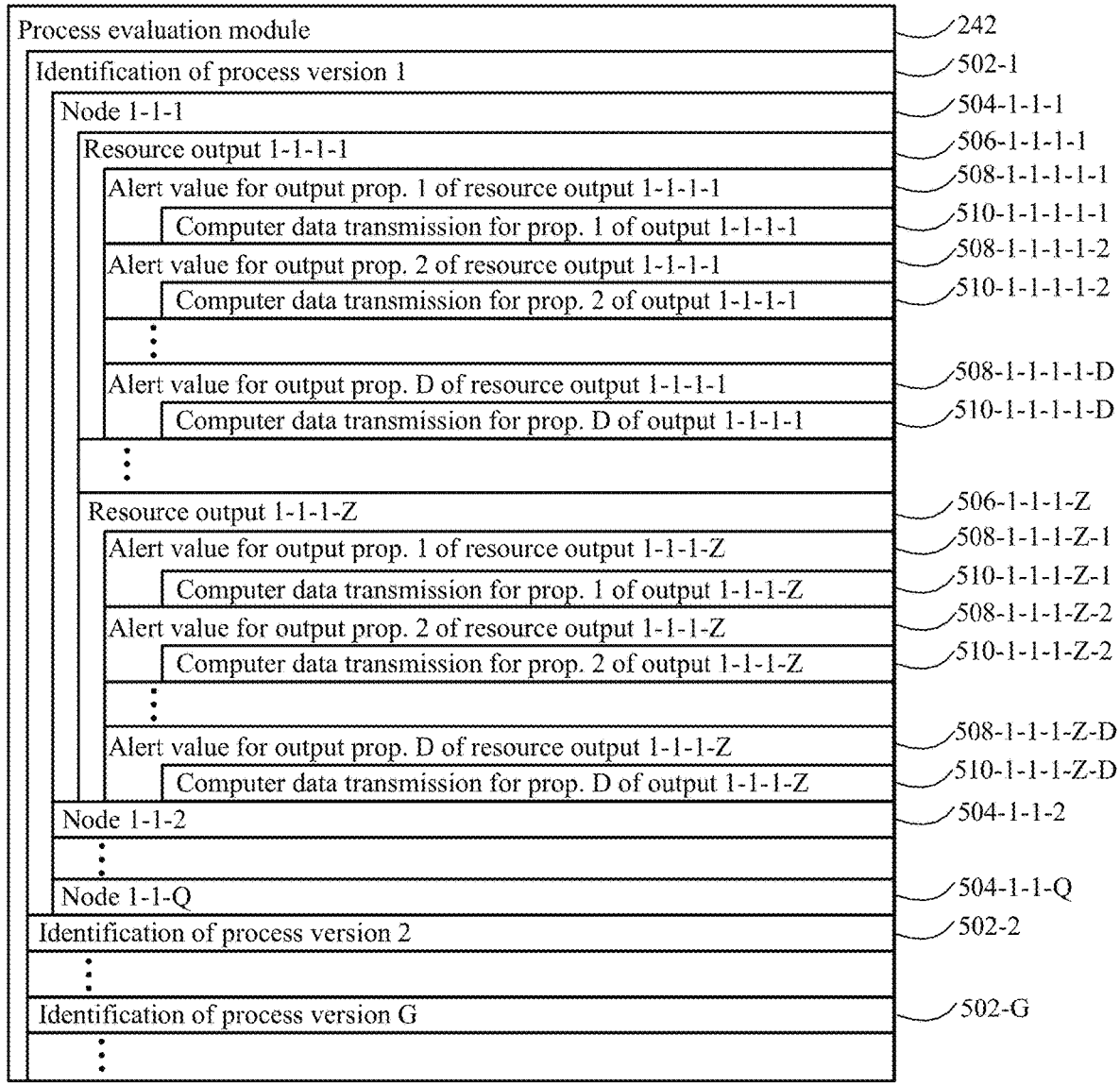
FIG. 5 illustrates a process evaluation module, in accordance with an embodiment of the present disclosure.

Turning to FIG. 5, more details of a process evaluation module 242 are provided. The process evaluation module 242 takes advantage of the unique architecture of the disclosed processes. In particular, when assessing whether a resource output 316 for a particular node 304 satisfies a particular associated output specification 320, it is only necessary to evaluate the values in process runs for the corresponding resource output of that node. The inputs and outputs of other nodes do not need to be evaluated for this purpose. So it is possible to generate an alert (e.g., in the form of a computer data transmission) when an obtained value for an output property of a resource output in a set of resource outputs for a run of a node in a hypergraph for a process version is outside the output specification. Moreover, this alert is portable to other process versions that make use of the same node. Thus, referring to FIG. 5, in some embodiments, a process evaluation module is organized by process version 502. For each process version, nodes 504 for which process alerts are needed are identified. For each such node 504, one or more resource outputs 506 to the node are identified. For each of the one or more resource outputs, one or more alert values 508 are identified for the resource outputs. If an alert value is triggered for a property of a resource output of a particular node of a particular process version, then an alert (e.g., a computer data transmission 510 corresponding to the alert) is communicated. In some embodiments, the computer data transmission 510 is a message sent to a user interface or a client computer indicating that the alert has been triggered. In some embodiments, the computer data transmission is in the form of a text message, an E-mail, an SMS message, or an audible alarm. To illustrate, consider the case in which the output specification 320 of an output property 318 of a resource output 316 of a node 304 specifies that output pH should not exceed 7. Thus, an alert 508 is set up for this output property. If, in a process run 502, the pH of the resource output does in fact exceed 7.0, than a computer data transmission 510 corresponding to this alert is communicated.

System 48 provides a unique design for processes through unambiguous definition of state (e.g., the state of node inputs and node outputs) at whatever level of resolution needed to achieve the performance goals of a process (e.g., to satisfactorily stabilize the process). Such states include, for example, the "what" and "how much" for each of the node inputs and outputs. Examples of "what" can be a piece of equipment, human resource, type material or composition of matter, to name a few examples. System 48 advantageously provides a way to unite multiple disparate functional areas (e.g., chemistry, biology, life sciences, fermentation, manufacturing, analytical, different control systems, etc.) into a seamless process of repeatable material transformations (nodes) that can be versioned and for which the data from process runs can be evaluated using statistical techniques to achieve product control (e.g., identify root causes of unwanted variability).

Advantageously, the disclosed data structures fully define nodes (their input, their output, and hence the transformation that takes place at each node) without any ambiguity in the pertinent properties of each node input and each node output. However, it is to be noted that the actual transformation that takes place within a node does not necessarily need to be defined beyond a basic description (stage label) for record keeping and identification purposes. In some instances, process runs, in which the inputs of a node in a process are varied, are run and the outputs or final product of the process is statistically analyzed in view of these varied inputs to determine if the change in the inputs improves an aspect of the final product of the process (e.g., reproducibility, yield, etc.). One benefit of the disclosed systems and methods is that they provide mechanisms to understand the dynamics of a process (e.g., how variance in certain node inputs or properties of node inputs affect final product) and therefore allows the process to be successfully scaled up in size more easily. Because of the way processes are defined in the disclosed systems and methods, in some embodiments, it is possible to find sources of error (e.g., in the form of variance across process runs) that cause undesirable results (e.g. bad yield, poor reproducibility, etc.) in defined processes, or for that matter, desirable results. Examples of unwanted error in processes is application dependent and depends, for example on the type of node input or output, but can be for instance, measurement error or failure to quantify or even identify a relevant property of a node input or node output. For instance, if a node input is sugar, a measurement error may arise because the process by which the weight of the sugar input to the node is measured (e.g., the actual physical scale that weighs the sugar) is not sufficiently accurate. In another example, if a node input is sugar, a relevant property of the sugar may be lot number, because in the particular process, source sugar lot happens to have a profound impact on overall product yield.

Now that details of a system 48 for analyzing data have been disclosed, details regarding a flow chart of processes and features of the network, in accordance with an embodiment of the present disclosure, are disclosed with reference to FIG. 12.

As illustrated in block 1202 of FIG. 12A a method for analyzing product development information is provided at a computer system 200 comprising at least one processor 274 and a memory 192/290 storing at least one program for execution by the at least one processor.

The at least one program comprises instructions for storing a plurality of attribute records. In some embodiments, the plurality of attribute records define a version of a corresponding process in one or more processes for making one or more products. Each respective attribute record 206 in at least a subset of the plurality of attribute records comprises (i) a corresponding unique identifier 208, (ii) a superior/inferior attribute reference 210, and (iii) a heritage indicator 212. In some embodiments, a unique identifier is a label, symbol, string of symbols, number, shape, color, absolute or relative position in a sequence or coordinate system, or other descriptor that is associated only with one version of an attribute record in the attribute record data store.

A superior/inferior attribute reference 210 of a second attribute record 206-2 in the plurality of attribute records references a corresponding unique identifier 208-1 of a first attribute record 206-1 that is different than the second attribute record, thereby indicating that the second attribute record is a nested attribute record of the first attribute record. This is an example where the superior/inferior attribute reference 210 indicates a superior (parent) attribute record. In alternative embodiments, the superior/inferior attribute reference 210 indicates a nested (child) attribute record.

A heritage indicator 212 of a first attribute record 206-1 in the plurality of attribute records references (i) a parent reference 214 containing the corresponding unique identifier 208-3 of a third attribute record, that is different than the first attribute record, thereby indicating that the third attribute record is an ancestor attribute record of the first attribute record (in other words, that the first attribute record was copied from or otherwise derived from the third attribute record) and/or (ii) an attribute class record identifier 216 containing a unique identifier 228 of a first attribute class record 226, thereby identifying a class, in a plurality of classes, to which the first attribute record belongs, as well as a version identifier that identifies the version of the second attribute record in a genealogical network of related instances of the identified class.

Figure 7:
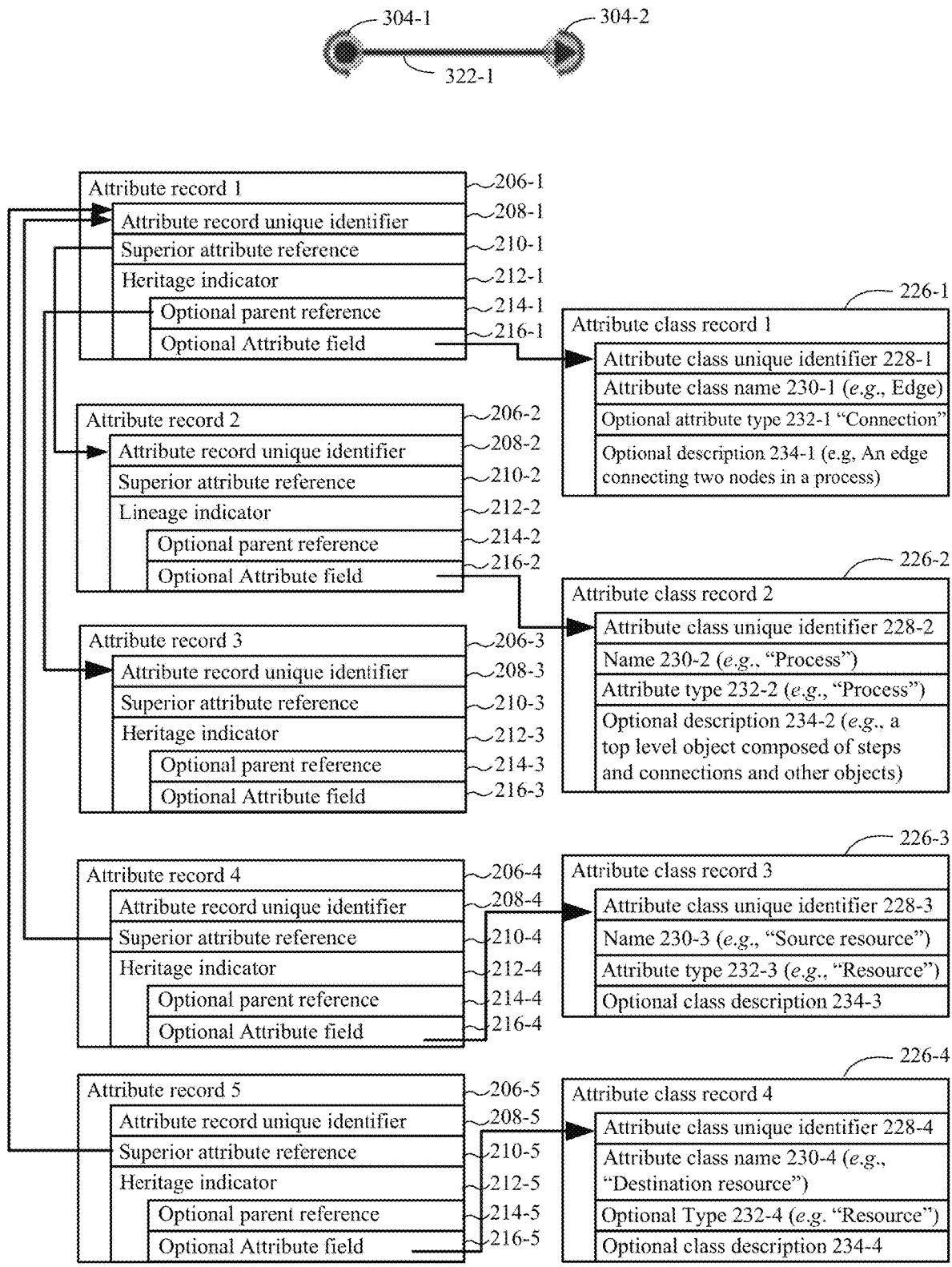
FIG. 7 illustrates a plurality of attribute records, where each respective attribute record in at least a subset of the plurality of attribute records comprises (i) a corresponding unique identifier, (ii) a superior attribute reference, and (iii) a lineage indicator, and where the plurality of attribute records encodes an edge between two such nodes in accordance with an embodiment of the present disclosure.

As an example of (i), referring to block 1208 of FIG. 12A and FIG. 7, in some embodiments the parent reference 214-1 of the heritage indicator 212-1 of the attribute record 206-1 references the corresponding unique identifier 208-3 of the third attribute record 206-3, thereby indicating that the third attribute record 206-3 is an ancestor to the first attribute record. That is, referring to FIG. 7, the parent reference 214-1 of attribute record 206-1 references the attribute record unique identifier 208 of attribute record 206-3, indicating that attribute record 206-3 is a parent of attribute record 206-1, in other words, that attribute record 206-1 was ultimately derived from or copied from attribute record 206-3.

As an example of (ii), referring to block 1210 of FIG. 12A, in some embodiments the heritage indicator 212 of the first attribute record is an attribute class record identifier 216 containing a unique identifier of the first attribute class record 226, in a plurality of attribute class records (e.g., attribute class store 224), thereby identifying the class to which the first attribute record belongs. For instance, referring to FIG. 7, the attribute class record identifier 216-1 of attribute record 206-1 references the attribute class unique identifier 228-1 of attribute class record 226-1, indicating that attribute record 206-1 belongs to the class of attribute class record 226-1. Moreover, although not shown in FIG. 7, in such embodiments, the heritage indicator 212-1 further specifies a version identifier that identifies the version of the attribute record 206-1.

Figure 12B:
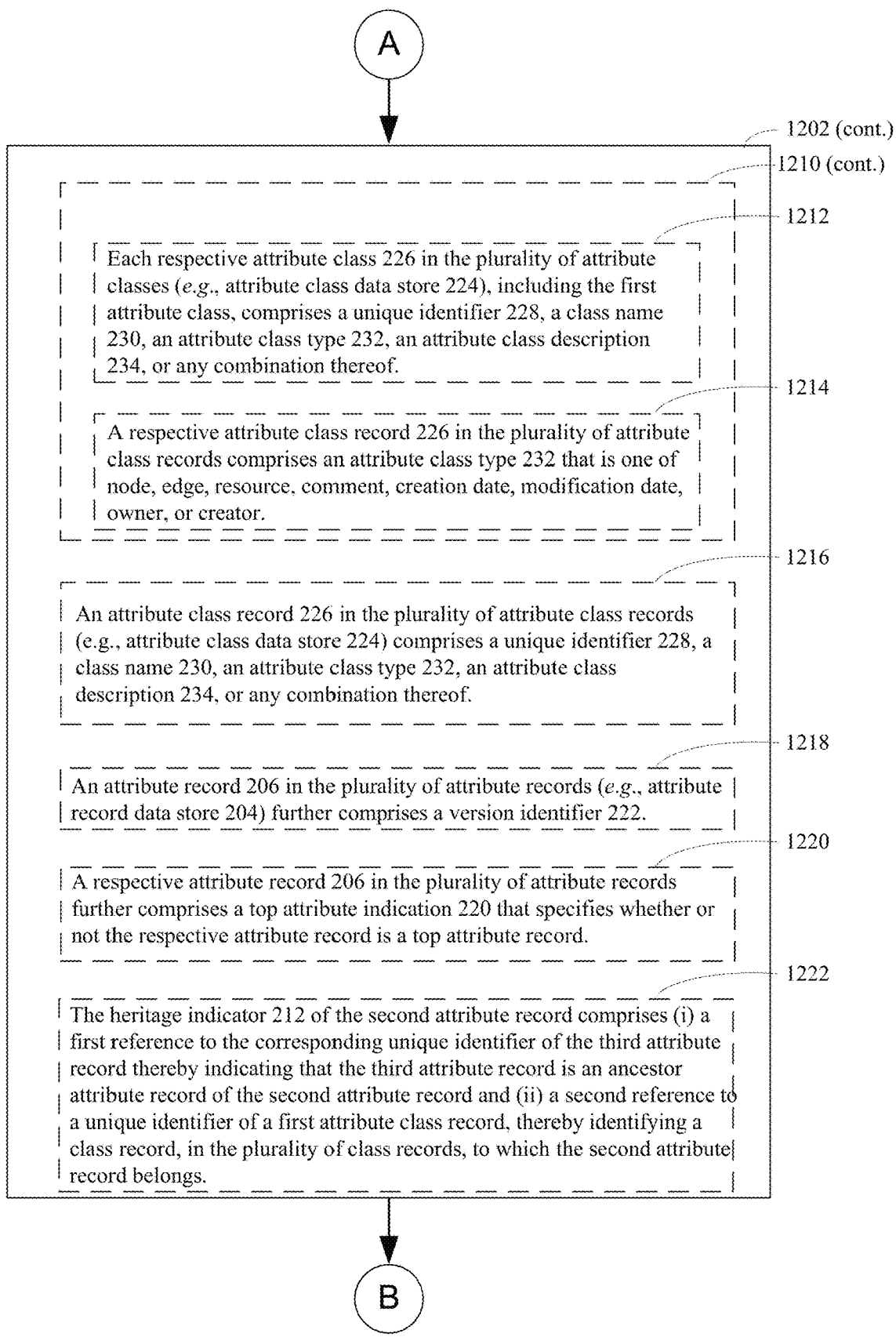

Referring to block 1222 of FIG. 12B, attribute record 206-1 is an example of a situation where the heritage indicator 212 of a second attribute record comprises a first reference 214 to the corresponding unique identifier of a third attribute record thereby indicating that the third attribute record is an ancestor attribute record of the second attribute record, and a second reference 216 to a unique identifier of a first attribute class record 226, thereby identifying an attribute class record, in a plurality of attribute class records, to which the second attribute record belongs.

In some embodiments, a unique identifier 208 is a label, symbol, string of symbols, number, shape, color, absolute or relative position in a sequence or coordinate system, or other descriptor that is associated only with one attribute record within the plurality of attribute records of the attribute record data store 204.

In some embodiments, an attribute class record identifier 228 is a label, symbol, string of symbols, number, shape, color, absolute or relative position in a sequence or coordinate system, or other descriptor that is associated only with one attribute class record 226 within the attribute class data store 224.

Figure 6:
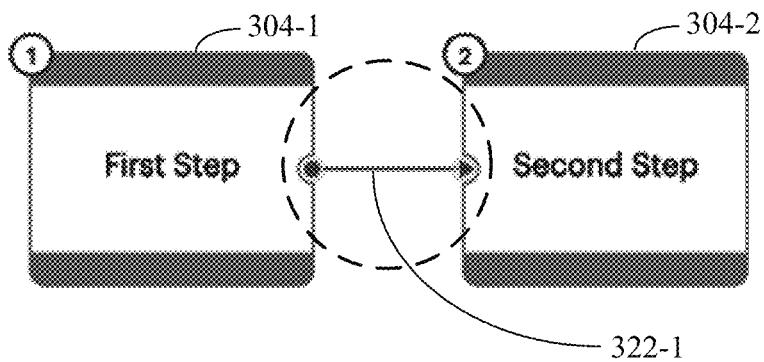
FIG. 6 illustrates an edge connecting a first node to a second node in accordance with an embodiment of the present disclosure.

FIGS. 6 and 7 illustrate a nonlimiting embodiment in which a relational database schema is encoded using the attribute records of the present disclosure. FIG. 6 illustrates a process that includes an edge 322-1 between a first node 304-1 and a second node 304-2. The first node 304-1 has a resource output 316-1 with an output property 318-1 with the output specifications 320-1 of 75 to 100. The second node 304-2 has a resource input 310-1 with a resource input property 312-1 with the input specification 323-1 within the enumerated list of "one," "two," and "three."

FIG. 7 illustrates how the process of FIG. 6, reproduced at the top of FIG. 7, can be encoded into a plurality of attribute records in accordance with the methods of the present disclosure. First consider edge 322-1, which is represented by attribute record 206-1. As illustrated in FIG. 7, first attribute record 206-1 has a heritage indicator 212-1 with an attribute class record identifier 216-1 that references the unique identifier 228-1 of the attribute class record 226-1. Thus, attribute record 206-1 is of the class of attribute class record 226-1. As indicated in FIG. 7, attribute class record 226-1 has an attribute class name 230-1 "edge," an optional attribute type 232-1 "Connection," and the optional description 234-1 for attribute class record 226-1 is that of "an edge connecting two nodes in a process." Thus, attribute record 206-1 defines an edge.

Attribute record 206-1 defines an edge between nodes 304-1 and 304-2 in the following manner. First, node 304-1 is represented by attribute record 206-4. Second, node 304-2 is represented by attribute record 206-5. The respective superior/inferior attribute references 210-4 and 210-5 of attribute records 206-4 and 206-5 both reference the attribute record identifier 208-1 of attribute record 206-1. This means that the attribute records 206-4 and 206-5 are nested attribute records of attribute record 206-1. Moreover, the attribute class record identifier 216-4 of the heritage indicator 212-4 of attribute record 206-4 references the attribute class record unique identifier 238-3 of attribute class record 226-3. Thus, attribute record 206-4 is of attribute class record 226-3. Attribute class record 226-3 has a name 230-3 of "Source resource," and an attribute type 232-3 of "Resource." In this way, attribute record 206-4 is set up to be a resource input 310 for node 304-2 that is specified by edge 322-1. Further, the attribute class record identifier 216-5 of the heritage indicator 212-5 of attribute record 206-5 references the attribute class record unique identifier 238-4 of attribute class record 226-4. Thus, attribute record 206-5 is of attribute class record 226-4. Attribute class record 226-4 has a name 230-4 of "Destination resource," and an attribute type 232-4 of "Resource." In this way, attribute record 206-5 is set up to be a resource output 316 for node 304-1 that is specified by edge 322-1.

Further still, the parent reference 214-1 of attribute record 206-1 contains the attribute record unique identifier 208-2 of attribute record 206-2. The attribute class record identifier 216-2 of the heritage indicator 212-2 of attribute record 206-2 contains the attribute class record unique identifier 228-2 of attribute class record 226-2. Thus, attribute record 206-2 is of attribute class record 226-2. Attribute class record 226-2 has a name 230-2 of "Process," and an attribute type 232-2 of "Process." In this way, attribute record 206-2 designates the process comprising node 304-1, edge 322-1 and node 304-2. This is an example of how a heritage indicator 212 of an attribute record 206 can be used to assign the attribute record to a particular node in a hypergraph. More generally, the heritage indicator 212 can be used to assign an attribute record to a particular edge in a hypergraph, to a resource type, to a comment, a creation date, a modification date, an owner, a creator, an input property 312, an output property 318, an input specification 313 of an input property 312, or an output specification 320 of an output property 318 (block 1216 of FIG. 12B).

While the attribute class record identifier 216-1 of attribute record 206-1 contains the attribute class record unique identifier 228-1 of attribute class record 226-1 indicating that attribute record 206-1 is of attribute class record 226-1 (an edge), the parent reference 214-1 of attribute record 206-1 contains the attribute record unique identifier 208-3 of attribute record 206-3 indicating that attribute record 206-3 is an ancestor of attribute record 206-1. In other words, attribute record 206-1 is copied from or otherwise derived from attribute record 206-3.

FIG. 8 illustrates an attribute record data store 204 in the form of a table in accordance with an embodiment of the present disclosure. Each row of the table of FIG. 8 describes a different attribute record 206. As illustrated in FIG. 8, not all the fields of the table need to be populated in any given attribute record and in FIG. 8, fields that have no entry are null.

In the exemplary attribute record data store 204 of FIG. 8, each respective attribute record 206 includes an attribute record identifier 208 that uniquely identifies the attribute record. For example, the first attribute record 206 listed in the Table has an attribute record identifier 208 of "5." More generally, an attribute record identifier 208 is a label, symbol, string of symbols, number, shape, color, absolute or relative position in a sequence or coordinate system, or other descriptor that is associated only with one attribute record 206 in the attribute record data store 204.

In the exemplary attribute record data store 204 of FIG. 8, each respective attribute record 206 further includes an attribute name identifier that names the attribute record. For example, the first attribute record 206 listed in the Table has an attribute name identifier of "Second Step." The attribute name identifier is not strictly necessary and is not found in some embodiments of the present disclosure.

Continuing with FIG. 8, each respective attribute record 206 further includes a top attribute indication 220 ("topAttribute") that signifies whether the respective attribute record is the top attribute record of all other attribute records for a given process that is stored in the attribute record data store (see also block 1220 of FIG. 12B). In other words, that the respective attribute record is not a nested instance of any other attribute records in the attribute record data store. It will be appreciated that, in some embodiments, the attribute records data store 204 includes attribute records for several different processes. Each such process can have a top attribute record and the top attribute indication 220 is used to designate which attribute record in a given process is the top attribute record. When an attribute record is the top attribute record, the superior/inferior attribute parent reference 210 for that attribute record will be null. FIG. 8 illustrates. Each of the attribute records in the Table has a topAttribute (top attribute indication 220) that is zero (meaning in this example that the corresponding attribute records are not top attribute records) except for the attribute records having the attribute record unique identifier 208 "11." The top attribute indication 220 is not strictly necessary in some embodiments and, in fact, is not found in some embodiments of the present disclosure. In some embodiments attribute records do not have a topAttribute indicator.

Continuing with FIG. 8, each respective attribute record 206 further includes a superior/inferior attribute reference 210 ("superiorAttrid") that signifies whether the respective attribute record is a nested attribute record of a superior attribute record (superior) or the respective attribute record is a parent attribute record of another nested (child) attribute record. As discussed above, the top attribute record "11" of FIG. 8 does not have a superior attribute record. However, the superior attribute reference 210 of attribute record "12" in FIG. 8 references the attribute record unique identifier "11" indicating the superior attribute record of attribute record 12 is attribute record 11.

Continuing with FIG. 8, each respective attribute record 206 further includes an attribute class record identifier 216 ("attrClassid") that is a reference to a unique class identifier in the attribute class data store 224 of FIG. 9 that defines the class that the attribute record is in and its attributes. For example, referring to the attribute record with the attribute record unique identifier "11" in FIG. 8, it has an attribute class record identifier 216 ("attrClassid") value of "1". Turning to the attribute class store 224 of FIG. 9, it is seen that the attribute class record 226 in the store 224 is the class "Process." This means that the attribute record "11" is of class "Process." As illustrated in FIG. 8, the attribute class record identifier 216 is not populated in at least some of the attribute records in the attribute record data store 206.

Continuing with FIG. 8, a respective attribute record 206 further includes a version identifier 222 ("version", block 1218 of FIG. 12B). A version identifier 222 is a label, symbol, string of symbols, number, shape, color, absolute or relative position in a sequence or coordinate system, or other descriptor that is associated only with one version of an attribute record within the attribute record data store 204. The version identifier 222 in combination with the attribute record unique identifier 208 defines a particular state of an attribute record 206 at an instance in time. For example, referring to the attribute record with the attribute record unique identifier "11" in FIG. 8, it has a version identifier 222 ("version") value of "1" whereas the attribute record with the attribute record unique identifier "19" i has a version identifier 222 value of "2". Thus, in the instance of time in which the attribute record data store 204 is polled, attribute record 11 is on version 1 of the attribute record 11, and attribute record 19 is on version 2 of the attribute record 19. As illustrated in FIG. 8, the version identifier 222 is not populated in at least some of the attribute records in the attribute record data store 206. In other embodiments, the version identifier 222 is populated in all of the attribute records in the attribute record data store 206. However, in some embodiments, the version identifier 222 is optional and, in fact, not used.

Continuing with FIG. 8, each respective attribute record 206 further includes a parent reference 214 ("parent"). A parent reference 214 of a respective attribute record 206 is a label, symbol, string of symbols, number, shape, color, absolute or relative position in a sequence or coordinate system, or other descriptor that uniquely indicates the attribute record from which the present version of the respective attribute 206 is copied. If a parent reference 214 exists it a respective attribute record 206, it means that the respective attribute record is part of a genealogical lineage of parent-child attributes records. FIG. 8 illustrates. In FIG. 8, the parent reference 214 of attribute record "19," which is version 2, has the value "5" meaning that attribute record "19" was copied from attribute record "5." In attribute record "5" it is seen that the version identifier 222 of that attribute record is "1." Thus, attribute record "19" is a second version of attribute record "5," or, in other words, attribute record "19" is a copied from attribute record "5." In this way, advantageously, the lineage of how an attribute record 206 was derived or copied from other attribute records can be traced using the parent reference 214. As illustrated in FIG. 8, the parent reference 214 is not populated in at least some of the attribute records in the attribute record data store 206. In other embodiments, the parent reference 214 is populated in all of the attribute records in the attribute record data store 206. However, in some embodiments, the parent reference 214 is optional and, in fact, not used.

Continuing with FIG. 8, each respective attribute record 206 further includes an attribute value 218 ("value"). For instance, referring to block 1204 of FIG. 12A, in some embodiments, each respective attribute record 206 of one or more respective attribute records 206 in the plurality of attribute records of the attribute record data store 204 further comprises a corresponding attribute value 218 that defines a state of the respective attribute record. That is, an attribute value 218 of a respective attribute record 206 defines a state of the respective attribute record. For example, in some embodiments, an attribute value is populated with a viscosity value, a purity value, a composition value, a temperature value, a weight value, a mass value, a volume value or a unit value, an enumerated list, a range of values, or a process version. For example, in FIG. 8, the attribute record "16" has the attribute value "L" indicating the attribute state "Liters." The attribute record "17" has the attribute value "75" indicating an upper limit of "75." The attribute record "18" has the attribute value "100" indicating a lower limit of "100." The attribute record "22" has the attribute value "one, two, or three" indicating an option list of "one," "two," or "three." As illustrated in FIG. 8, the attribute value 218 is not populated in at least some of the attribute records in the attribute record data store 206.

Referring to block 1206 of FIG. 12A, in some embodiments, the corresponding unique identifier 208 and corresponding attribute value 218 of a respective attribute record 206 of one or more respective attribute records in the plurality of attribute records forms an attribute-value pair, also known as a key:value pair.

FIG. 9 illustrates an attribute class data store 224 in the form of a table in accordance with an embodiment of the present disclosure. Each row of the table of FIG. 9 describes a different attribute class record 226. Referring to block 1212 of FIG. 12B, in some embodiments, each respective attribute class record 226 in the plurality of attribute classes (e.g., attribute class data store 224), including the first attribute class record 226-1, comprises a unique identifier 228, a class name 230, an attribute class record type 232, an attribute class record description 234, or any combination thereof.

In the exemplary attribute class data store 224 of FIG. 9, each respective attribute class record 226 includes an attribute class record identifier 228 that uniquely identifies the attribute class record. For example, the first attribute class record 226 listed in the Table has an attribute class record identifier 228 of "1." More generally, an attribute class record identifier 228 is a label, symbol, string of symbols, number, shape, color, absolute or relative position in a sequence or coordinate system, or other descriptor that is associated only with one attribute class record 226 in the attribute class data store 224.

Continuing with FIG. 9, in some embodiments, each respective class 226 further includes an attribute type 232 ("type") designating a particular attribute class record type. In so doing, the attribute type 232 defines which attribute records 206 should or could be compared to each other for similarities, differences or changes. Nonlimiting examples of particular attribute class record types, and with reference to block 1214 of FIG. 12B, are process, node (step), edge (connection), resource output, resource input, property, input property, output property, input specification, output specification, source, destination, unit, option list, resource, input, output, equipment, comment, creation date, modification date, owner, or creator. In some embodiments, a respective class 226 does not include an attribute type 232 ("type") designating a particular attribute class record type.

In some embodiments, the class "process" is a top level object composed of steps (nodes) and connections and other attributes. In some embodiments, the class "node" signifies a step in a process that transforms inputs to outputs. In some embodiments, the class "edge" signifies a connection between two node nodes in a process. In some embodiments, the class "resource output" signifies a physical thing or information that is outputted by a node. In some embodiments, the class "resource input" signifies a physical thing or information that is inputted by or operated on (e.g., equipment) by a node. In some embodiments, the class "property" signifies a particular attribute of a resource (e.g., lot number, purity, manufacturer, date, origin, etc.). In some embodiments, the class "input property" signifies the property of a resource that is inputted into a node in a process. In some embodiments, the class "output property" signifies the property of a resource that is outputted from a node in a process. In some embodiments, the class "input specification" signifies a constraint on a resource input. In some embodiments, the class "output specification" signifies a constraint on a resource limit. In some embodiments, the class "source" signifies a source node in a process (e.g., for an edge). In some embodiments, the class "destination" signifies a designation node in a process (e.g., for an edge). In some embodiments, the class "unit" signifies a type of unit for a resource, an input property, an output property, an input specification, or an output specification. In some embodiments, the class "option list" signifies the use of an enumerated list of options. In some embodiments, the class "resource" signifies a physical thing or information. In some embodiments, the class "input" signifies an input to a node. In some embodiments, the class "output" signifies an output to a node. In some embodiments, the class "equipment" signifies the identification information of specific equipment. In some instances, the class "equipment" signifies the unique identification a particular piece of equipment (e.g., the unique serial number of a particular instrument that uniquely identifies that instrument). In some instances, the class "equipment" signifies the identification of a class of equipment (e.g., the model of a particular instrument that uniquely encompasses any instrument of that model).

Continuing with FIG. 9, in some embodiments, each respective attribute class record 226 further includes an attribute description 234 ("description") describing a particular attribute class. For example, in FIG. 9, attribute class record "1" has the description "a top level object composed of steps and connection and other attributes." In some embodiments, a respective attribute class record 226 does not include an attribute description 234.

Figure 12C:
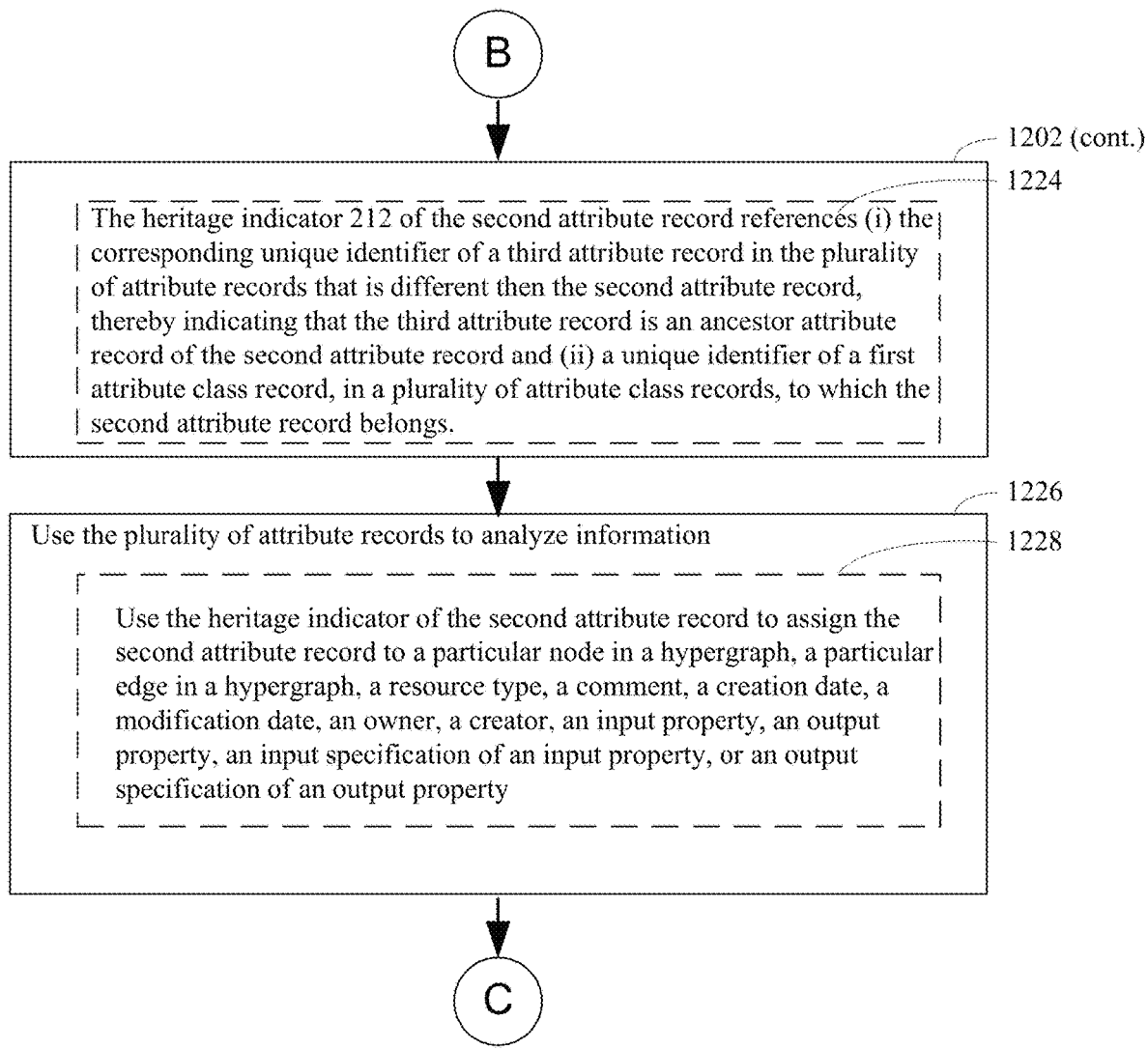

Thus, FIGS. 7, 8, and 9 and the discussion of blocks 1202 through 1224 of FIGS. 12A, 12B, and 12C describe the attribute records 206 of the present disclosure. In the disclosed systems and methods, the plurality of attribute records are used to analyze information (block 1226 of FIG. 12C). It will be appreciated, that more generally, process objects, each comprising one or more attributes can be used to analyze information. That is, an attribute record is an example of a process object in an collection of process objects that define a process.

In some embodiments in which attribute records are used, and with reference to block 1228 of FIG. 12C, the method further comprises, for each respective attribute record in all or a subset of the plurality of attribute records, using the heritage indicator of the respective attribute record to assign the respective attribute record to a particular node in a hypergraph, a particular edge in a hypergraph, a resource type, a comment, a creation date, a modification date, an owner, a creator, an input property, an output property, an input specification of an input property, or an output specification of an output property thereby defining a hypergraph 238 for a process 236. In some such embodiments, the hypergraph comprises a plurality of nodes (e.g., nodes 304-1 and 304-2 of FIG. 6) connected by edges in a set of one or more edges (e.g., edge 322-1 of FIG. 6), where a first node (e.g., node 304-1 of FIG. 6) in the plurality of nodes is associated with at least one input or at least one output and each respective edge (e.g., edge 322-1 of FIG. 6) in the set of one or more edges is associated with a corresponding output of a source node in the plurality of nodes and also is associated with at least a corresponding input of at least one destination node in the plurality of nodes.

In some embodiments, the method further comprises using the heritage indicator of a first attribute record 206 to assign the first attribute record 206 to a particular node 304 in the plurality of nodes of a hypergraph, a particular edge 322 in the set of one or more edges of the hypergraph, an output property 318 associated with a resource output 316 in the at least one resource output of the first node, an output specification 320 associated with a resource output 316 in the at least one resource output of the first node, an input specification 313 of an input property 312 of a resource input 308 in the at least one resource input of the first node, an output specification 320 of an output property 318 of a resource output 316 in the at least one resource output of the first node, an obtained value 218 of an input property of a resource input 310 in the at least one resource input of the first node, or an obtained value 218 of an output property of a resource output 316 in the at least one output of the first node. One example of the use of the plurality of attribute records to define a hypergraph 238 for a process 236 has been described above in conjunction with FIGS. 6 and 7 in particular, as wells as FIGS. 8 and 9.

Figure 12D:
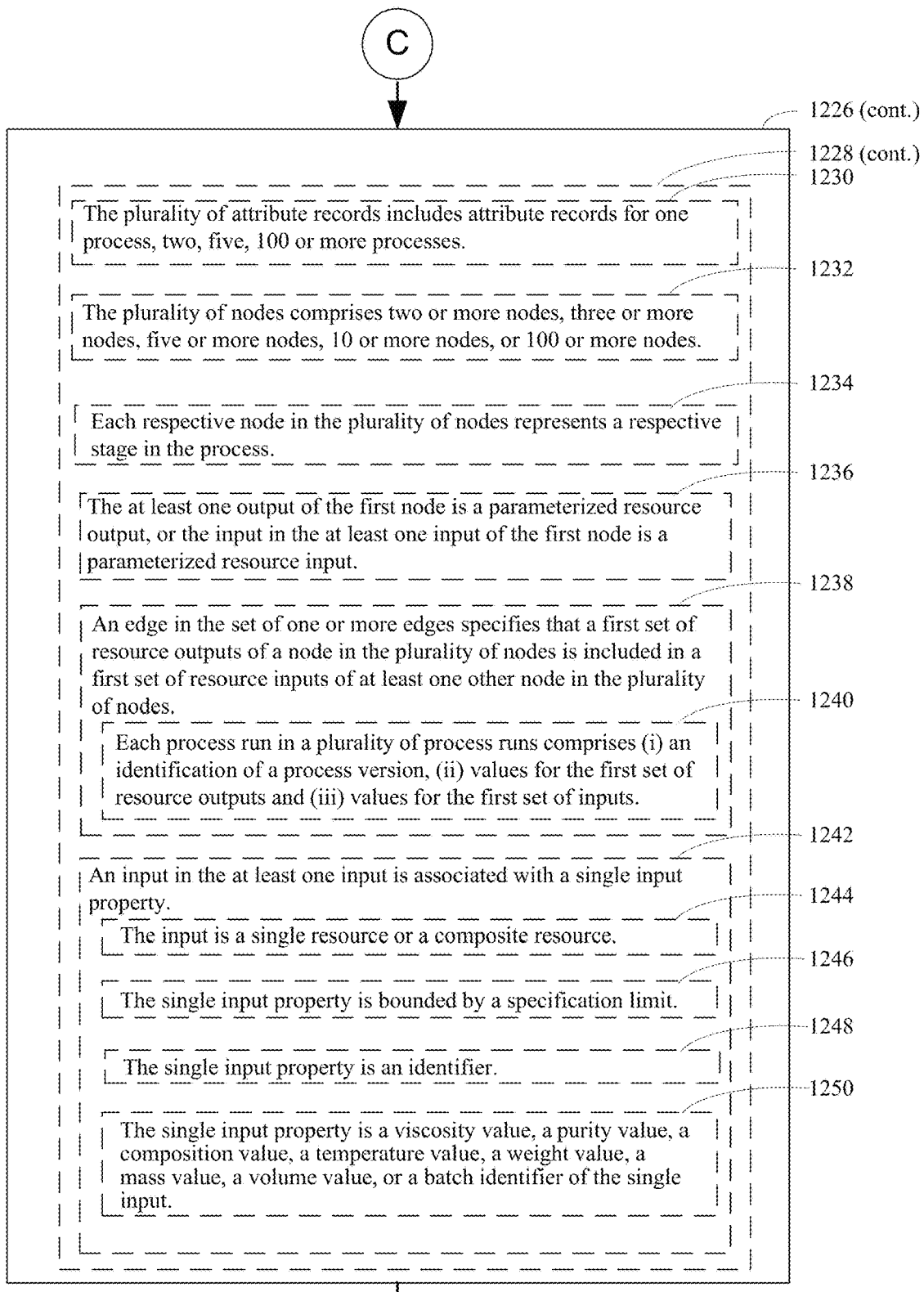

Referring to block 1230 of FIG. 12D, in some embodiments the plurality of attribute records 206 includes attribute records for a single process, two or more processes, five or more processes, or 100 or more processes 236.

Referring to block 1232 of FIG. 12D, in some embodiments the plurality of nodes 304 comprises two or more nodes, three or more nodes, five or more nodes, 10 or more nodes, or 100 or more nodes.

Referring to block 1234 of FIG. 12D, in some embodiments each respective node 304 in the plurality of nodes represents a respective stage in the process 236.

Referring to block 1236 of FIG. 12D, in some embodiments the at least one resource output 316 of the first node 304 is a parameterized resource output, or the input in the at least one input of the first node is a parameterized resource input.

Referring to block 1238 of FIG. 12D, in some embodiments an edge 322 in the set of one or more edges specifies that a first set of resource outputs 314 of a node 304 in the plurality of nodes is included in a first set of resource inputs 308 of at least one other node in the plurality of nodes. Referring to block 1240 of FIG. 12D, in some such embodiments each process run 402 in the plurality of process runs comprises (i) an identification of a version for the process (process version), (ii) values for the first set of resource outputs and (iii) values for the first set of resource inputs.

In some embodiments, an attribute record 206 represents a node 304, an edge 322, a source node 324, a destination node 326, a resource input 310, an input property 312, an input specification 313, a resource output 316, an output property 318, or an output specification 320.

A process, including all of its identifiers, nodes, edges, attributes and nested attributes is encoded as a data element that is stored in the system. Any one or more of several possible encodings, or combinations thereof, may be used. Encodings in the form of relational tables has been described above.

Figure 13:
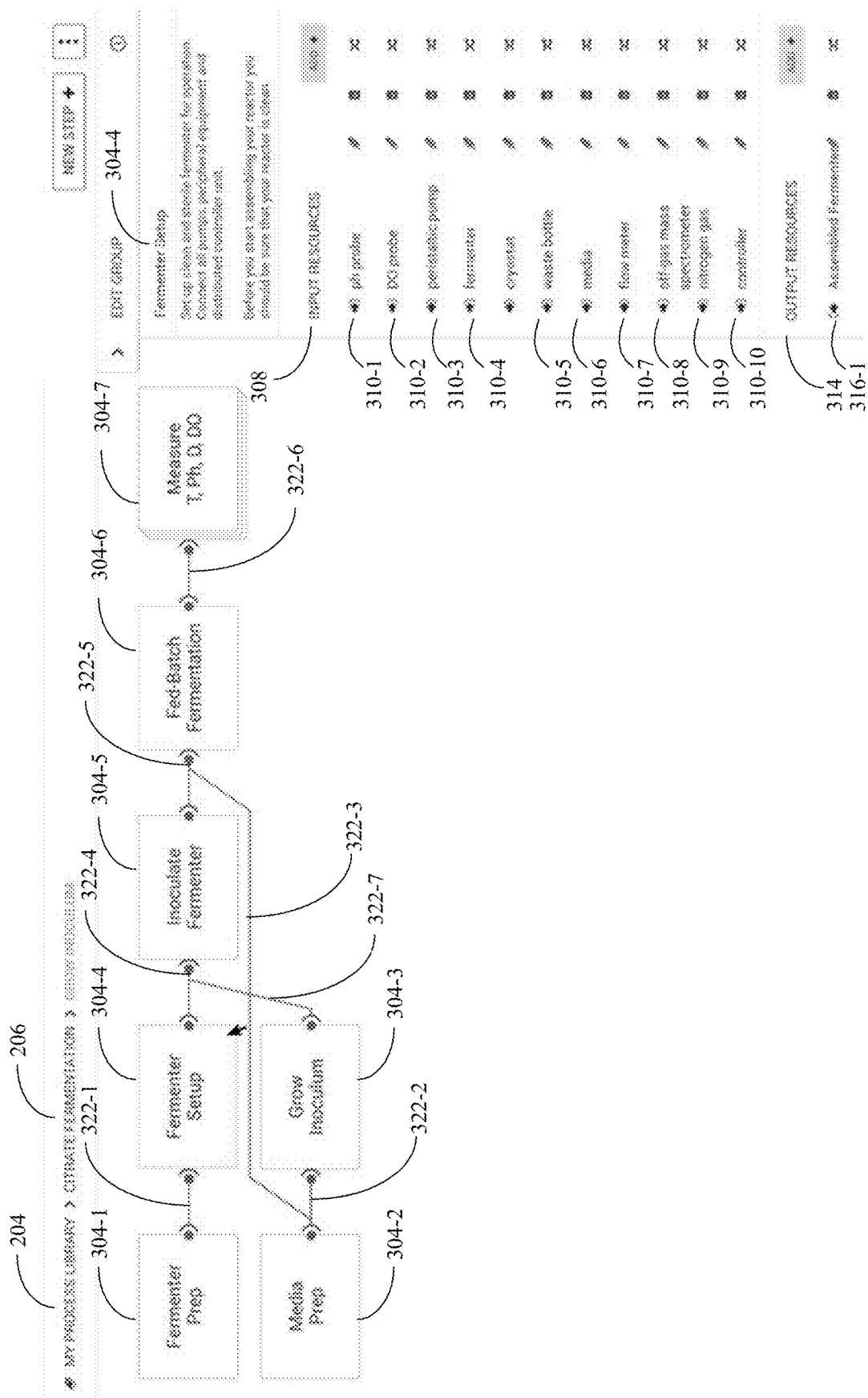
FIG. 13 illustrates a portion of a hypergraph in accordance with an embodiment of the present disclosure.

FIG. 13 illustrates an encoding of a particular version of a process (process version 301) in the form of a graph. The process version includes a hypergraph that includes a plurality of nodes 304 corresponding to respective stages of a process (e.g., "Fermenter Prep," "Fermenter Setup," "Media Prep," "Grow Inoculum," "Inoculate Fermenter," "Fed-Batch Fermentation," and "Measure T, Ph, D, DO"). In some embodiments, concurrency is supported. That is, multiple users, each operating at a different client computer in communication with computer system 200, can view an instance of the process version displayed in FIG. 13, make changes to it, and view and analyze data from process runs that make use of it.

While FIG. 13 demonstrates a hypergraph that is encoded in a graph, the hypergraph of FIG. 13 is suitable for outlining numerous features of the hypergraphs of the present disclosure, regardless of the manner in which they are encoded. Moreover, while discussion of the hypergraph is in terms of a plurality of attribute records, it will be appreciated that more generally such a hypergraph can be defined by a plurality of process objects in a collection of process objects.

In the embodiment illustrated in FIG. 13, each node 304 is associated with a set of resource inputs 308 to the respective stage in the corresponding process. In some embodiments, no resource input 310 in the set of resource inputs 308 is associated with one or more input properties 312. In some embodiments, at least one resource input 310 in the set of resource inputs 308 is associated with one or more input properties 312. In some embodiments the one or more input properties include an input specification 313. In some embodiments none of the one or more input properties include an input specification 313. Each node 304 is also associated with a set of resource outputs 314 to the respective stage in the corresponding process. In some embodiments none of the resource outputs 316 in the set of resource outputs are associated with one or more output properties 318. In some embodiments at least one of the resource outputs 316 in the set of resource outputs is associated with one or more output properties 318. In some embodiments, the one or more output properties 318 include a corresponding output specification 320. In some embodiments, the one or more output properties 318 do not include a corresponding output specification 320.

FIG. 13 illustrates the set of resource inputs 308 and the set of resource outputs 314 for the node 304-4 "Fermenter Setup." In some embodiments, a user can simply click on a node 304 to see their inputs and outputs. Moreover, unstructured data in the form of videos, pictures, or comments can be added to nodes 304. For example, a video showing the proper way to perform a procedure associated with a node can be linked to a node by simply dragging an icon link to the video onto the representation of node 304. To further illustrate, a video on the proper way perform a fermenter setup can be dragged onto the "Fermenter Setup" node 304-4 of FIG. 13. Thereafter, when a user clicks on node 304-4, the video is played.

Each respective edge 322 in the one or more edges specifies that the set of resource outputs 314 of a node 304 in the plurality of nodes is included in the set of resource inputs 308 of at least one other node in the plurality of nodes. Thus, turning to FIG. 13 to illustrate, the set of resource inputs for node 304-7 "Measure T, Ph, D, DO" consists of the set of resource outputs for node 304-6 "Fed-Batch Fermentation."

To illustrate a set of resource inputs 308, in some embodiments, the set of resource inputs 308 for a node 304 in the plurality of nodes of a hypergraph 302 for a process version 301 in a plurality of process versions comprises a first 310-1 and second resource input 310-2. The first resource input specifies a first resource and is associated with a first input property 312-1. The second resource input 310-2 specifies a second resource and is associated with a second input property 312-2. In some embodiments, the first input property is a viscosity value, a purity value, composition value, a temperature value, a weight value, a mass value, a volume value, or a batch identifier of the first resource. FIG. 13 illustrates. Node 304-4 "Fermenter Setup" includes in its associated set of resource inputs 308 a fermenter 310-4 and a waste bottle 310-5 among other resource inputs. Although not shown in FIG. 13, the fermenter 310-3 is associated with a first input property, such as a size of the fermenter or a fermenter make/model number. Furthermore, waste bottle 310-5 is associated with a second input property, such as a size of the waste bottle 310-5 or a waste bottle 310-5 make and model number.

Referring to block 1242 of FIG. 12D, in some embodiments a resource input in the at least one resource input is associated with a single input property.

Referring to block 1244 of FIG. 12D, in some such embodiments the resource input is a single resource or a composite resource. In some embodiments a resource input 310 is a single resource. For instance, in FIG. 13, resources 310-1 through 310-10 are all examples of single resources. In some embodiments, a resource input 310 is a composite resource. Examples of composite resources include, but are not limited, to mixtures of compositions (e.g., media, broth, etc.) and multi-component equipment.

Referring to block 1246 of FIG. 12D, in some embodiments the single input property is bounded by a specification limit. Referring to block 1248 of FIG. 12D, in some such embodiments the single input property is an identifier. Referring to block 1250 of FIG. 12D, in some such embodiments the single input property is a viscosity value, a purity value, a composition value, a temperature value, a weight value, a mass value, a volume value, or a batch identifier of the single input.

Figure 12E:
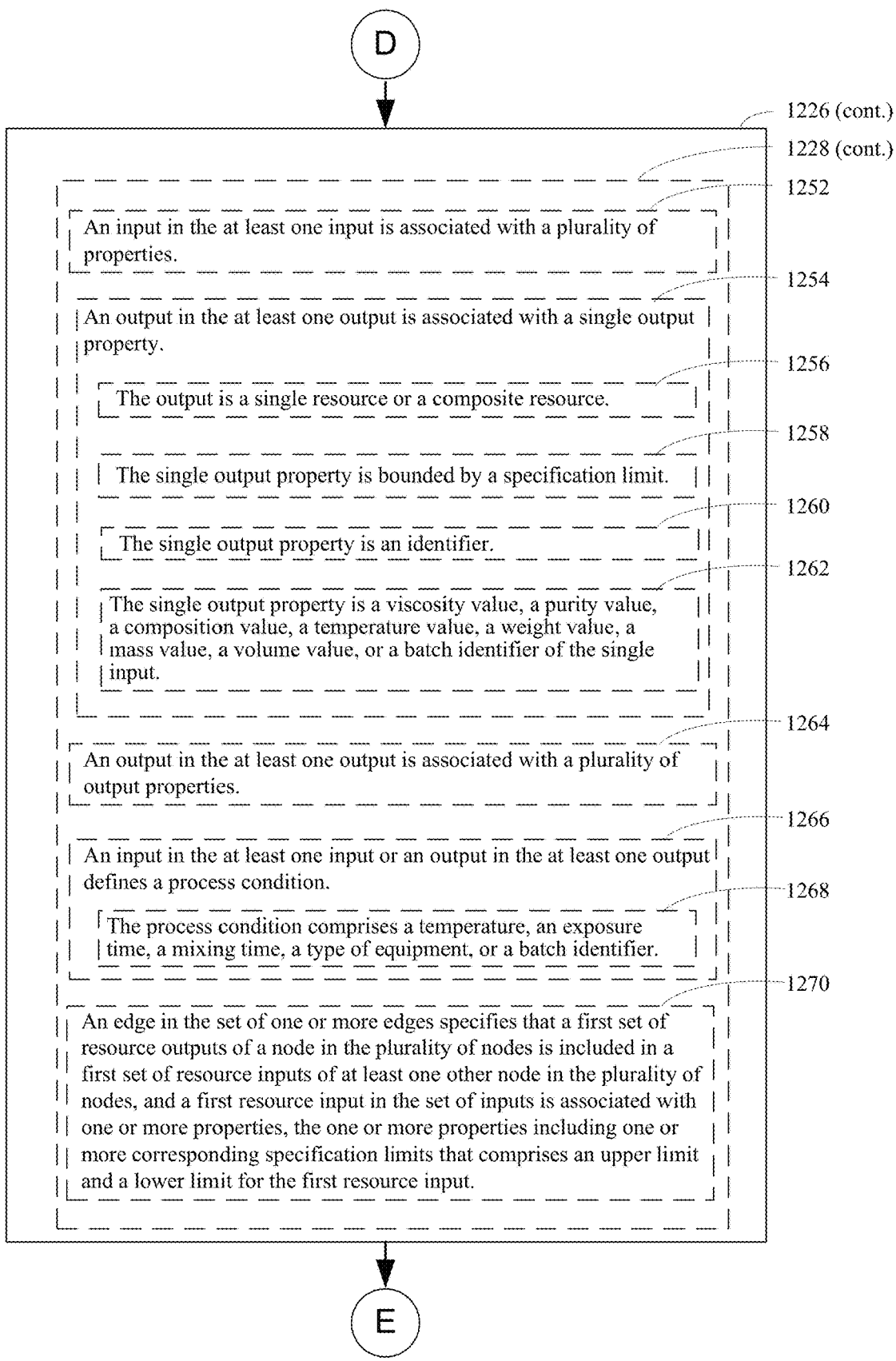

Referring to block 1252 of FIG. 12E, in some embodiments the resource input in the at least one resource input is associated with a plurality of resource input properties.

Referring to block 1254 of FIG. 12E, in some embodiments an output in the at least one output is associated with a single output property. Referring to block 1254 of FIG. 12E, in some such embodiments the output is a single resource or a composite resource. Referring to block 1258 of FIG. 12E, in some embodiments the single output property is bounded by a specification limit. Referring to block 1260 of FIG. 12E, in some embodiments the single output property is an identifier. Referring to block 1262 of FIG. 12E, in some embodiments the single output property is a viscosity value, a purity value, a composition value, a temperature value, a weight value, a mass value, a volume value, or a batch identifier of the output.

Referring to block 1264 of FIG. 12E, in some embodiments a resource output in the at least one resource output is associated with a plurality of output properties.

Referring to block 1266 of FIG. 12E, in some embodiments a resource input in the at least one resource input or a resource output in the at least one resource output defines a process condition. Referring to block 1268 of FIG. 12E, in some such embodiments the process condition comprises a temperature, an exposure time, a mixing time, a type of equipment, or a batch identifier.

Referring to block 1270 of FIG. 12E, in some embodiments an edge in the set of one or more edges specifies that a first set of resource outputs of a node in the plurality of nodes is included in a first set of resource inputs of at least one other node in the plurality of nodes, and a first resource input in the set of inputs is associated with one or more properties, the one or more resource input properties including one or more corresponding specification limits that comprises an upper limit and a lower limit for the first resource input.

Figure 12F:
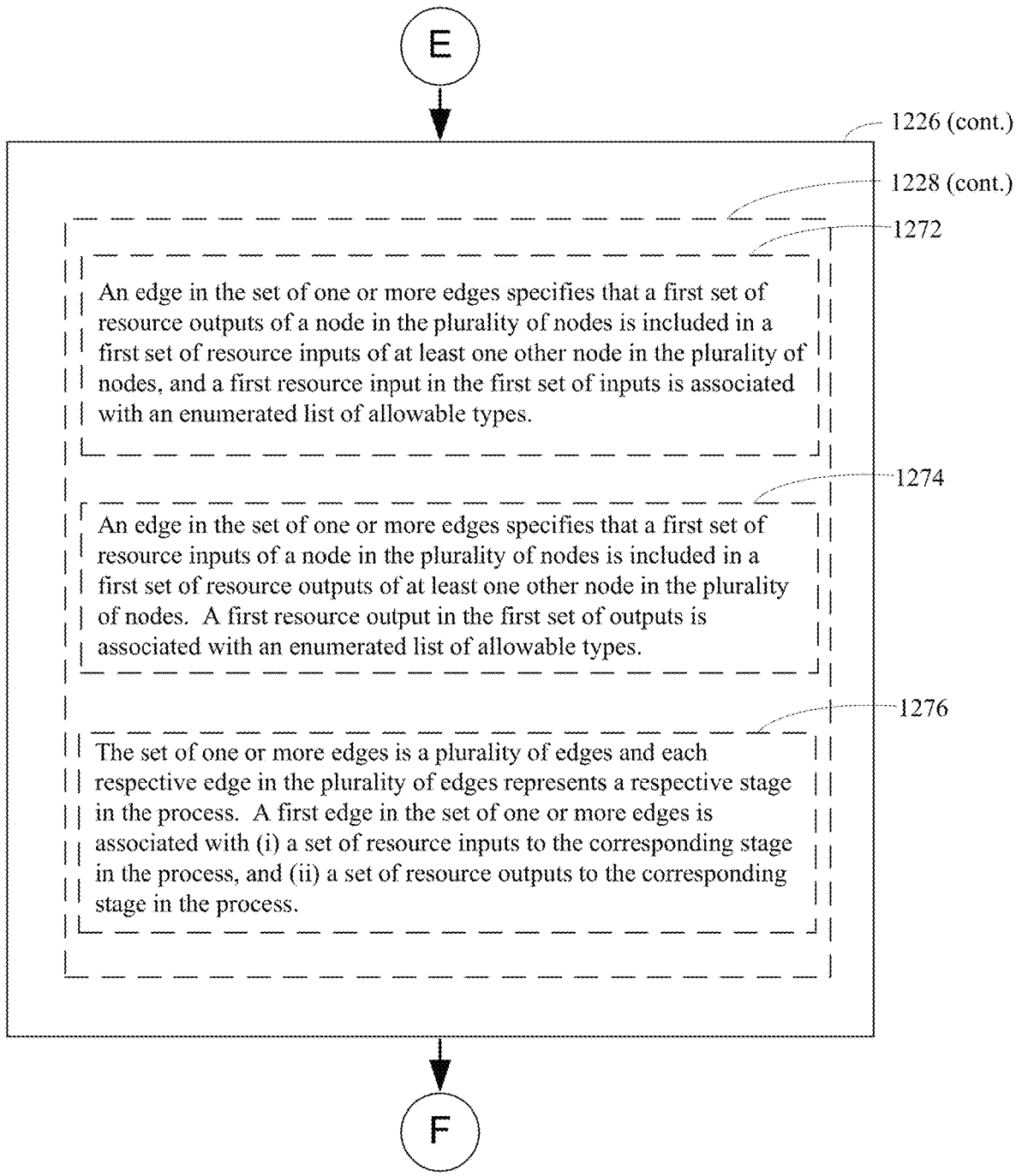

Referring to block 1272 of FIG. 12F, in some embodiments an edge in the set of one or more edges specifies that a first set of resource inputs of a node in the plurality of nodes is included in a first set of resource outputs of at least one other node in the plurality of nodes, and a first resource output in the first set of outputs is associated with one or more output properties, the one or more output properties including one or more corresponding output specification that comprises an upper limit and a lower limit for the first resource output. To illustrate, an example of an output property is pH of a composition. In such an example, the output specification specifies the allowed upper limit for the pH of the composition and the allowed lower limit for the pH of the composition. In alternative embodiments, this corresponding output specification comprises an enumerated list of allowable types. To illustrate, an example of an output property is a crystallographic orientation of a material. In such an example, the output specification specifies an enumerated list of allowed crystallographic orientations for the material.

Referring to block 1274 of FIG. 12F, in some embodiments an edge in the set of one or more edges specifies that a first set of resource outputs of a node in the plurality of nodes is included in a first set of resource inputs of at least one other node in the plurality of nodes, and a first resource input in the first set of inputs is associated with an enumerated list of allowable types.

Referring to block 1276 of FIG. 12F, in some embodiments the set of one or more edges is a plurality of edges and each respective edge in the plurality of edges represents a respective stage in the process, a first edge in the set of one or more edges is associated with (i) a set of resource inputs to the corresponding stage in the process, and (ii) a set of resource outputs to the corresponding stage in the process.

Figure 12G:
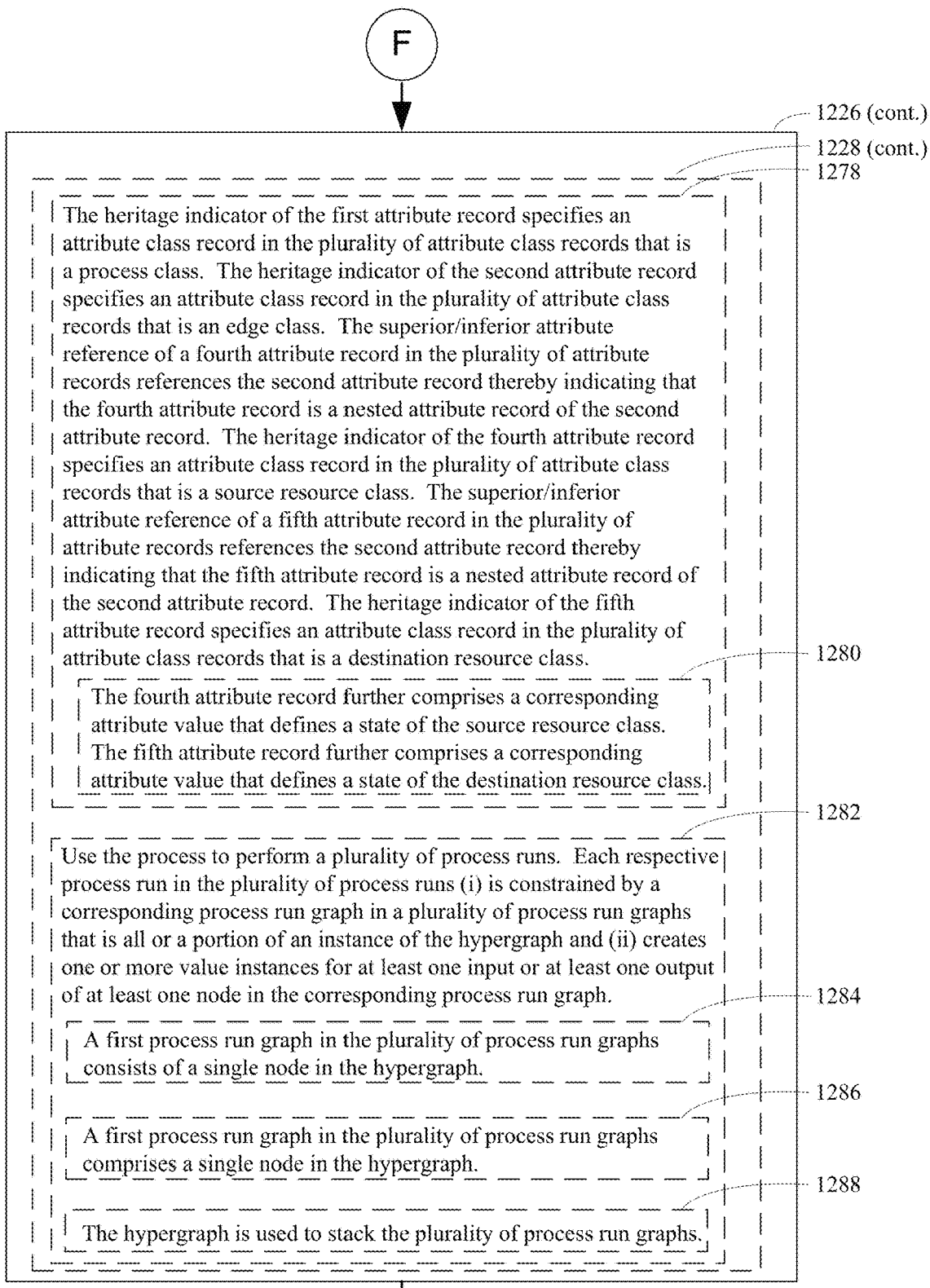

Referring to block 1278 of FIG. 12G, in some embodiments the heritage indicator of the first attribute record specifies an attribute class record in the plurality of attribute class records that is a process class, the heritage indicator of the second attribute record specifies an attribute class record in the plurality of attribute records that is an edge class, the superior attribute reference of a fourth attribute record in the plurality of attribute records references the second attribute record thereby indicating that the fourth attribute record is a nested attribute record of the second attribute record, the heritage indicator of the fourth attribute record specifies an attribute class record in the plurality of attribute class records that is a source resource class, the superior/inferior attribute reference of a fifth attribute record in the plurality of attribute records references the first attribute record thereby indicating that the fifth attribute record is a nested attribute record of the first attribute record, and the heritage indicator of the fifth attribute record specifies an attribute class record in the plurality of attribute class records that is a destination resource class.

Referring to block 1280 of FIG. 12G, in some embodiments the fourth attribute record further comprises a corresponding attribute value that defines a state of the source resource class, and the fifth attribute record further comprises a corresponding attribute value that defines a state of the destination resource class.

Referring to block 1282 of FIG. 12G, in some embodiments the process is used to perform a plurality of process runs. Each respective process run in the plurality of process runs (i) is constrained by a corresponding process run graph in a plurality of process run graphs that is all or a portion of an instance of the hypergraph and (ii) creates one or more value instances for at least one input or at least one output of at least one node in the corresponding process run graph. Referring to block 1284 of FIG. 12G, in some such embodiments a first process run graph in the plurality of process run graphs consists of a single node in the hypergraph. Referring to block 1286 of FIG. 12G, in some embodiments a first process run graph in the plurality of process run graphs comprises each node in the hypergraph. Referring to block 1288 of FIG. 12G, in some embodiments the hypergraph is used to stack the plurality of process run graphs.

Figure 12H:
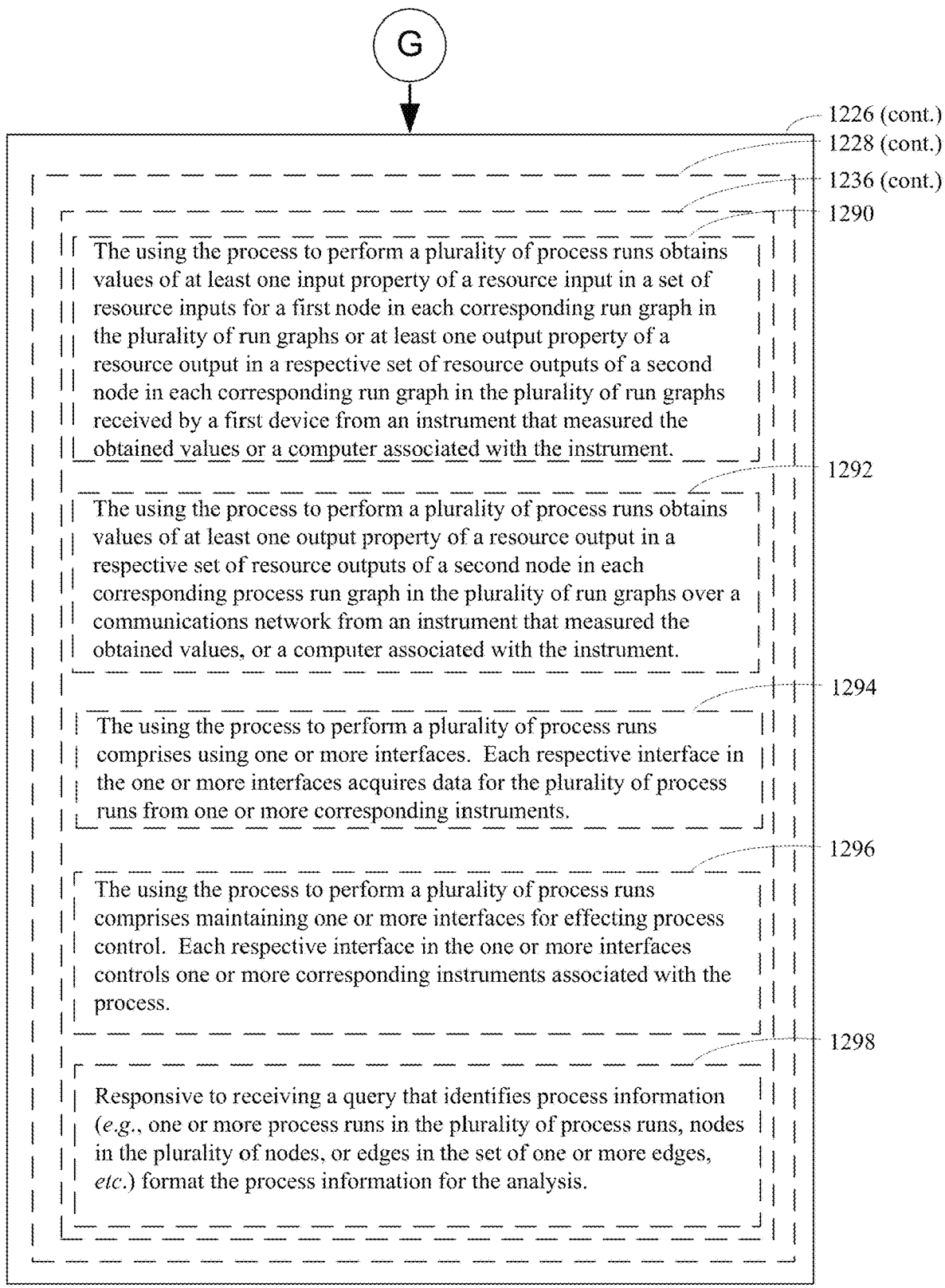

Referring to block 1290 of FIG. 12H, in some embodiments the using the process to perform a plurality of process runs obtains values of at least one input property of a resource input in a respective set of resource inputs for a first node in each corresponding process run graph in the plurality of process run graphs or at least one output property of a resource output in a respective set of resource outputs of a second node in each corresponding process run graph in the plurality of process run graphs received by a first device from an instrument that measured the obtained values or a computer associated with the instrument.

Referring to block 1292 of FIG. 12G, in some embodiments the using the process to perform a plurality of process runs obtains values of at least one output property of a resource output in a respective set of resource outputs of a second node in each corresponding process run graph in the plurality of process run graphs over a communications network from an instrument that measured the obtained values, or a computer associated with the instrument.

Referring to block 1294 of FIG. 12G, in some embodiments the using the process to perform a plurality of process runs comprises using one or more interfaces. In such embodiments respective interface in the one or more interfaces acquires data for the plurality of process runs from one or more corresponding instruments.

Referring to block 1296 of FIG. 12G, in some embodiments the using the process to perform a plurality of process runs comprises maintaining one or more interfaces for effecting process control, where each respective interface in the one or more interfaces controls one or more corresponding instruments associated with the process.

Referring to block 1298 of FIG. 12G, in some embodiments the method further comprises, responsive to receiving a query that identifies one or more process runs in the plurality of process runs, nodes in the plurality of nodes, or edges in the set of one or more edges, formatting the one or more process runs in the plurality of process runs, nodes in the plurality of nodes, or edges in the set of one or more edges for an analysis.

In some embodiments, the attribute class names 230 are chosen by a user from a database of allowed attribute class names in order to ensure conformity in attribute class names. In some embodiments, the optional attribute record names of attribute records are chosen by a user from a database of allowed attribute record names in order to ensure conformity in attribute record names.

In some embodiments, the attribute class names 230 are chosen by a user without any requirement of selection from a database of allowed attribute class names. In some embodiments, the optional attribute record names of attribute records are chosen by a user without any requirement of selection from a database of allowed attribute record names.

In some embodiments, the names of resource inputs 310 and resource outputs 316 are also chosen by a user from a database of allowed resource input 310 and resource output 316 names in order to ensure conformity in resource input and resource output names.

In some embodiments, the names of resource inputs 310 and resource outputs 316 are also chosen by a user without any requirement of using a database of allowed resource input 310 and resource output 316 names.

In some embodiments, the names of input properties 312 and output properties 318 are also chosen by a user from a database of allowed input property names and output property names in order to ensure their conformity.

In some embodiments, the names of input properties 312 and output properties 318 are also chosen by a user without any requirement of the use of a database of allowed input property names and output property names.

Figure 14:
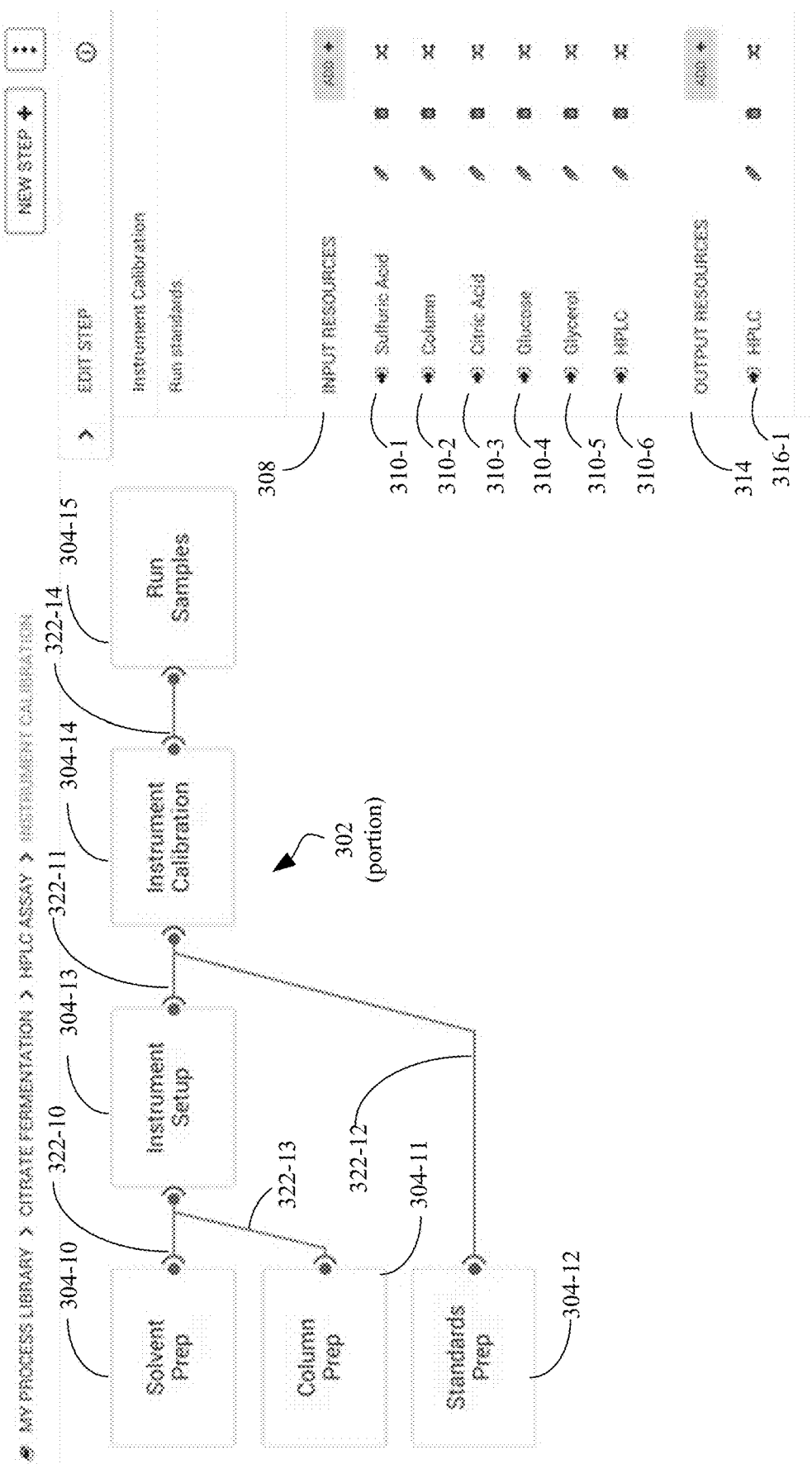
FIG. 14 illustrates a portion of a hypergraph in accordance with an embodiment of the present disclosure.

FIG. 14 illustrates the portion of the hypergraph 238 encompassed by "HPLC Assay." The node "Instrument Calibration" 304-14 is selected in FIG. 14. Accordingly, the set of resource inputs 308 and the set of resource outputs 314 for node 304-14 are shown on the right side of FIG. 14.

Process versions 301 of a process 236 are related to each other. In some embodiments, each process version 301 of a process 236 produces the same product. However, typically a first process version and a second process version in a plurality of process versions for a process differ from each other in some way, such as in a number of nodes, a process stage label of a node, a resource input in a set of resource inputs, a resource output in a set of resource outputs, a resource input specification, or a resource output specification, to name some possibilities.

In some embodiments, a first process in a plurality of processes results in a first product and a second process in the plurality of processes results in a different second product. For instance, a first process in the plurality of processes may result in the manufacture of one type of composition and another process in the plurality of processes may result in the manufacture of another composition.

In some embodiments the process run data store 240 comprises a plurality of process runs 402. In typical embodiments, a process version 301 is locked before a process run 402 for the process version 301 is executed so that no further changes can be made to the process version 301. If changes to underlying process 236 are desired, a new process version 301 is defined in such embodiments.

Figure 15:
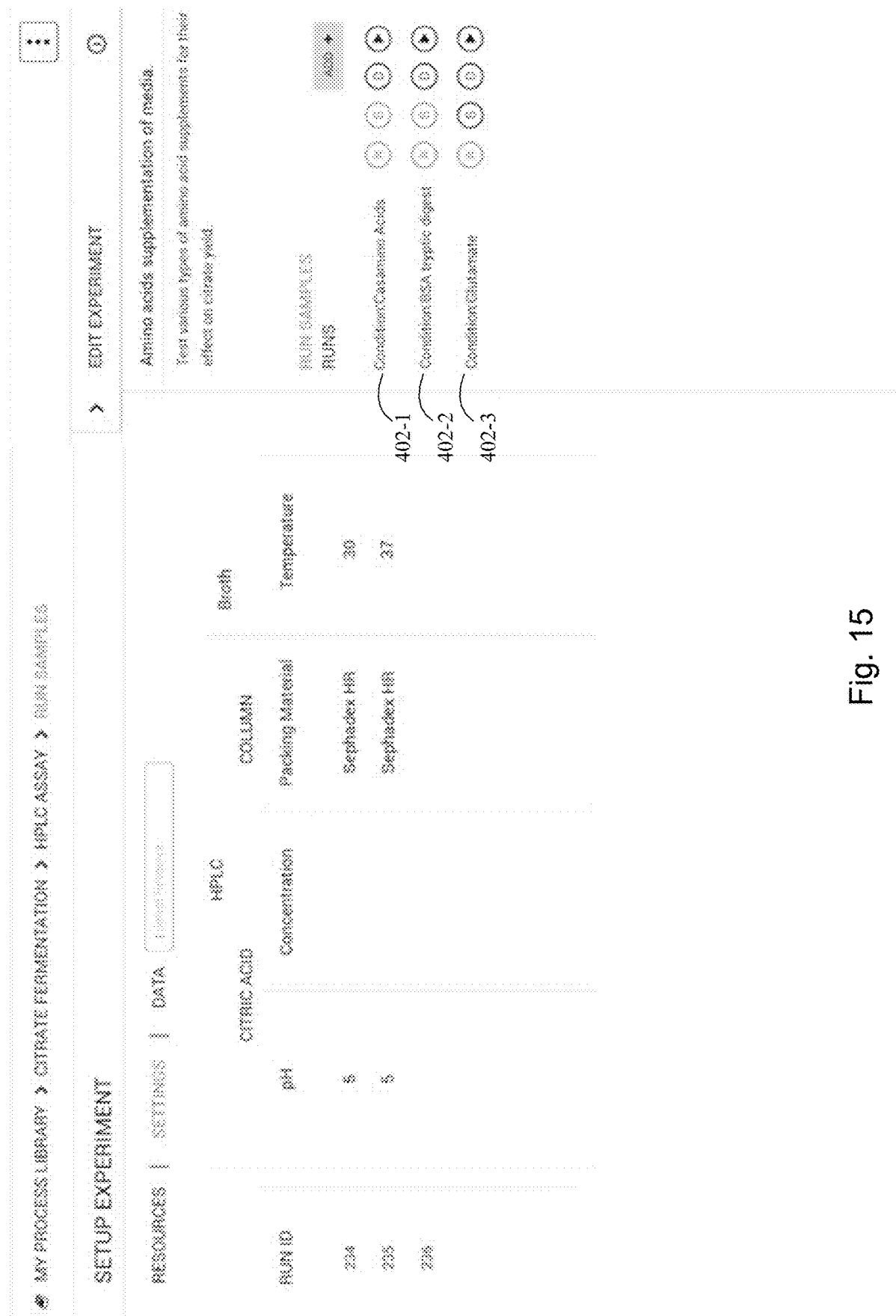
FIG. 15 illustrates setting up process runs in accordance with an embodiment of the present disclosure.
Figure 16:
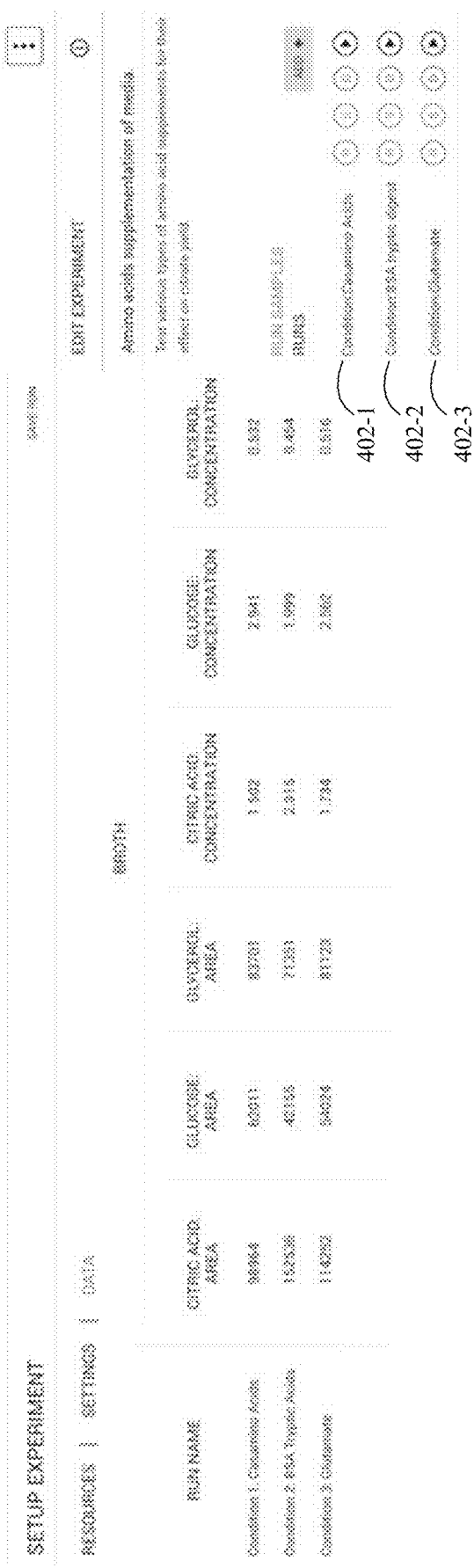
FIG. 16 illustrates raw data for three different process runs of FIG. 15 in accordance with an embodiment of the present disclosure.
Figure 17:
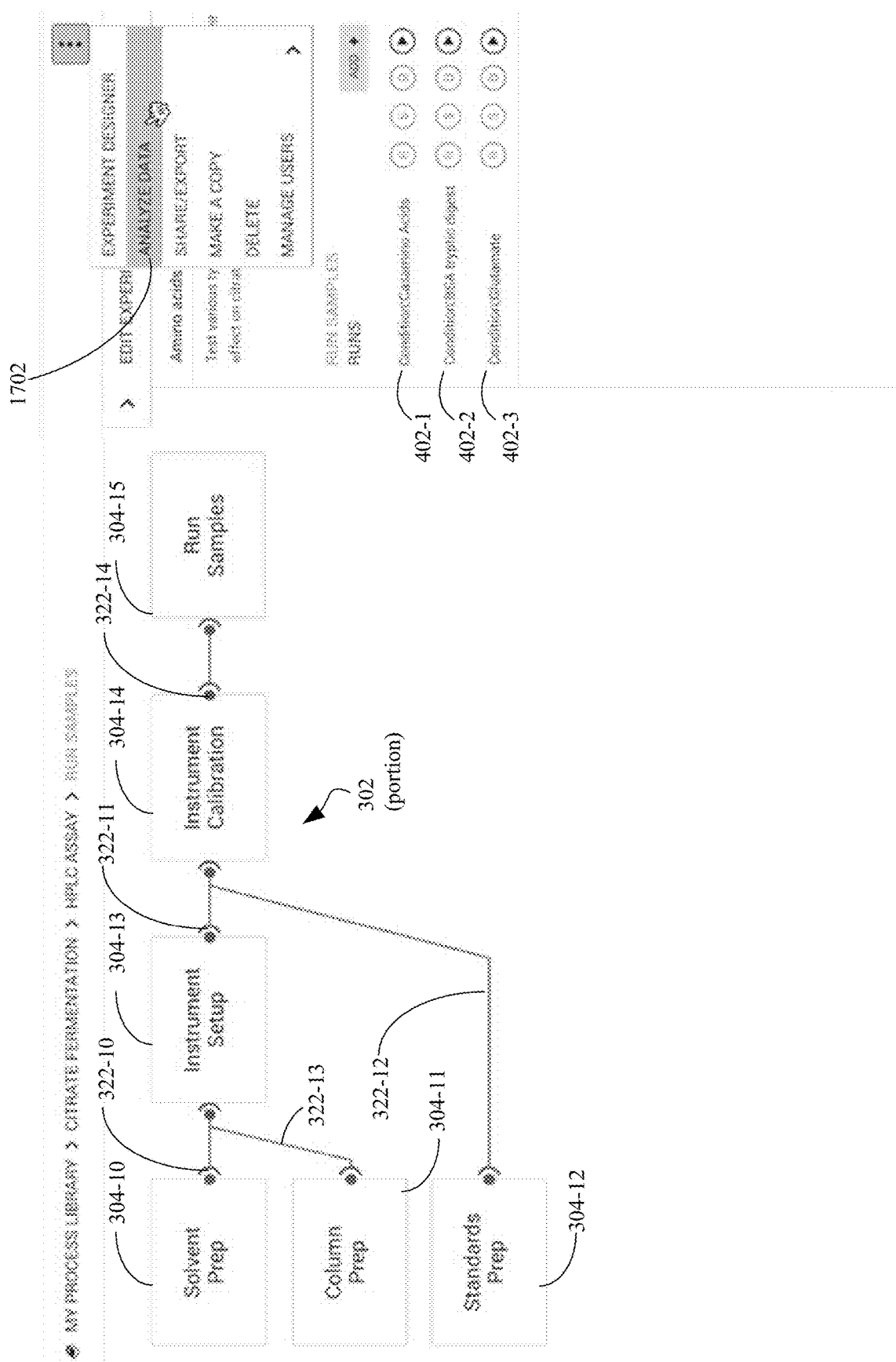
FIG. 17 illustrates selecting to analyze the data illustrated in FIG. 16 in accordance with an embodiment of the present disclosure.
Figure 18:
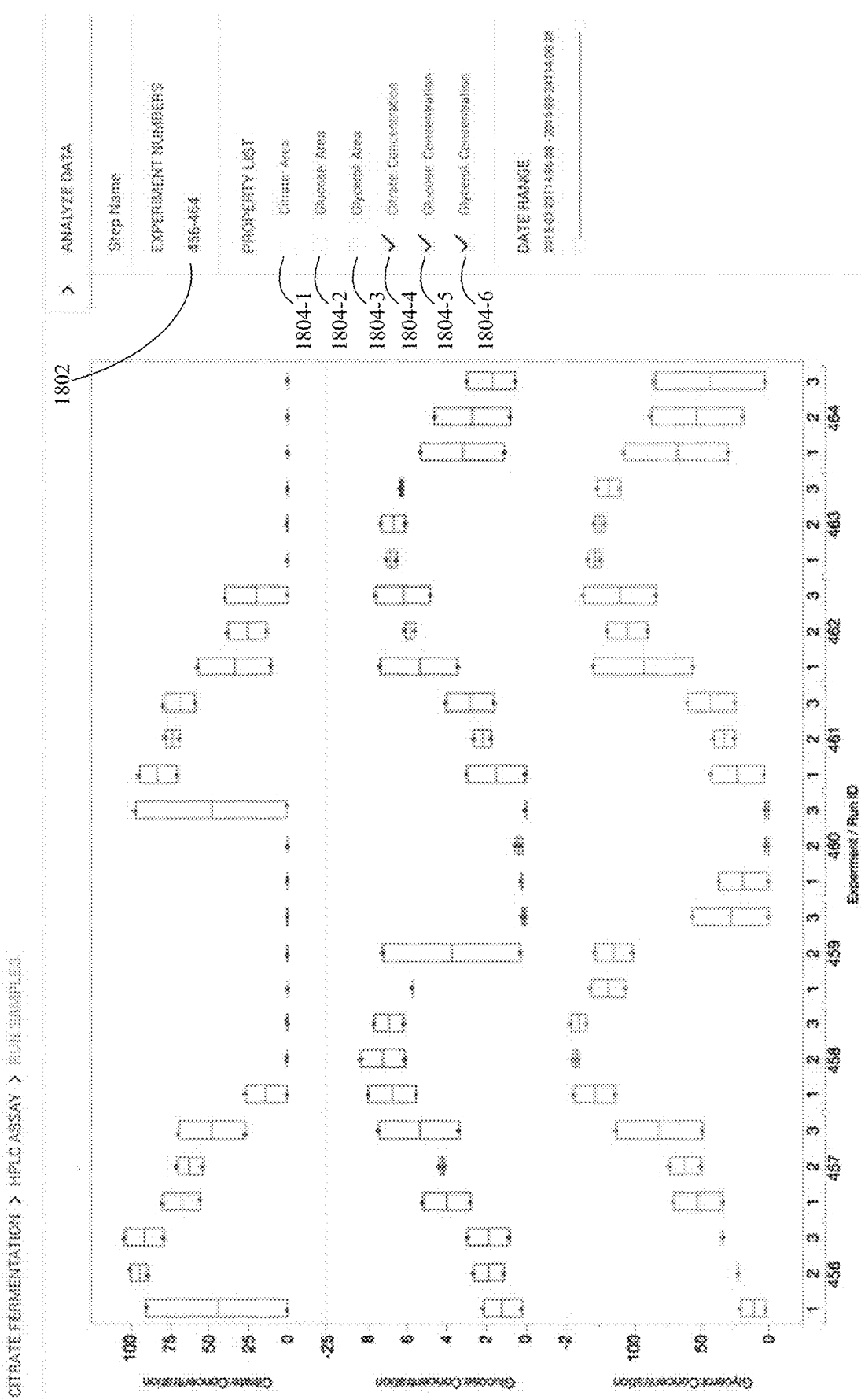
FIG. 18 illustrates analysis of the data illustrates in FIG. 16 in accordance with an embodiment of the present disclosure.
Figure 19:
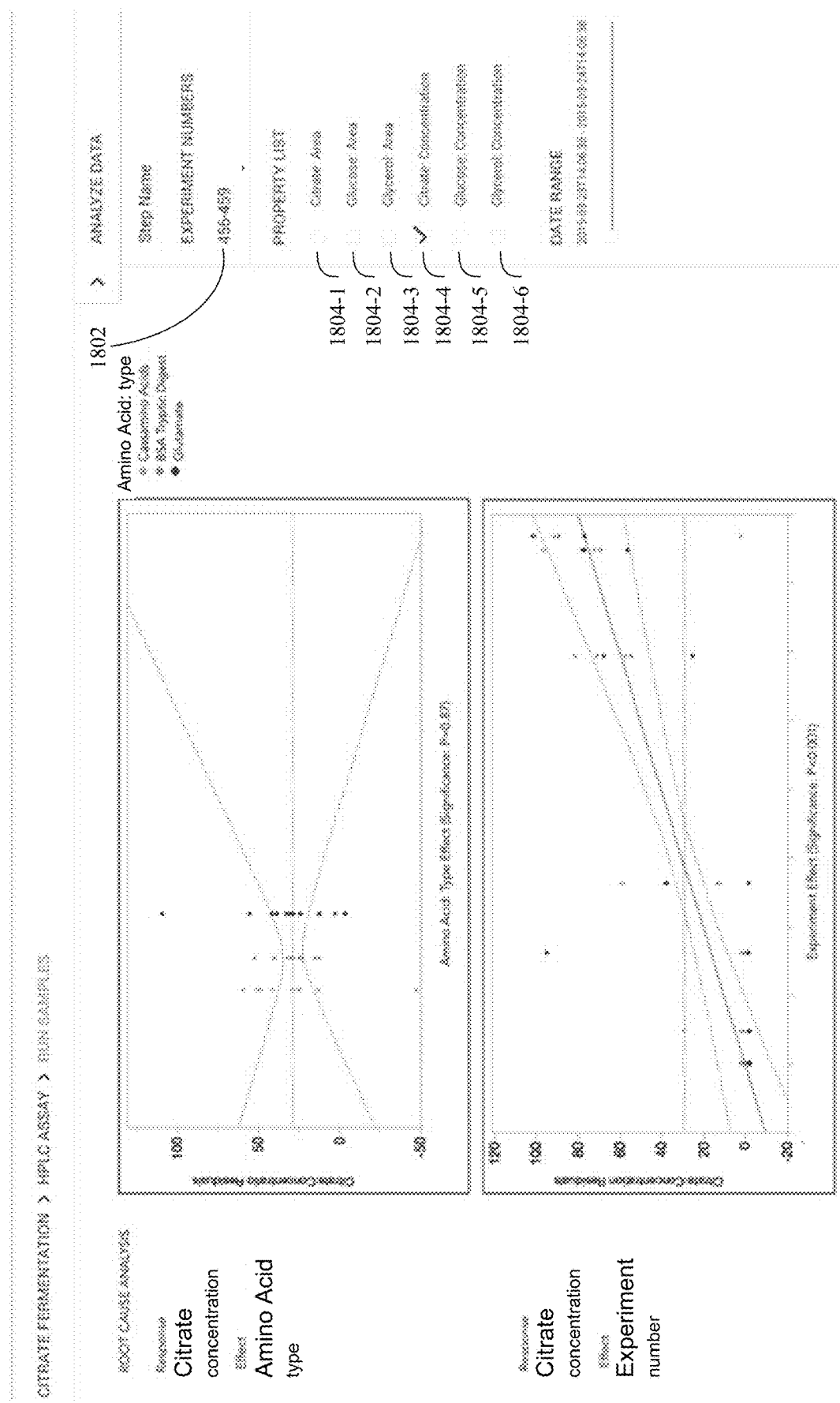
FIG. 19 illustrates further analysis of the data illustrates in FIG. 16 in accordance with an embodiment of the present disclosure.

In some embodiments, each process run 402 comprises an identification of a first node of a process version 404 (301) in the plurality of versions for a process 236 in the one or more processes, as illustrated in FIG. 4. Furthermore, values for the respective set of resource inputs 408 of the first node 406 in the hypergraph 302 of the respective process version and their associated input properties 410 are provided in a process run. More precisely, values for the properties of the resource inputs in the set of resource inputs 408 of a node 406 in the hypergraph 302 of the respective process version are provided in a process run. FIG. 15 illustrates setting up three process runs, 402-1, 402-2, and 402-3 for a particular node of a process version based upon the hypergraph illustrated in FIG. 14. In FIG. 15, values for properties of the resource inputs "Citric Acid" and "Column" are entered. In particular, referring to FIG. 15, for the property "pH" of resource input "Citric Acid" is set to 5 and the value for the property "packing material" for the resource input "Column" is set to "Saphadex HR." FIG. 16 shows raw data from such process runs. FIG. 17 shows selecting to analyze these process runs and FIG. 18 shows the resulting analysis of such process runs. Conveniently, as illustrated in FIGS. 18 and 19, query 1802 and toggles 1804 can be used to select which properties (e.g., input or output properties of the nodes of the underlying process versions) of which process runs are viewed and analyzed. Furthermore, referring to FIG. 19, calculated properties (e.g., amount of final product divided a quantity of input material) based upon the raw data from such process runs as well as correlations between calculated properties can be viewed. Advantageously, because of the structured way in which process runs are defined based on a node of underlying process versions, it is possible to automatically set up predefined process calculations (e.g. a process yield calculation) of the raw data (e.g., the raw data illustrated in FIG. 16) of executed process runs so that when new process runs are performed such process calculations are automatically applied to the raw data. This greatly reduces the labor in analyzing process runs.

In some embodiments, each process run 402 comprises the respective set of resource outputs 412 of the subject node 304 in the hypergraph 302 of the respective version 301. In some embodiments, the process run 402 further comprises obtained values of at least one output property of a resource output in the respective set of resource outputs of the node.

In some embodiments a process evaluation module 242 is also maintained. The process evaluation module 242 leverages the structure of process run data store 240 and the attribute record data store 204 to enable analytics of process runs. In particular, the process evaluation module 242 combined with the unique structure of the process run data store 240 and attribute records data store provides an advantageous platform for supporting statistical process control (SPC) over the many disparate components of a process 236 and thus provides powerful tools for analyzing and stabilizing such processes. SPC is a method of quality control that uses statistical methods. It is applied in order to monitor and control processes. Monitoring and controlling processes ensures that they operate at their full potential. For instance, at its full potential, a process 236 can make as much conforming product as possible with a minimization of waste. SPC can be applied to any process 236 where the "conforming product" (product meeting specifications) output can be measured. SPC makes use of control charts, a focus on continuous improvement and the design of process runs 402 (e.g., experiments). See, for example, Barlow and Irony, 1992, "Foundations of statistical quality control" in Ghosh, M. & Pathak, P. K. (eds.) *Current Issues in Statistical Inference: Essays in Honor of D. Basu*, Hayward, Calif., Institute of Mathematical Statistics, pp. 99-112, which is hereby incorporated by reference.

Advantageously, rather than having to track down the disparate data in disparate forms associated with a process or, rather the process runs that make use of the nodes of the process, in order to support SPC, the process evaluation module 242, responsive to receiving a query (e.g., the query of block 1298 of FIG. 12H) that identifies one or more first resource inputs and/or resource outputs present in one or more process runs in the run data store, is able to easily retrieve and format the one or more first resource inputs and/or resource outputs for analysis. In some embodiments, for example, the data is formatted as one or more tab delimited files, CSV files, EXCEL spreadsheets, GOOGLE Sheets, and/or in a form suitable for relational databases. In particular, the data is structured to ensure that such data can be efficiently analyzed so that potential correlations are not overlooked in subsequent analysis. An example of such analysis that is performed as part of SPC is correlation analysis such as the root cause analysis illustrated in FIG. 18. Root cause analysis is described, for example, in Wilson et al., 1993, *Root Cause Analysis: A Tool for Total Quality Management*, Milwaukee, Wis., ASQ Quality Press. pp. 8-17, which is hereby incorporated by reference. Leading up to the root cause analysis illustrated in FIG. 18, a query identifies one or more first resource inputs (e.g., amino acid type) and/or resource outputs (e.g., citrate concentration) present in one or more process runs in the process run data store 240. Data for the one or more first resource inputs and/or resource is then formatted and outputted for analysis. With this formatted data, an analysis, such as the root cause analysis of FIG. 19, is conducted. In some embodiments, the query results are formatted for a third party statistical analysis package such as JMP (SAS, Buckinghamshire, England, available on the Internet at jmp.com/en_dk/software.html). Analysis using such a third party statistical analysis package typically results in proposals for new process versions, in which nodes are added or removed, or the inputs or outputs to existing nodes are further defined or redefined, in order to identify and remove unwanted process variability (e.g., to stabilize the process).

The query of block 1298 of FIG. 12H can be of any of the resource inputs or outputs available for any combination of process versions of any combination of the one or more processes in the process run data store 240 or properties of these inputs or outputs. The query of block 1298 can alternatively be of any of the nodes of any of the hypergraphs for any combination of process versions of any combination of the one or more processes in the process run data store 240. The query of block 1298 can alternatively be of any of the products produces by any of the hypergraphs for any combination of process versions of any combination of the one or more processes in the process run data store 240. As such, in some embodiments, the query of block 1298 further identifies one or more second resource inputs and/or resource outputs present in one or more runs in the run data store (or properties thereof) and the one or more first resource inputs and/or resource outputs and the one or more second resource inputs and/or resource outputs are correlated and a numerical measure of this correlation is formatted for presentation. In some embodiments, the numerical measure of correlation is on a scale between a low number and a high number, where the low number (e.g., zero) is indicative of no correlation and the high number (e.g., one) is indicative of complete correlation across the one or more first resource inputs and/or resource outputs and the one or more second resource inputs and/or resource outputs.

In some embodiments, the query of block 1298 further identifies one or more second resource inputs and/or resource outputs present (or their resource properties) in one or more process runs in the run data store, and the process evaluation module 242 further identifies a correlation between (i) the one or more first resource inputs and/or resource outputs and (ii) the one or more second resource inputs and/or resource outputs present in one or more process runs in the process run data store from among all the resource inputs and/or resource outputs present in the process run data store using a multivariate analysis technique.

In some embodiments, the query of block 1298 identifies (i) one or more resource properties of one or more first resource inputs and/or resource outputs and (ii) one or more resource properties of one or more second resource inputs and/or resource outputs present in one or more process runs in the process run data store, and the process evaluation module 242 further seeks a correlation between (i) the identified resource properties of the one or more first resource inputs and/or resource outputs and (ii) the identified one or more resource properties of the one or more second inputs and/or outputs present in one or more process runs in the process run data store from among all the resource inputs and/or resource outputs present in the process run data store using a multivariate analysis technique.

In some embodiments, the above processes invoke a multivariate analysis technique that comprises a feature selection technique (e.g., least angle regression, stepwise regression). Feature selection techniques are particularly advantageous in identifying, from among the multitude of variables (e.g., values for input properties of inputs and values for output properties of outputs of nodes) present across sets of process runs, which variables (e.g., which input resource properties of inputs of which nodes and/or which output resource properties of resource outputs of which nodes) have a significant causal effect on a property of the product of the process (e.g., which of the variables are causal for poor reproducibility, poor yield, or conversely which of the variables are causal for excellent reproducibility, higher yield). Feature selection techniques are described, for example, in Saeys et al., 2007, "A review of feature selection techniques in bioinformatics," Bioinformatics 23, 2507-2517, and Tibshirani, 1996, "Regression and Shrinkage and Selection via the Lasso," J. R. Statist. Soc B, pp. 267-288, each of which is hereby incorporated by reference.

In some embodiments, the one or more processes are a plurality of processes and the correlation is identified from process runs in a subset of the plurality of processes. There is no requirement that each of the processes across which this correlation is identified make the same product in such embodiments. Such embodiments are highly advantageous because they allow for the investigation of undesirable process variability across process runs used in the manufacture of different products. For instance, some of the process runs used in a correlation analysis may manufacture biologic A and other process runs used in the same correlation analysis may manufacture biologic B. Correlation analysis that uses data from process runs for biologics A and B allows for the investigation of causes of variation that are product independent, such as, for example, a poorly defined fermentation step. For example, the sugar input into this fermentation step in the process runs for both biologics A and B may not be adequately defined to ensure process stabilization. Another example of a source of variation common to these process versions could be, for example, identified through correlation analysis across process runs for both biologics A and B, to a piece of equipment that is beginning to fail due to age. This is all possible because the disclosed systems and methods advantageously impose a consistent framework to the process runs that make different products. Thus, it is possible to aggregate process runs from across different products and perform cross-sectional filtering on any desirable set of resource inputs, resource input properties, resource outputs, and/or resource output properties, or specification limits thereof in these process runs, in order to, for example, discover sources of process variability that are independent (or dependent) of actual products made by such processes.

In some embodiments, the one or more processes are a plurality of processes and the correlation is identified from process runs in a single process in the plurality of processes. In such embodiments, each of the processes across which this correlation is identified makes the same product or produce the same analytical information. Such embodiments are used, for example, to precisely identify key sources of variability in the manufacture of the product or production of the analytical information through the process.

In some embodiments, the one or more processes is a plurality of processes and the query of block 1298 further identifies a subset of the plurality of processes whose process runs are to be formatted by the statistics module.

In some embodiments the process evaluation module further provides suggested values for the one or more second inputs for one or more additional process runs of a first process in the one or more processes, not present in the process run data store 240, based on a prediction that the suggested values for the one or more second inputs will alter a numerical attribute of the product of such process runs. In some embodiments, the numerical attribute is a reduction in variance in the one or more first inputs. Such an embodiment is utilized, for example, to identify situations in which the input space covered by the resource inputs 310 of the nodes in the process runs is insufficient to find a correlation between certain process variables across the process runs previously executed with a sufficiently high degree of confidence, or any correlation at all. In these instances, suggested values for the input space that is covered by the resource inputs 310 are provided in order to test for a correlation. Such an embodiment is utilized, in other examples, when a potential problem is identified from analysis of existing process runs. In such embodiments, proposed additions to the input space not present in the process runs in the run data store are made that will facilitate determining whether the potential problem is real. If the potential problem is real, a new version of the process can be developed that further defines a state (property) of an input or output to an existing or new node in the process in order to attempt to remove process state ambiguity and thereby stabilize the process.

In some embodiments the query of block 1298 identifies one or more third resource inputs and/or resource outputs present in process runs in the run data store, and the above-described numerical attribute is a confidence in a correlation between the first resource inputs and/or resource outputs and the third resource inputs and/or outputs. In some embodiments, the one or more processes is a plurality of processes and the query further identifies a single process in the plurality of processes whose process runs are to be formatted by the process evaluation module 242. In such embodiments, all the process runs identified by the query make the same product or produce the same form of analytical information.

In some embodiments, the query of block 1298 further identifies a subset of process runs in the one or more processes. In such embodiments, there is no requirement that all the process runs identified by the query of block 1298 make the same product or produce the same form of analytical information. In fact, some of the process runs responsive to the query may make different products or produce different types of analytical information.

In some embodiments, the process evaluation module 242 further identifies a correlation between (i) a first set comprising one or more process runs in the run data store and (ii) a second set comprising one or more process runs in the run data store, where process runs in the second set are not in the first set. For instance, in some embodiments, the correlation is computed across a plurality of inputs and/or outputs present in the first and second sets.

Optionally, in some embodiments, the one or more first resource inputs and/or resource outputs (e.g., identified by a query of block 1298) are exported for analysis to another device, e.g., as one or more tab delimited files, CSV files, EXCEL spreadsheets, GOOGLE Sheets, or in a form suitable for an SQL database.

Optionally, in some embodiments, as discussed above in relation to FIG. 5, in some embodiments the process evaluation module 242 generates an alert (e.g., in the form of a computer data transmission to a remote device such as process equipment used in a process when an obtained value for an output property of a resource output in a set of resource outputs for a node in a hypergraph of a process version is outside the output specification.

Optionally, in some embodiments a data driver 243 is executed for a respective process in the one or more processes.

In some embodiments, the data driver 243 includes instructions for receiving a dataset for the respective process and further includes instructions for parsing the dataset to thereby obtain (i) an identification of a process run in the run data store and (ii) output property values associated with the respective set of resource outputs of a first node in the hypergraph of the respective process for the process run. In some embodiments, the data driver 243 includes instructions for receiving a dataset for the respective process and further includes instructions for parsing the dataset to thereby obtain (i) an identification of a process run in the run data store and (ii) input property values associated with the respective set of resource input of a first node in the hypergraph of the respective process for the process run.

In some embodiments, the data driver includes instructions for populating the input or output property values of resource inputs or outputs of a node in the run data store with parsed values. For instance, in some embodiments, a sync engine associated with a node in the process monitors an associated synced folder. In some embodiments, the sync engine associated with the node runs as a background process (like Google Drive or Dropbox Sync) on any PC attached to an instrument associated with the node. When new instrument data files are added to the folder, the software parses and sends the data to the data driver 218. In some embodiments, association of the data sets to the correct protocol variables (resource outputs, resource inputs) of process runs is done via interaction with a user who is presented with a notification containing choices of process runs to which they have access. In some embodiments, the data driver 218 already contains the associations between values in the data sets and the correct protocol variables (resource inputs and/or resource outputs) of process runs.

In some embodiments, data in a set of resource outputs and/or a set of resource inputs that is communicated to the computer system for a node of a process run comprises a node identifier (e.g., an instrument identifier such as a Bluetooth UUID), an identification of a process version, and a value for a resource input or resource output. In some embodiments the data is in the form of a JSON structure. See http://json.org/.

In some embodiments, the data driver 243 polls on a recurring basis the state of various equipment or computer systems that are used in one or more processes for data and uses this data to populate the correct protocol variables (resource inputs or resource outputs) of process runs.

Embodiments in which Nodes are Connected by Generic Connectors (Edges) with Resource Lists Associated with Those Edges.

In some embodiments, for each respective process 236 of one or more processes, a respective plurality of versions of the respective process are created. Each respective process version 301 comprises a hypergraph 238 comprising a plurality of nodes 304 connected by edges 322 in a plurality of edges. Each respective node 304 in the plurality of nodes comprises a process stage label representing a respective stage in the corresponding process. Each respective edge 322 in the plurality of edges is associated with a set of resources. Each respective resource in the corresponding set of resources is associated with at least a corresponding output of the at least one output of a first node in the plurality of nodes and also is associated with at least a corresponding input of the one or more inputs of at least one other node in the plurality of nodes. Thus, when a resource is placed on an edge (instead of on a node), it need not encompass the outputs and inputs of the nodes connected to the edge. The outputs/inputs (absent any resource specification) can still be on the respective nodes that are connected by the edge, and then the resource can be placed on the edge which thus associates it with both the output and input. The resource can than specify detailed attributes of the outputs/inputs with which it is associated via the edge. As such, the values of a resource associated with the output side of an edge may be different than the values of a resource associated with the input side of the same edge. More details of such embodiments are disclosed in U.S. Pat. No. 10,586,015, in conjunction with FIG. 27 of U.S. Pat. No. 10,586,015, which is hereby incorporated by reference.

Embodiments in which Nodes are Connected by Generic Connectors (Edges) with No Associated Lists.

In some embodiments for each respective process 236 of one or more processes, a respective plurality of process versions of the respective process are created. Each respective process version 301 comprises a hypergraph 238 comprising a plurality of nodes 304 connected by edges 322 in a plurality of edges. Each respective node 304 in the plurality of nodes comprises a process stage label representing a respective stage in the corresponding process. FIG. 7 illustrates a process version 301. The process version includes a hypergraph that includes a plurality of nodes 304 corresponding to respective stages of a process (e.g., "Fermenter Prep," "Fermenter Setup," "Media Prep," "Grow Inoculum," "Inoculate Fermenter," "Fed-Batch Fermentation," and "Measure T, Ph, D, DO"). In some embodiments, concurrency is supported. That is, multiple users, each operating at a different client computer in communication with computer system 200, can view an instance of the process version displayed in FIG. 7, make changes to it, and view and analyze data from process runs that make use of it. In some embodiments, each respective edge 322 in the plurality of edges comprises at least one output of a first node in the plurality of nodes and also comprises a first input of the one or more inputs of at least one other node in the plurality of nodes. More details of such embodiments are disclosed in U.S. Pat. No. 10,586,015, in conjunction with FIG. 28 of U.S. Pat. No. 10,586,015, which is hereby incorporated by reference.

3.2. Examples of Encodings 3.2.1. Graph

As discussed, above, a process, including all of its identifiers, nodes, edges, attributes and nested attributes is encoded as a data element that is nontransitorily stored (e.g., in system 200). Any one or more of several possible encodings, or combinations thereof, may be used. FIG. 13 illustrates an encoding of a particular version of a process (process version 301) in the form of a graph.

3.2.2. JSON Object

In some embodiments, a process, including all of its identifiers, nodes, edges, attributes and nested attributes is encoded as a collection of process objects that is stored in the system 200. In some embodiments, the attributes of a collection of process objects for a version of a process are encoded as JSON objects. In the example provided in FIGS. 20A through 20F, a process (collection of process objects) is represented in JSON (JavaScript Object Notation) as two objects: a process object and an activities list object. The process object contains a list of all nodes and edges in the process, as well as additional attributes on the process such as the description. Nodes are called "entities" of type "activity" and edges are called "connections". The unique identifier of the process is found at block 2002. A single node represented in the process is found at block 2004. A single edge represented in the process is found at block 2006.

The activity list object, shown after the process object beginning at FIG. 20C, contains a list of all nodes ("activities") and their nested attributes. The activity identifier is found at block 2008. Selected examples of attribute:value pairs for names, identifiers or other attributes, including input and output resources, components of resources, properties of resources and components, specification limits, instructions, direction, parents, version, and external references (e.g. "topGroupId") are provided as blocks 2010. Formula attributes ("calculations") are provided in block 2012, as an example of how a method can be defined in the encoding. Although only one activity is shown in the activity list, the full activity list object (not shown) defines the attributes of all activities in the process.

3.2.3. Positional Identifiers

In the above JSON example representing a process, attributes and their nested attributes were represented in a nested structure. In some embodiments, a process is represented by collapsing the hierarchy into a string representation in which each process object and the parent process object it describes are determined by its relative position within the string. Process objects at a particular level in the hierarchy are part of an object class, and each object class is assigned a particular position in the string. For example, an activity, resource on that activity, component on that resource, property on that component, specification on that property, and value on that specification can be represented as a string containing a sequence of names, ids, or any other attribute value separated by a delimiter such as the "|" character as illustrated in FIG. 21.

Names: Riffyn: Fermentation|Inoculate Media|input|media|nitrogen source|Concentration|g/L|target|38

IDs:
HKBKDDTJMQt8E6cZ4|rSggim9EfTgsmkKiX|input|7K-9EmYkYXS5K2mJoy|Wq4cjbyhzAbLLdPog|v54QMQPn-mYdfcM2WZ|gram per liter|target|38

The above encoding has nine positions laid out as:
0|1|2|3|4|5|6|7|8

0=>specifies a particular collection of process objects (a process)
  1=>specifies a step process object
  2=>specifies the side of the step, which can have the values "input" or "output"
  3=>specifies a resource process object
  4=>specifies a component process object
  5=>specifies a property process object
  6=>specifies a unit process object
  7=>specifies a specification process object
  8=>specifies a value of the specification process object In this encoding, an activity is fully defined by a list of all such positionally encoded process object strings relevant to an activity. If a particular process object for a nested object class does not exist, a null value can be use in that particular position in the string.

This type of encoding is useful in that it allows for comparison of different versions of an activity using a string match comparison function. If positionally encoded process objects of two activity versions match, then they have not changed. If no match can be found, the process object have been added, deleted or changed in some aspect of the attribute hierarchy. Such encodings can also be used as column headers in tables

3.2.4. Tables

In some embodiments, each nested object class may be specified as a column in a table, and the process objects that describe that class can be row labels in a table. The values of those process objects in each class are placed in the cells of the table. FIG. 21 illustrates an example of such an embodiment.

3.2.5. Relational Tables

In some embodiments, any entity (process, activity, resource, component, spec, etc.) is represented as a record in a relational database table called an "attribute" table that optionally references an "attribute class" table. The attribute record must have a unique identifier. In some embodiments, the attribute record optionally has a:

value—a value defining the state of the attribute;
  top attribute—if it is the top-level attribute (the one that is the parent or container of all other attributes), such as a process, the "top attribute" attribute can be set to value of "true" or 1; otherwise the top attribute value can be set to a value "false" or 0;
  superior attribute identifier—a reference to the attribute to that the present record describes; if such a reference exists, it means that the present record is a nested attribute of the referenced, e.g. "superior", attribute;
  attribute class identifier—a reference to a unique class identifier in the attribute class table that defines the class and its attributes;
  version—a label identifying the particular version of the present instance of the attribute class; and/or
  parent—a reference a unique identifier of the attribute from which the present version of the attribute is copied; if such a reference exists, it means that the present record is part of a genealogical lineage of parent-child attributes.

In one embodiment, this pair of tables the ("attribute" table and the "attribute class" table) describes an entire process and all of its nested attributes.

In another embodiment, this paired-table structure can be replicated for distinct classes of attributes. Each pair of tables would then require additional fields that reference the other attribute tables to determine where they belong in relation to each other in the nested attribute hierarchy.

The attribute class table must have an identifier for each class, and in one embodiment may have other attributes such as name, type and description as fields in the table.

In another embodiment, the attribute class table is extended into a paired table structure that mirrors the paired table structure for attribute/attribute class. Specifically, such an embodiment would have a pair of tables called attribute class/attribute class attribute instead of just the one attribute class table. That pair of tables would be structured with the same fields and reference as the attribute/attribute class tables shown in this example.

3.3. Versioning

This example describes a method for versioning processes, groups, activities or any other object or attribute of a process using the disclosed versioning. To describe this method, reference may be made to a specific attribute that is being versioned. It should be understood the versioning method is equally applicable to the process or any other process attribute.

This example illustrates the use of multiple aspects of the invention in various embodiments (i) a unique identifier (the activity "id" attribute); (ii) a class identifier (the "objectId" attribute of activity objects); (iii) a version identifier (the "version" attribute); (iv) a unique identifier (the process "id" attribute) plus ancestral lineage identifier (the "parent" attribute); (v) genealogical trees composed of simple linear lineages and multiple branching lineages; and (vi) a process lineage with multiple versions and nested attribute lineages (activities).

When an activity (e.g., a process object) is versioned, a copy of the activity is made and assigned a unique identifier. A new activity data object is then created and added as an attribute to the activity object. A versioned activity object is also given a unique class identifier (an "objectId" attribute on the copy of the activity, in this example) in order to denote its membership in a class containing all versions of the activity. This allows the system to identify any pair of activities within the unique class to compare for changes.

In addition, when an activity (e.g., process object) is versioned, information describing the parent activity (the activity, or process object, from which a copy is made) is added to the parent attribute of the activity object. This information is useful for making, tracking, comparing and merging branches of an activity genealogy. Typically, the identifier of the root activity (the first copy of an activity that is created) serves as the unique class identifier, but any unique identifier may be assigned for the class. One such root activity, the objectId attribute may be left null, filled with a self-reference to its own identifier, or filled with a reference to a different unique class identifier that is distinct from its own identifier.

Figure 22:
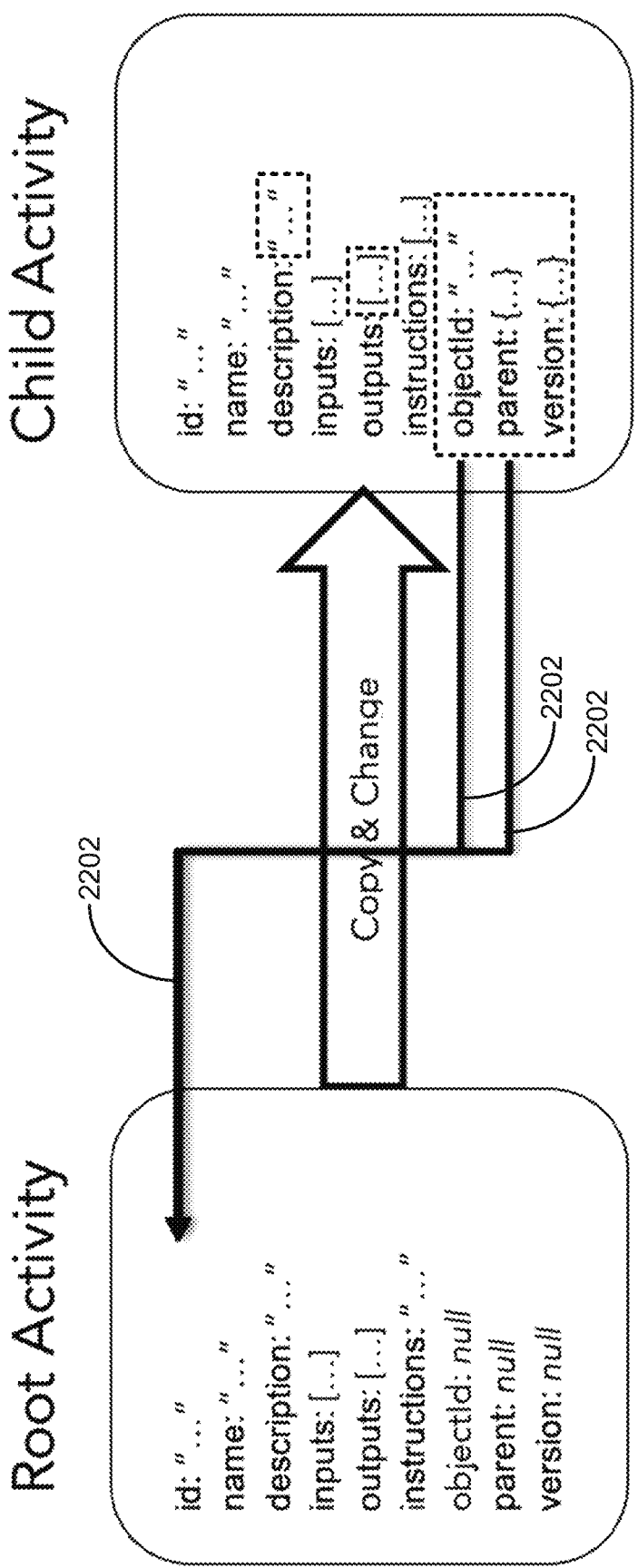
FIG. 22 illustrates making a child activity (e.g., child process object) from a root activity (e.g., parent process object), in accordance with an embodiment of the present disclosure.

In FIG. 22, the root activity identifier is used as the unique class identifier. The dashed boxes highlight elements that were changed in the child activity after making a copy of the root activity. Arrows 2202 indicate that the objectId and parent attributes contain references back to the root activity identifier. The notation " . . . " represents a string, "[ . . . ]" represents a list, and "{ . . . }" represents an object composed of an attribute:value list.

Comparing two versions of a process, group, activity or any other attribute is referred to as a "diff" or "difference". Another useful comparison is to record and display the changes in an activity over time. This type of comparison is referred to as a "change list". For example, the user can compare how the target specifications for a particular input/output has changed over time (across multiple versions of an activity). A change list will report differences as they are sequentially realized across multiple versions of the activity (its entire "history"). This can be useful for establishing trends over time.

Version Attribute.

The version object could, for example, contain the following nested attributes or other attributes not described here, though only a label is required if the version attribute is used.

Label.

This is the version identifier generated at the time the activity is versioned. The version identifier is unique within the class of the activity it describes, and may be an arbitrary numerical, symbolic or other identifier, or it may be assigned meaning. In this example, it could follow certain rules to determine if it is a minor or major version change. Minor versions would imply a change that is compatible with dependent functions and uses of the activity without causing and problems. Major versions could indicate that changes may cause dependent functions and uses to fail, for example because those functions expect a particular attribute to have one particular value, but it has a different value in the child activity with a major version change. This might be useful in cases where a process, group or activity is embedded and linked as a process, group, or activity inside another process.

Hash.

A cryptographic hash is a function that maps data of arbitrary form and size (in this case the activity object) into a value such as a string of fixed size. This is designed to be an irreversible transformation of the activity state at the time of versioning, into a value that is computed from and uniquely associated with that state. It ensures the integrity of the versioned activity. In other words, it allows for verification that the versioned activity record was not altered after it was created. This is accomplished by regenerating the hash value at a future time and comparing it to the saved hash value. If the values are the same, then the activity object has not changed since the hash value was originally generated at the time of versioning.

Comments.

An abbreviated human readable list of changes.

Timestamp.

The date and time as recorded by the server (UTC).

Description.

An optional description of the activity and/or of changes provided by user and/or of any other textual information a user wishes to record.

3.3.1. Branching

Figure 23:
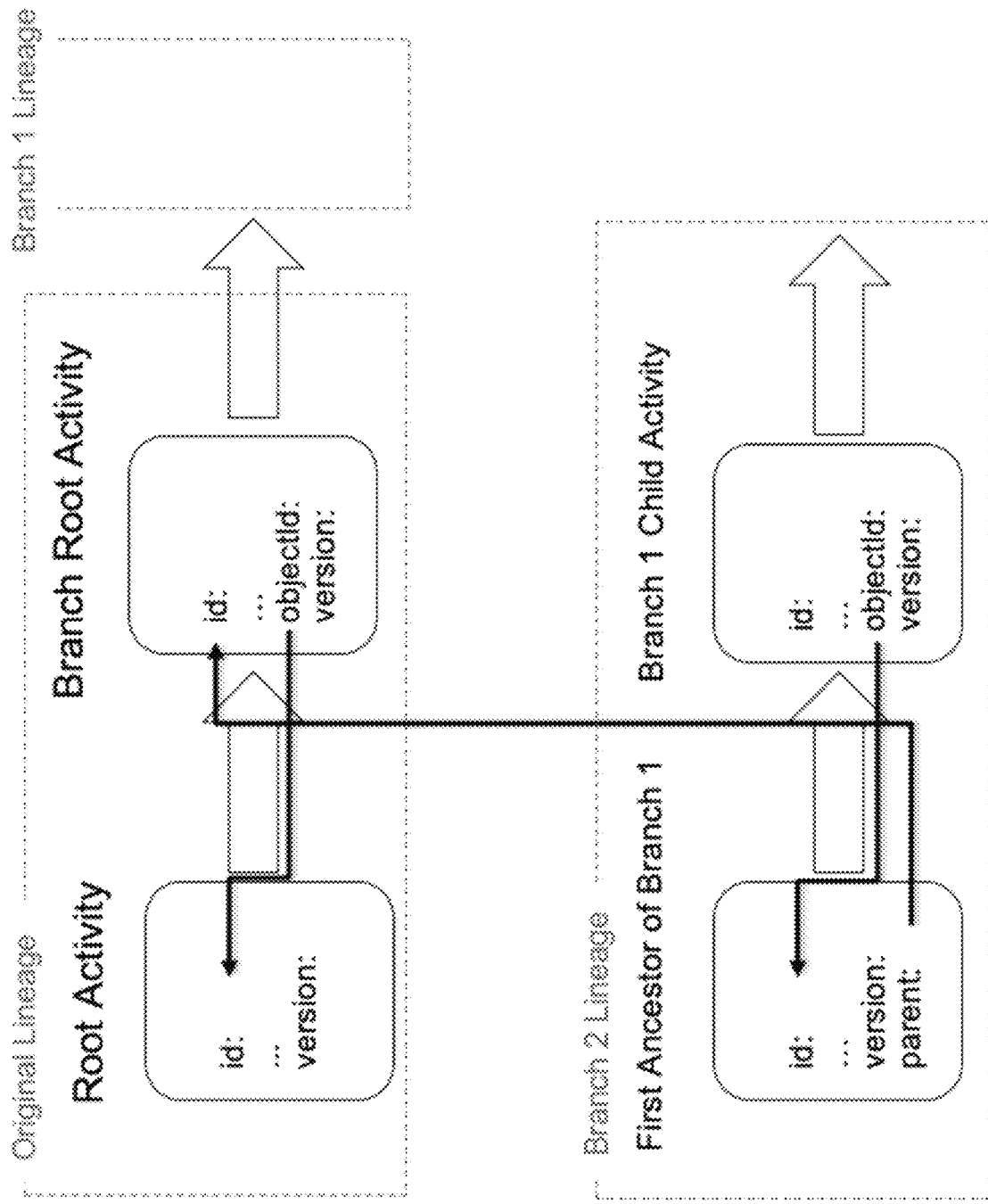
FIG. 23 illustrates branching, the splitting of a genealogical lineage of a process, activity, group or other versioned attribute or object (e.g., process) into parallel lineages that share a common root, in accordance with an embodiment of the present disclosure.

As illustrated in FIG. 23, branching is the splitting of a genealogical lineage of a process, activity, group or other versioned attribute or object into parallel lineages that share a common root. This is accomplished by making at two or more copies of any object along a lineage. The copied object becomes the root of the two or more branches. Each copy of the object forms the first ancestor of each branch. This first ancestor of each branch contains a parent attribute that refers to the unique identifier of the root object, thereby ensuring the integrity and traceability of every branch within the full genealogy. Changes in each branch are versioned in the same way described previously in this example.

Parent Attribute.

The parent object must contain at least the identifier of the parent activity object. It may also optionally include the version label of the parent activity object. The inclusion of the version is necessary to specifically identify the version of the parent activity from which a branch was copied. Otherwise, it will only be possible to identify the parent lineage of the branch, but not the specific version along that lineage.

3.3.2. Merging

Two versions of a process, activity or any other object or attribute can be merged together to create a new version of either version. The two versions will become the parents of the new (child) version. Merging starts by comparing the versions to determine the differences, and then the differences are applied to one of the two parent versions to create the child version that contains the attribute:value pairs of the one parent plus the differences. The parent attribute of the child will include references to both parent objects.

Optionally, the differences can be presented to a user prior to the creation of the child version so that the user can choose which differences to include in the child version.

3.3.3. Examples

The following examples illustrate the use of lineages, versioning, identifiers, version attributes, and parent attributes in the context of processes and activities.

Example 1: Parent List as a Hierarchy Stored as a Parent Attribute on a Process

Figure 24A:
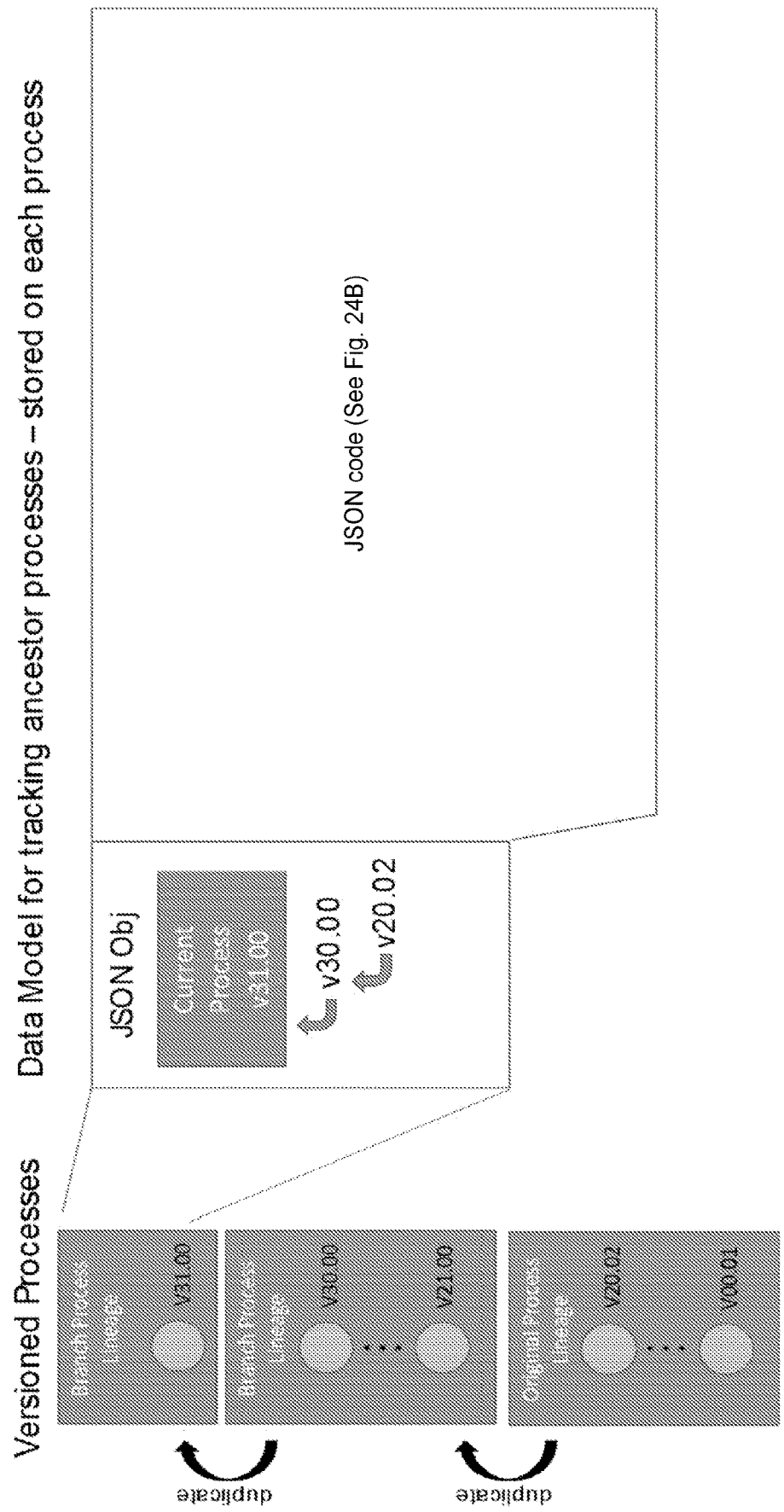

In the embodiment shown in FIG. 24, genealogy is recorded as a hierarchical parent list on each process. Each process lineage shares a single process identifier, and each version of the process in the lineage as a unique version number within the scope of the lineage.

Example 2: Generating Process Lineages as a Linear or Branched Tree

FIG. 25 demonstrates how processes can be duplicated multiple times, creating a genealogical tree of related process (parents, children, siblings, cousins, etc.).

Example 3: Representation of a Genealogical Tree, Generated from Related Processes, in a Table Form with Names and Unique Process Identifiers FIG. 26 provides an example of one root, four children of the root, and five grandchildren of one child. Each child lives an independent life as a distinct object, but preserves a record of its ancestors allowing reconstruction of the genealogical tree.

Example 4: Attributes of Processes Having Independent Genealogical Trees

Figure 27:
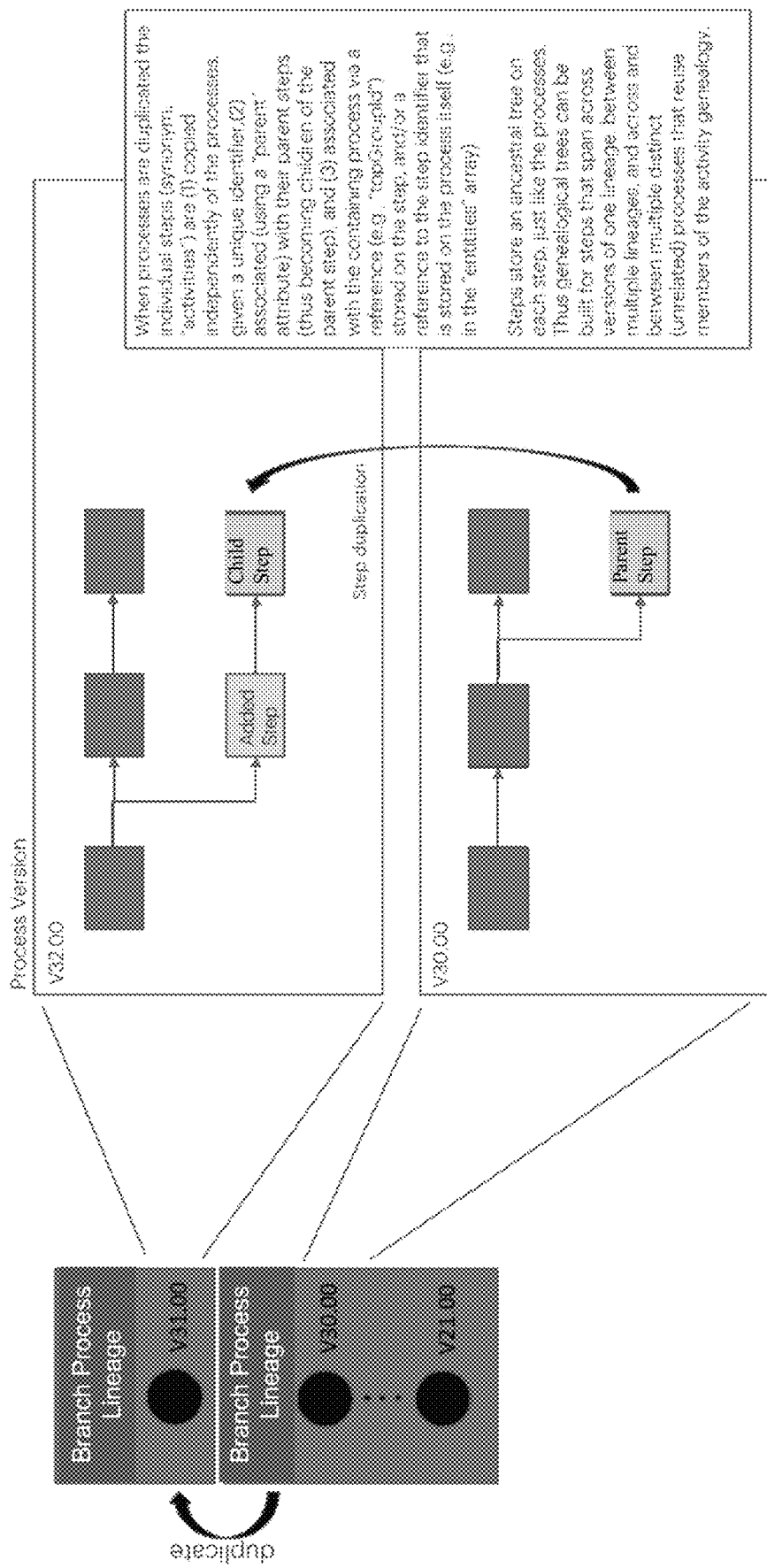
FIG. 27 illustrates how attributes (e.g., individual process objects) of a process (e.g., a collection of process objects representing a process) can be treated as independent entities and given their own independent genealogy, in accordance with an embodiment of the present disclosure.

Referring to FIG. 27, this example shows how attributes (e.g., individual process objects) of a process (e.g., a collection of process objects representing a process) can be treated as independent entities and given their own independent genealogy.

3.4. A Method to Identify the Roots and Newest Leaf of a List of Activities

Given a set of activity objects with parent attributes storing hierarchical lists of ancestors, it can be useful to identify the root of each activity to use as the unique class identifier for all activities in that genealogy. This method identifies the root for each activity in a list presented to the method, and builds a key:value list of the activity:root associations for use as a lookup data structure.

The code example provided in FIG. 28, written in JSL (JMP Scripting Language), creates a key:value list in which each key is an activity ID and (1) if the activity is not a root, then its value is the ID of its root activity in the lineage, or (2) if the activity is a root, then its value is the ID of the newest leaf activity in the genealogy stemming from that root. A "leaf" activity is the last activity version created on any branch of a genealogical tree. The resulting key:value list has the form (written in JSON) where the portions in < > would be replaced with actual activity ID strings.

```
[
    <activity ID 1>: { "root": <activity ID of the root of activity ID 1> },
    <activity ID 2>: { "root": <activity ID of the root of activity ID 2> },
    <activity ID 3>: { "leaf": <activity ID of the newest leaf of activity ID 3> },
]
```

Here <activity ID 1> and <activity ID 2> are a non-root activity IDs, and <activity ID 3> is a root activity. In the JSL in the code example provided in FIG. 28, a key:value list is called an "Associative Array", comments start with a double slash "//", and "Empty( )" is a null value. The logic of the method is described in the comments preceding each block of code.

3.5. A Method to Identify a List of Ancestors and Immediate Children of a Process Given a set of process objects with parent attributes storing hierarchical lists of ancestors, it can be useful to identify a flat ordered list of ancestors for each process, and a flat list of children of each process. This structure can be used to quickly build the full genealogical tree of a related processes. The code provided in FIG. 29, written in JSL, creates a key:value list where each key is a process ID and the value is object containing two lists: (1) an ordered list of ancestor process IDs, and (2) a list of child process IDs. The key:value list has the form (written in JSON) where the portions in < > would be replaced with actual process ID strings.

```
[
    <process ID>:
    {
        "parent": [ <list of ancestor process IDs, immediate parent first> ],
        "child": [ <list of immediate child process IDs> ]
    },
    ...
]
```

In the JSL in the code example provided in FIG. 29, a key:value list is called an "Associative Array", comments start with a double slash "//", and "Empty( )" is a null value. The logic of the method is described in the comments preceding each block of code.

3.6. A Method to Find the Leaves of a Process Genealogy

It can be useful to identify a flat list of all the leaves descended in the genealogical tree from a given process. A leaf is the last (terminal) version of a process along a branch lineage. The code example provided in FIG. 30, which is written in JSL, creates a list of process IDs representing all the leaves descending from a given process (as specified by the IDs) and assigns that list to the given process in a key:value list, where the key is the given process ID and the value is the list of leaves. This function requires as an input the object 'procLineage', which provides a list of children for each process ID and was built in the code example in Section 3.5 above.

The key:value list has the form (written in JSON) where the portions in < > would be replaced with actual process ID strings or other values such as the date string.

```
[
    <process ID>:
    {
        "leaves": [ <list of leaf process IDs>],
        "leavesCreated": [ <list of leaf process creation dates>],
    },
    ...
```

] In the JSL in the code provided in FIG. 30, a comments start with a double slash "//". The logic of the method is described in the comments preceding each block of code.

3.7. A Method to Identify Members of the Descendant Family Tree of a Process It can be useful to identify a flat list of all the processes descended in the genealogical tree from a given process, called the "descendant family tree". The descendant family tree includes all branches emanating from the given process anywhere in the descendant genealogy and all versions of the process therein. The given process, therefore, forms the root of the family tree descending from it. Note, however, that the given process itself may have ancestors and therefore may not be the absolute root for the entire family tree. The absolute root would have no ancestors.

The code example provided in FIG. 31, written in JSL, creates a list of process identifiers representing all processes in the descendant family tree and assigns that list to the given process in a key:value list, where the key is the given process identifier and the value is the list of descendant processes. This function requires as an input the object 'procLineage', which provides a list of ancestors and leaves for each process identifier, and was built in the code example in section 3.5, above.

The key:value list has the form (written in JSON) where the portions in < > would be replaced with actual process ID strings or other values such as the date string.

```
[
    <process ID>:
    {
        "processFamily": [ <list of all descendant process IDs>],
    },
    ...
]
```

In the JSL in the code of FIG. 31, a comment in starts with a double slash "//", and "{ }" represents an empty list. The logic of the method is described in the comments preceding each block of code.

3.8. A Method to Find Differences in Processes Using Lists of Positional Encodings This example provides a method for comparing two processes and identifying what is the same and what is different between them. Each process and its attributes is encoded as a list of strings comprising positionally-encoded identifiers as described in section 3.2.3. Each string in the first list is then compared with every string in the second list using a string comparison function or operator. If a match is found, the matching strings in each corresponding list are marked as a match, or their index in the list is saved into a match list. Once all strings in the first list have been compared to the second list, then all possible matches have been found. Any strings in the two lists that did not match are differences between the two processes. A list of these differences is created by extracting all matched strings from the two lists, and then combining the remaining differing strings together into a difference list. The code example provided in FIG. 32, written in JSL, performs this method. Comment start with a double slash "//", and "{ }" represents an empty list. The logic of the method is described in the comments preceding each block of code.

3.9. A Difference Report

The systems and methods of the present disclosure advantageously facilitate the generation of difference reports as illustrated in FIGS. 33 and 34.

3.9.1

FIG. 33 illustrates a difference report that only includes attributes with differences.

3.9.2

FIG. 34 illustrates a difference report that includes all changed or unchanged attributes on a process. The newer process (modified 2019-08-02 00:08:15) is termed Riffyn: Fermentation (dup1). The process (modified 2019-03-14 06:28:09) is termed Riffyn: Fermentation. As shown in the figure, a total of five properties were added or updated, two properties were deleted or updated, and 86 properties were unchanged.

3.10

Analyzing product development. In some embodiments, product development information associated with each collection of process objects in one or more collections of process objects is analyzed to determine a relationship between a variance in the one or more processes for making one or more products in the one or more collections of process objects and a variance in outcomes or characteristics of one or more products made by the one or more processes.

In some embodiments, the process objects are in the form of attribute records. In such embodiments, the plurality of attribute records is used to analyze product development information associated with each attribute record in a plurality of process records to determine a relationship between variance in product development across the plurality of attribute records and variance in outcomes or characteristics of one or more products made by the one or more processes.

Examples of product development information include one data point on one property on one run on one step of a process (e.g., events). Examples of such events, include, but are not limited to assay values, time values, sensor values, and specification limit values.

Examples of product development information also include multiple data points on one property on one run on one step of a process (event series). Examples of such event series are technical replicates on an assay (e.g., repeating an assay in order to obtain replicated measurements for error analysis), a time series experiment (a set of measurements taken at intervals over a period of time), a flow cytometer event series, and a collection of elution volumes or measurements.

An event series can include two or more events, 10 or more events, 100 or more events, or 1000 or more events. In some embodiments, the event series is over regular time intervals. In other embodiments, the event series is not over regular time intervals.

A collection of elution volumes or measurements is obtained during chromatography (e.g. size exclusion chromatography) in which the output of a purification column is eluted into different test tubes (fractions) over time. Each such test tube therefore represents a period of time and a volume collected in each test tube can be measure to form the event series. Alternatively, other properties of each test tube (e.g., absorbance of a particular wavelength) can be measured to form the event series.

Examples of product development information also include multiple data points on multiple properties on one run on one step of a process. Examples of such data include data acquired from kinetic assays, calibrations, chromatography (e.g., chromatography spectra), as well as fermentation off-gas data. Fermentation off-gas data is a primary data used to quantitatively assess the state of a fermentation non-invasively. It can provide information regarding the respiratory quotient (RQ) that can subsequently inform observations into growth kinetics and substrate consumption.

Examples of product development information also include multiple data points on multiple properties on multiple runs on one step of a process. Examples of such data include data acquired from replicate samples, Design of Experiment (DoE) runs (see, for example, Goos and Jones, 2011, *Optimal Design of Experiments A Case Study Approach*, John Wiley & Sons, Ltd., Chichester, West Sussex, United Kingdom), screening samples, and material batches.

Examples of product development information also include multiple data points on multiple properties on multiple runs on all steps of a process. Examples of such data include data acquired from fermentation processes, high throughput screening processes, enzyme assay processes, HPLC methods, and cell culture processes. An example of high throughput screening samples arises in high throughput assays, for instance assays to identify compounds, among a large number of compounds, satisfying some metric threshold (e.g., $IC_{50}$, etc.) in a particular assay. See, for example, 2017, *High Throughput Screening Methods Evolution and Refinement*, Bittker and Ross., eds., The Royal Society of Chemistry, Cambridge, United Kingdom; and 2020, *High Throughput Screening Methods, Techniques and Applications* Wigglesworth et al., eds., Nova Science Publishers, New York, each of which is hereby incorporated by reference.

Examples of product development information also include multiple experiments on one version of a process. Examples of such data include data acquired from multiple screening campaigns, iterative fermentation DoEs (screening design, followed by response surface), and repeated GC assays with different sample sets.

Examples of product development information also include multiple versions of a single process, each with multiple experiments. Examples of such data include data acquired from add seed vialing prior step to assess impact on variation, validate learned process that eliminated a step, assess impact of new materials added to a process step.

Examples of product development analysis include filter or search data by property range, variance analysis (e.g., ANOVA), material genealogy, outlier detection or tagging trimming, trending across time and location, statistical process control (See, for example, Barlow and Irony, 1992, "Foundations of statistical quality control," in Ghosh, M. & Pathak, P. K. (eds.) *Current Issues in Statistical Inference: Essays in Honor of D. Basu*, Hayward, Calif., Institute of Mathematical Statistics, pp. 99-112), statistical normalization across batches or experiments, hit picking, correlation of variable, a regression or a multivariate regression, root cause analysis (See, for example, Wilson et al., 1993, *Root Cause Analysis: A Tool for Total Quality Management*, Milwaukee, Wis., ASQ Quality Press. pp. 8-17), machine learning, summarization, time series filters or analysis, and process change analysis. In some embodiments, the product development information is first filtered to obtain selected runs. Then two or more properties are correlated using any of the above-disclosed techniques (e.g., variance analysis, machine learning, etc.).

In some embodiments a regression algorithm is used to determine a relationship between a variance in the one or more processes for making one or more products in the one or more collections of process objects and the variance in outcomes or characteristics. A regression algorithm can be any type of regression. For example, in some embodiments, the regression algorithm is logistic regression. Logistic regression algorithms are disclosed in Agresti, *An Introduction to Categorical Data Analysis*, 1996, Chapter 5, pp. 103-144, John Wiley & Son, New York, which is hereby incorporated by reference. In some embodiments, the regression algorithm is logistic regression with lasso, L2 or elastic net regularization. In some embodiments, those extracted features that have a corresponding regression coefficient that fails to satisfy a threshold value are pruned (removed from) the product information. In some embodiments, a generalization of the logistic regression model that handles multi-category responses is used in the machine learning. A number of such multi-category logit models described in Agresti, *An Introduction to Categorical Data Analysis*, 1996, John Wiley & Sons, Inc., New York, Chapter 8, hereby incorporated by reference in its entirety. More description of linear regression and correlation techniques that can be used to analyze product information are disclosed in Edwards, 1984, *An Introduction to Linear Regression and Correlation*, Second Edition, Freeman and Company, New York, which is hereby incorporated by reference.

In some embodiments, the machine learning is an unsupervised learning algorithm. One example of an unsupervised learning algorithm is cluster analysis.

In some embodiments, the machine learning is supervised machine learning.

Nonlimiting examples of supervised learning algorithm include, but are not limited to, neural network algorithms (e.g., convolutional neural networks, deep learning algorithms), support vector machine algorithms (SVM), Naive Bayes algorithms, nearest neighbor algorithms, random forest algorithms, decision tree algorithms, boosted tree algorithms, and linear discriminant analysis algorithms.

Neural Networks.

Neural network algorithms, also known as artificial neural networks (ANNs), and further including convolutional neural network algorithms (deep learning algorithms), are disclosed in Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, *Fundamentals of Artificial Neural Networks*, Massachusetts Institute of Technology, each of which is hereby incorporated by reference. Neural networks are machine learning algorithms that may be trained to map an input data set to an output data set, where the neural network comprises an interconnected group of nodes organized into multiple layers of nodes. For example, the neural network architecture may comprise at least an input layer, one or more hidden layers, and an output layer. The neural network may comprise any total number of layers, and any number of hidden layers, where the hidden layers function as trainable feature extractors that allow mapping of a set of input data to an output value or set of output values. As used herein, a deep learning algorithm (DNN) is a neural network comprising a plurality of hidden layers, e.g., two or more hidden layers. Each layer of the neural network comprises a number of nodes (or "neurons"). A node receives input that comes either directly from the input data or the output of nodes in previous layers, and performs a specific operation, e.g., a summation operation. In some embodiments, a connection from an input to a node is associated with a weight (or weighting factor). In some embodiments, the node may sum up the products of all pairs of inputs, xi, and their associated weights. In some embodiments, the weighted sum is offset with a bias, b. In some embodiments, the output of a node or neuron may be gated using a threshold or activation function, f, which may be a linear or non-linear function. The activation function may be, for example, a rectified linear unit (ReLU) activation function, a Leaky ReLu activation function, or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, may be "taught" or "learned" in a training phase using one or more sets of training data. For example, the parameters may be trained using the input data from a training data set and a gradient descent or backward propagation method so that the output value(s) that the ANN computes are consistent with the examples included in the training data set. The parameters may be obtained from a back propagation neural network training process.

Any of a variety of neural networks known to those of skill in the art may be suitable for use in analyzing product development. Examples include, but are not limited to, feedforward neural networks, radial basis function networks, recurrent neural networks, convolutional neural networks, and the like. In some embodiments, the machine learning makes use of a pre-trained ANN or deep learning architecture.

SVMs.

SVMs are described in Cristianini and Shawe-Taylor, 2000, "An Introduction to Support Vector Machines," Cambridge University Press, Cambridge; Boser et al., 1992, "A training algorithm for optimal margin classifiers," in Proceedings of the 5$^{th}$ Annual ACM Workshop on Computational Learning Theory, ACM Press, Pittsburgh, Pa., pp. 142-152; Vapnik, 1998, *Statistical Learning Theory*, Wiley, New York; Mount, 2001, *Bioinformatics: sequence and genome analysis*, Cold Spring Harbor Laboratory Press, Cold Spring Harbor, N.Y.; Duda, *Pattern Classification*, Second Edition, 2001, John Wiley & Sons, Inc., pp. 259, 262-265; and Hastie, 2001, *The Elements of Statistical Learning*, Springer, New York; and Furey et al., 2000, *Bioinformatics* 16, 906-914, each of which is hereby incorporated by reference in its entirety. When used for classification, SVMs separate a given set of binary labeled data training set with a hyperplane that is maximally distant from the labeled data. For cases in which no linear separation is possible, SVMs can work in combination with the technique of "kernels", which automatically realizes a non-linear mapping to a feature space. The hyperplane found by the SVM in feature space corresponds to a non-linear decision boundary in the input space.

Naïve Bayes Algorithms.

Naïve Bayes classifiers are a family of "probabilistic classifiers" based on applying Bayes' theorem with strong (naïve) independence assumptions between the features. In some embodiments, they are coupled with Kernel density estimation. See, Hastie, Trevor, 2001, *The elements of statistical learning: data mining, inference, and prediction*, Tibshirani, Robert, Friedman, J. H. (Jerome H.), New York: Springer, which is hereby incorporated by reference.

Nearest Neighbor Algorithms.

Nearest neighbor classifiers are memory-based and require no classifier to be fit. Given a query point $x_0$, the k training points $x_{(r)}$, r, ..., k closest in distance to $x_0$ are identified and then the point $x_0$ is classified using the k nearest neighbors. Ties can be broken at random. In some embodiments, Euclidean distance in feature space is used to determine distance as:

$$d_{(i)} = \|x_{(i)} - x_{(0)}\|$$

In some embodiments, when the nearest neighbor algorithm is used, the bin values for the training set are standardized to have mean zero and variance 1. In some embodiments, the nearest neighbor analysis is refined to address issues of unequal class priors, differential misclassification costs, and feature selection. Many of these refinements involve some form of weighted voting for the neighbors. For more disclosure on nearest neighbor analysis, see Duda, *Pattern Classification, Second Edition*, 2001, John Wiley & Sons, Inc.; and Hastie, 2001, *The Elements of Statistical Learning*, Springer, New York, each of which is hereby incorporated by reference in its entirety.

Random Forest, Decision Tree, and Boosted Tree Algorithms.

Decision trees are described generally by Duda, 2001, *Pattern Classification*, John Wiley & Sons, Inc., New York, pp. 395-396, which is hereby incorporated by reference. Tree-based methods partition the feature space into a set of rectangles, and then fit a model (like a constant) in each one. In some embodiments, the decision tree is random forest regression. One specific algorithm that can be used for analyzing product development is a classification and regression tree (CART). Other specific decision tree algorithms include, but are not limited to, ID3, C4.5, MART, and Random Forests. CART, ID3, and C4.5 are described in Duda, 2001, *Pattern Classification*, John Wiley & Sons, Inc., New York. pp. 396-408 and pp. 411-412, which is hereby incorporated by reference. CART, MART, and C4.5 are described in Hastie et al., 2001, *The Elements of Statistical Learning*, Springer-Verlag, New York, Chapter 9, which is hereby incorporated by reference in its entirety. Random Forests are described in Breiman, 1999, "Random Forests-Random Features," Technical Report 567, Statistics Department, U.C. Berkeley, September 1999, which is hereby incorporated by reference in its entirety.

Linear Discriminant Analysis Algorithms.

Linear discriminant analysis (LDA), normal discriminant analysis (NDA), or discriminant function analysis is a generalization of Fisher's linear discriminant, a method used in statistics, pattern recognition, and machine learning to find a linear combination of features that characterizes or separates two or more classes of objects or events. The resulting combination is used as the classifier (linear classifier) in some embodiments of the present disclosure. See, McLachlan, 2004, *Discriminant Analysis and Statistical Pattern Recognition*, Wiley Interscience. ISBN 978-0-471-69115-0. MR 1190469, which is hereby incorporated by reference.

Ensembles of Classifiers and Boosting.

In some embodiments, an ensemble (two or more) of classifiers is used in the product development analysis. In some embodiments, a boosting technique such as AdaBoost is used in conjunction with many other types of learning algorithms to improve the performance of the classifier. In this approach, the output of any of the classifiers disclosed herein, or their equivalents, is combined into a weighted sum that represents the final output of the boosted classifier. See Freund, 1997, "A decision-theoretic generalization of on-line learning and an application to boosting," Journal of Computer and System Sciences 55, p. 119, which is hereby incorporated by reference.

Clustering Algorithm.

In some embodiments, clustering is applied to the product development information in order to analyze product development information associated with each collection of process objects in the one or more collections of process objects to determine a relationship between a variance in the one or more processes for making one or more products in the one or more collections of process objects and a variance in outcomes or characteristics of one or more products made by the one or more processes. Clustering is described at pages 211-256 of Duda and Hart, *Pattern Classification and Scene Analysis,* 1973, John Wiley & Sons, Inc., New York, (hereinafter "Duda 1973") which is hereby incorporated by reference in its entirety. As described in Section 6.7 of Duda 1973, the clustering problem is described as one of finding natural groupings in a dataset. To identify natural groupings, two issues are addressed. First, a way to measure similarity (or dissimilarity) between two samples is determined. This metric (similarity measure) is used to ensure that the samples in one cluster are more like one another than they are to samples in other clusters. Second, a mechanism for partitioning the data into clusters using the similarity measure is determined.

Similarity measures are discussed in Section 6.7 of Duda 1973, where it is stated that one way to begin a clustering investigation is to define a distance function and to compute the matrix of distances between all pairs of samples in the training set. If distance is a good measure of similarity, then the distance between reference entities in the same cluster will be significantly less than the distance between the reference entities in different clusters. However, as stated on page 215 of Duda 1973, clustering does not require the use of a distance metric. For example, a nonmetric similarity function s(x, x') can be used to compare two vectors x and x'. Conventionally, s(x, x') is a symmetric function whose value is large when x and x' are somehow "similar." An example of a nonmetric similarity function s(x, x') is provided on page 218 of Duda 1973.

Once a method for measuring "similarity" or "dissimilarity" between points in a dataset has been selected, clustering requires a criterion function that measures the clustering quality of any partition of the data. Partitions of the data set that extremize the criterion function are used to cluster the data. See page 217 of Duda 1973. Criterion functions are discussed in Section 6.8 of Duda 1973.

More recently, Duda et al., Pattern Classification, $2^{nd}$ edition, John Wiley & Sons, Inc. New York, has been published. Pages 537-563 describe clustering in detail. More information on clustering techniques can be found in Kaufman and Rousseeuw, 1990, *Finding Groups in Data: An Introduction to Cluster Analysis*, Wiley, New York, N.Y.; Everitt, 1993, Cluster analysis (3rd ed.), Wiley, New York, N.Y.; and Backer, 1995, Computer-Assisted Reasoning in Cluster Analysis, Prentice Hall, Upper Saddle River, N.J., each of which is hereby incorporated by reference. Particular exemplary clustering techniques that can be used in the present disclosure include, but are not limited to, hierarchical clustering (agglomerative clustering using nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering comprises unsupervised clustering where no preconceived notion of what clusters should form when the training set is clustered are imposed.

3.11. A Change List

A useful way to compare two states or two versions of a process on one or more branches is to record and display the changes in that process over time. This type of comparison is referred to as a "change list". A change list will report differences as they are sequentially applied across time, causing the change in a process from one state to another. After accumulation of one or more sequential changes to a process, that process may be marked as a version. Thus the path of changes by which on version of a process was transformed into another process is recorded in the change list. In some cases, this change list can be applied to the latter version in reverse order to restore the latter version back to the original version, or to some intermediate state between them.

A change list can be stored in many different data formats, but it must at least record what attributes of a process were changed, and what was the change. For example, a change list might be stored in JSON, and a single value in that list could be another key:value list with the following keys:

processId: the identifier of the process being changed
processVer: the version of the process being changed
attribute: a positionally-encoded attribute that is being changed
change: the change that is made (such a add, delete, update)
old value: the prior value, if any, of the attribute
new value: the new value, if any, of the attribute To track changes on a process, activity or other attribute, a minimum it is required to store a unique identifier for the attribute and its version, the attribute being changed, and the change being made.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIGS. 2, 3, 4, and 5. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the

What is claimed is:

1. A computer system for analyzing product development information, the computer system comprising at least one processor and a memory, the memory comprising:
   an attribute record data store storing a plurality of process objects;
   an attribute class data store storing a plurality of object classes;
   a process run data store comprising a plurality of process runs; and
   a process evaluation module for execution by the at least one processor, the process evaluation module comprising instructions for:
   obtaining one or more collections of process objects from the attribute record store, wherein each respective collection of process objects in the one or more collections of process objects is associated with a process in one or more processes for making one or more products and comprises a corresponding one or more process objects, wherein
      each respective process object in the corresponding one or more process objects comprises (i) a corresponding process object unique identifier, (ii) a corresponding superior/inferior attribute reference, and (iii) a corresponding heritage indicator stored in the attribute record store, wherein:
   the corresponding superior/inferior attribute references another process object in the one or more process objects or makes a null reference; and
   the corresponding heritage indicator comprises:
      (a) a corresponding unique class record identifier that associates the respective process object with a particular object class in the plurality of object classes combined with an object version identifier from a plurality of object versions of the respective process object stored in an attribute record for the respective process object in the attribute record store, or
      (b) a corresponding unique class record identifier stored in a corresponding attribute class record in the attribute class data store that associates the respective process object with a particular object class in the plurality of object classes combined with a genealogical network identifier that identifies a respective instance of the particular object class in a genealogical network of related instances of the particular object class; and
   analyzing product development information associated with each collection of process objects in the one or more collections of process objects to determine a relationship between a variance in the one or more processes for making one or more products in the one or more collections of process objects from the attribute record store and iii) a variance in outcomes or characteristics of one or more products made by the one or more processes across a plurality of process runs in the process run data store for the one or more processes.

2. The computer system of claim 1, wherein each collection of process objects in the one or more collections of process objects comprises a process object version identifier.

3. The computer system of claim 1, wherein a first subset of process objects in the corresponding one or more process objects of a respective collection of process objects defines a hypergraph representing the corresponding process, and wherein one or more process objects in the first subset of process objects represents either a node or an edge of the corresponding hypergraph.

4. The computer system of claim 3, wherein the corresponding hypergraph comprises a corresponding one or more nodes connected by one or more edges.

5. The computer system of claim 1, wherein a process object in the respective collection of process objects further comprises one or more data attributes.

6. The computer system of claim 5, wherein a first data attribute in the one or more data attributes is a name, a description, a comment, a creation date, a modification date, a size indication, an owner, a creator, an access privilege, a purity of matter, a quantity of matter, a temperature of matter, a pressure of matter, a melting point of matter, or a property of matter.

7. The computer system of claim 6, wherein the first data attribute together with a value for the first data attribute form a key:value pair.

8. The computer system of claim 7, wherein the first data attribute further comprises a unique identifier for the key:value pair.

9. The computer system of claim 5 wherein the one or more collections of process objects is a plurality of collections of process objects and the variance in product development is exhibited by the one or more data attributes across each respective collection of process objects in the plurality of collections of process objects.

10. The computer system of claim 1, wherein the respective collection of process objects is a plurality of process objects and each process object in the respective collection of process objects further comprises one or more data attributes.

11. The computer system of claim 1, wherein the respective collection of process objects is encoded as a graph, one or more relational tables, one or more tables, one or more object structures, a JSON objects using the corresponding process object unique identifier, or a list of positional encodings.

12. The computer system of claim 1, wherein:
   the one or more collections of process objects comprises a first collection of process objects and a second collection of process objects, and
   the analyzing product development information associated with each collection of process objects in the one or more collections of process objects comprises:
      applying one or more mapping functions to the collection of process objects to form a first alternative encoding,
      applying one or more mapping functions to the second collection of process objects to form a second alternative encoding, and
      subjecting the first alternative encoding and the second alternative encoding to a comparison algorithm in order to compare a similarity or a difference between the first collection of process object and the second collection of process objects.

13. The computer system of claim 12, wherein
   the first alternative encoding is a first symbol sequence, a first list, a first coordinate system, a first number, a first graph, a first numeric representation, a first positional encoding, or a first symbolic representation, and
   the second alternative encoding is a second symbol sequence, a second list, a second coordinate system, a second number, a second graph, a second numeric representation, a second positional encoding, or a second symbolic representation.

14. The computer system of claim 12, wherein a mapping function in the one or more mapping functions comprises identity mapping, serialization, transformation, hashing, counting, an arithmetic operation, a transcendental function, a substring query based on position or pattern match, application of a context-free grammar, or a semantic encoding.

15. The computer system of claim 12, wherein the comparison algorithm is an operator.

16. The computer system of claim 15, wherein the operator is greater than, less than, equal to, not equal to, order of.

17. The computer system of claim 1, wherein a first process associated with a first collection of process objects in the one or more collections of process objects is a first version of the first process, and the method further comprises:
   changing the first collection of process objects to a second collection of process objects through a sequence of change events, wherein the second collection of process object is associated with a second version of the first process; and
   recording a change event history that reflects the sequence of change events, wherein each respective change event in the sequence of change events comprises the process objects in the first collection of process objects to which the respective change event was applied.

18. The computer system of claim 17, wherein a change event in the sequence of change events includes addition or removal of an attribute.

19. The computer system of claim 17, wherein the first collection of process objects and the second collection of process objects are part of the genealogical network, and wherein the method further comprises:
   reviewing the sequence of change events to determine a change that has been made to change the first collection of process objects into the second collection of process objects.

20. The computer system of claim 17, the method further comprising reversing or repeating one or more change events in the sequence of change events.

21. The computer system of claim 1, wherein each respective process run in the plurality of process runs comprises a corresponding identification of a version for a corresponding process in the one or more processes, (ii) a corresponding plurality of values for a corresponding first set of resource outputs and (iii) a corresponding plurality of values for a corresponding first set of resource inputs, and wherein the variance in outcomes or characteristics of one or more products made by the one or more processes is a variance across the corresponding first set of resource outputs of each respective process run in the plurality of process runs.

22. A non-transitory computer readable storage medium for analyzing product development information, wherein the non-transitory computer readable storage medium comprises an attribute record data store storing a plurality of process objects;

an attribute class data store storing a plurality of object classes;

a process run data store comprising a plurality of process runs; and a process evaluation module, which when executed by a first device, performs a method comprising:

obtaining one or more collections of process objects from the attribute record store, wherein each respective collection of process objects in the one or more collections of process objects is associated with a process in one or more processes for making one or more products and comprises a corresponding one or more process objects, wherein
   each respective process object in the corresponding one or more process objects comprises (i) a corresponding process object unique identifier, (ii) a corresponding superior/inferior attribute reference, and (iii) a corresponding heritage indicator stored in the attribute record store, wherein:
the corresponding superior/inferior attribute references another process object in the one or more process objects or makes a null reference; and
the corresponding heritage indicator comprises:
   (a) a corresponding unique class record identifier that associates the respective process object with a particular object class in the plurality of object classes combined with an object version identifier from a plurality of object versions of the respective process object stored in an attribute record for the respective process object in the attribute record store, or
   (b) a corresponding unique class record identifier stored in the corresponding attribute class record in the attribute class data store that associates the respective process object with a particular object class in the plurality of object classes combined with a genealogical network identifier that identifies a respective instance of the particular object class in a genealogical network of related instances of the particular object class; and analyzing product development information associated with each collection of process objects in the one or more collections of process objects to determine a relationship between (i) a variance in the one or more processes for making one or more products in the one or more collections of process objects from the attribute record store and (ii) a variance in outcomes or characteristics of one or more products made by the one or more processes across a plurality of process runs in the process run data store for the one or more processes.

* * * * *